(12) United States Patent
Hata et al.

(10) Patent No.: US 8,178,203 B2
(45) Date of Patent: May 15, 2012

(54) ALIGNED SINGLE-WALLED CARBON NANOTUBE AGGREGATE, BULK ALIGNED SINGLE-WALLED CARBON NANOTUBE AGGREGATE, AND POWDERED ALIGNED SINGLE-WALLED CARBON NANOTUBE AGGREGATE

(75) Inventors: Kenji Hata, Ibaraki (JP); Sumio Iijima, Ibaraki (JP); Motoo Yumura, Ibaraki (JP); Don N. Futaba, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 807 days.

(21) Appl. No.: 12/318,443

(22) Filed: Dec. 30, 2008

(65) Prior Publication Data
US 2011/0008617 A1    Jan. 13, 2011

Related U.S. Application Data

(63) Continuation-in-part of application No. 11/658,577, filed as application No. PCT/JP2005/014239 on Jul. 27, 2005, now Pat. No. 7,854,991.

(30) Foreign Application Priority Data

Jul. 27, 2004  (JP) ................................ 2004-219346
Nov. 17, 2004 (JP) ................................ 2004-333683
Mar. 8, 2005  (JP) ................................ 2005-063704

(51) Int. Cl.
*B32B 9/00*     (2006.01)
*D01F 9/12*     (2006.01)

(52) U.S. Cl. ................ 428/408; 423/447.2; 423/445 B; 977/742; 977/750

(58) Field of Classification Search .................... None
See application file for complete search history.

(56) References Cited

FOREIGN PATENT DOCUMENTS

JP   2004-140288   5/2004
JP   2004-182548   7/2004

OTHER PUBLICATIONS $2^{nd}$ Korea-Japan Symposium on Carbon Nanotube, 1P-05 (Nov. 27, 2005).
Abstracts The $30^{th}$ Commemorative Fullerene-Nanotubes General Symposium, 2P-20 (Jan. 7-9, 2006).
Euroconference on Electronic Properties of Novel Materials, Molecular Nanostructures (Mar. 4-Mar. 11, 2006).
Nanotube 2006, Invited Talk-001 (Jun. 18-23, 2006).
T. Yamada et al.,"Size-Selective Growth of Double-Walled Carbon Nanotube Forests from Engineered Iron Catalysts", Nature Nanotechnology, vol. 1, pp. 131-136, Nov. 2006.

*Primary Examiner* — Timothy Speer
(74) *Attorney, Agent, or Firm* — Wenderoth, Lind & Ponack, L.L.P.

(57) ABSTRACT

This invention provides an aligned single-walled CNT aggregate comprising a substrate, fine particles of iron catalyst with a density of $1 \times 10^{11}$ to $1 \times 10^{14}/cm^2$ disposed on an alumina co-catalyst above the substrate, and a plurality of single-walled CNTs grown from the fine particles of the iron catalyst, in which the plurality of single-walled CNTs have a specific surface area of 600 $m^2/g$ to 2600 $m^2/g$, and a weight density from 0.002 $g/cm^3$ to 0.2 $g/cm^3$, and the alignment degree which satisfies a few of specific conditions. This invention also provides a bulk aligned single-walled carbon nanotube aggregate and a powdered aligned single-walled carbon nanotube aggregate.

5 Claims, 53 Drawing Sheets

ADSORPTION/DESORPTION ISOTHERMAL CURVE FOR LIQUID NITROGEN $\alpha_s$-PLOT OF NOT-OPENED ALIGNED SINGLE-WALLED CNT AGGREGATE $\alpha_S$-PLOT $\alpha_S$-PLOT OF ALIGNED SINGLE-WALLED CNT AGGREGATE APPLIED WITH OPENING TREATMENT SCHEMATIC VIEW FOR BUNDLE STRUCTURE OF CNT WITH LARGE OUTER DIAMETER, BROAD SIZE DISTRIBUTION, AND LOW LINEARITY
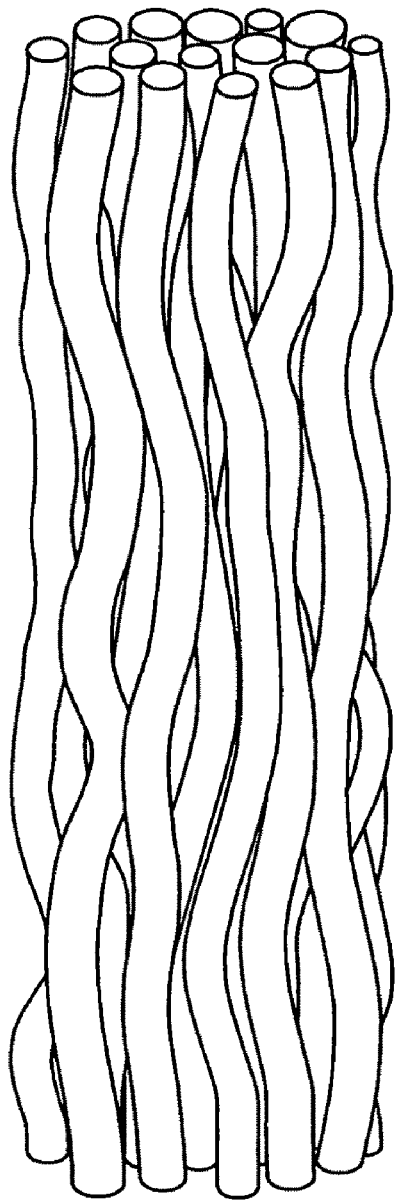
SCHEMATIC VIEW FOR BUNDLE STRUCTURE OF CNT WITH SMALL OUTER DIAMETER, NARROW SIZE DISTRIBUTION, AND HIGH LINEARITY
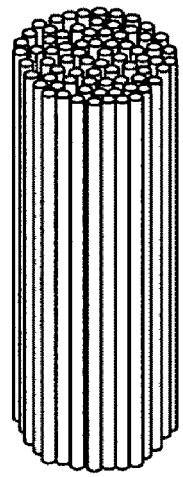
*FIG. 11B*
*FIG. 11A*

TEM IMAGES OF SINGLE-WALLED CNT IN
ALIGNED SINGLE-WALLED CNT AGGREGATE

GRAPH SHOWING RESULT OF MEASUREMENT FOR RAMAN
SPECTROSCOPY OF CNT IN ALIGNED SINGLE-WALLED CNT
AGGREGATE (G/D RATIO: ABOUT 25)

GRAPH SHOWING THE RESULT OF MEASUREMENT FOR RAMAN
SPECTROSCOPY OF CNT IN ALIGNED SINGLE-WALLED CNT
AGGREGATE (G/D RATIO: ABOUT 2.5)

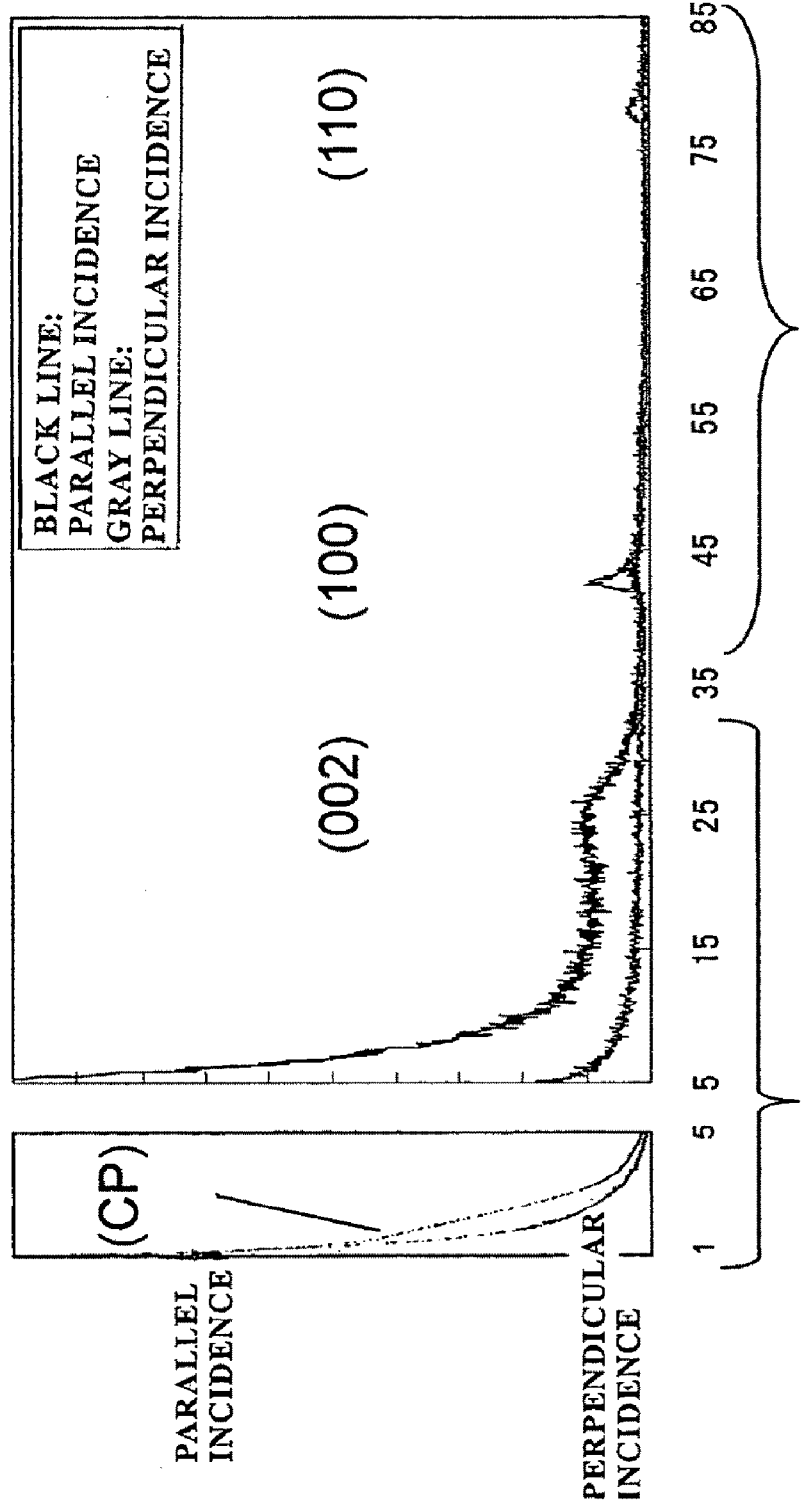

FIG. 23
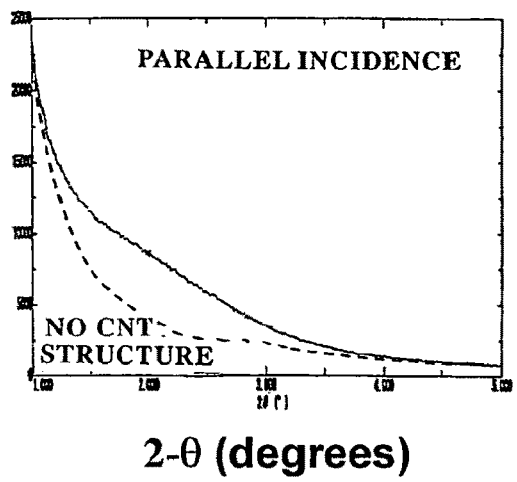
(a) PARALLEL INCIDENCE
NO CNT STRUCTURE
2-θ (degrees)
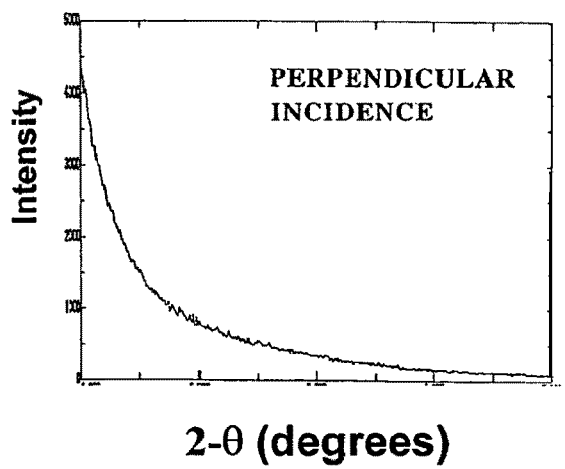
(b) PERPENDICULAR INCIDENCE
2-θ (degrees)

RELATION BETWEEN ADDITION AMOUNT OF FINE CATALYST PARTICLE
AND WEIGHT DENSITY OF SINGLE-WALLED CNT AGGREGATE

DENSITY = 0.0362 g/cm³

SUBSTRATE   CATALYST IS PATTERNED   GROWN BY WATER
            ON SUBSTRATE            ADDITION METHOD

APPARATUS-2 OXIDIZING AGENT CONTAINING GAS IS SUPPLIED USING BUBBLER

APPARATUS-3 OXIDIZING AGENT CONTAINING SOLUTION – GAS ARE SPRAYED

OXIDIZING AGENT REMOVING DEVICE –SUPPLY GAS PURIFIER

APPARATUS-4 OXIDIZING AGENT-CONTAINING GAS IS SUPPLIED BY SYLINGE OR THE LIKE

APPARATUS-5  SOLID, SOLUTION OXIDIZING AGENT ARE SUPPLIED BY EVAPORATION

FIG. 42
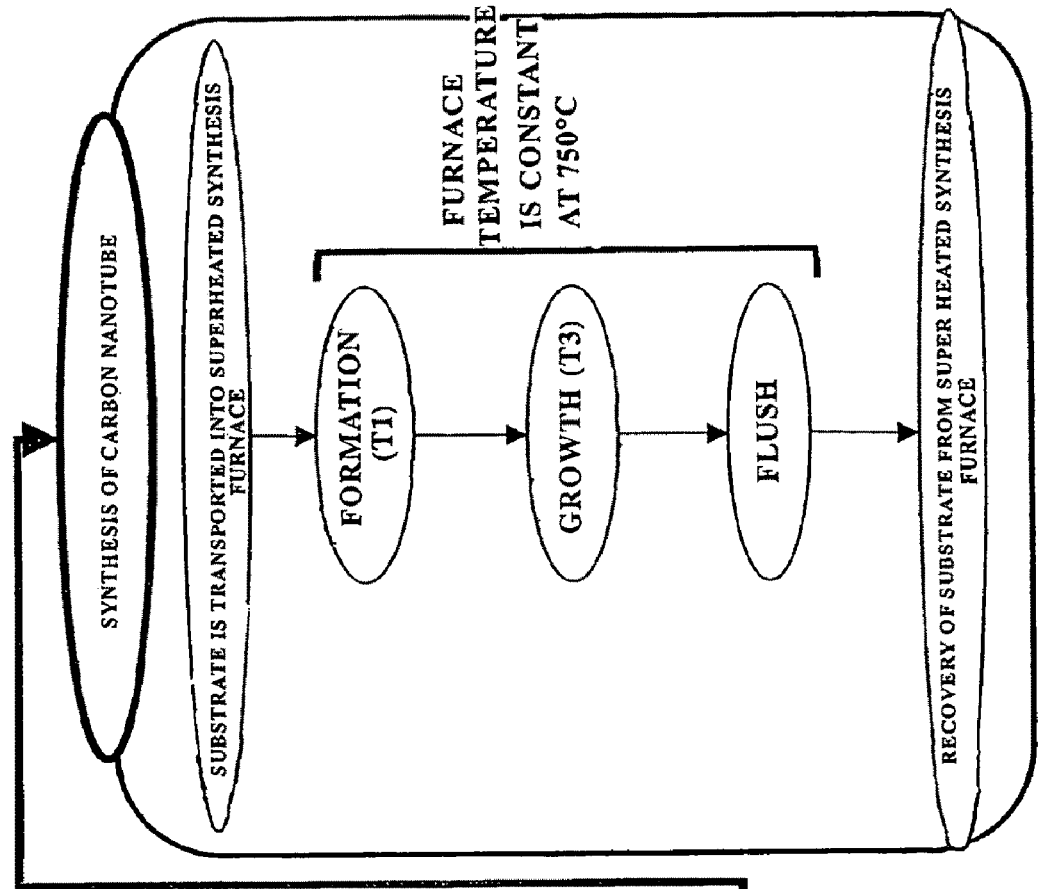
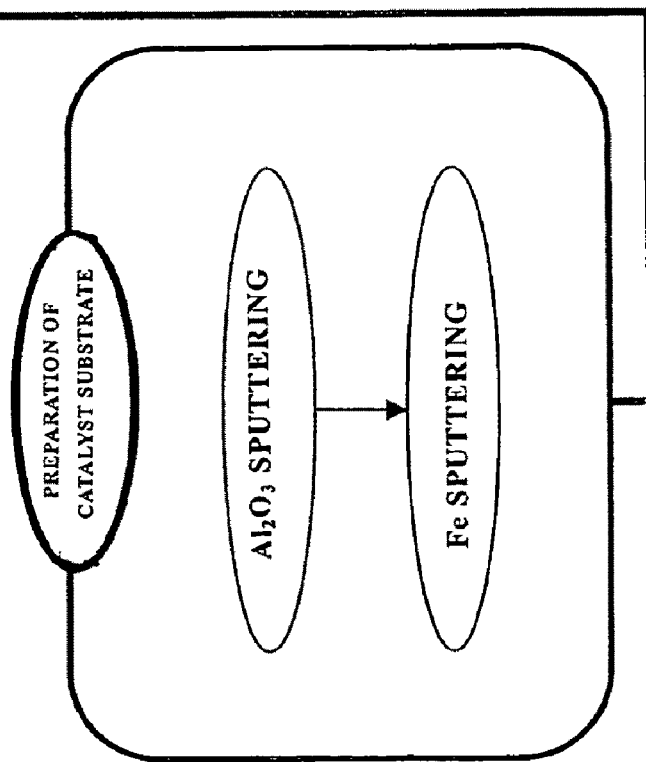

| | Formation (T1) | Growth (T3) | Flush |
|---|---|---|---|
| Time (min) | 6 | 5 | 2 |
| Pressure (Pa) | 1.02E+5 | 1.02E+5 | 1.02E+5 |
| Furnace Temp. (°C) | 750 | 750 | 750 |
| Total flow (sccm) | 1000 | 1000 | 1000 |
| He (sccm) | 100 | 850 | 1000 |
| $H_2$ (sccm) | 900 | 0 | 0 |
| X (sccm) | 0 | 50 | 0 |
| $C_2H_4$ (sccm) | 0 | 100 | 0 |

| | Formation (T1) | X-time (T2) | Growth (T3) | Flush & Cooling |
|---|---|---|---|---|
| Time (min) | 15 | 5 | 10 | 6 |
| Pressure (Pa) | 1.02E+5 | 1.02E+5 | 1.02E+5 | 1.02E+5 |
| Temp. (°C) | TEMPERATURE ELEVATED FROM ROOM TEMPERATURE AT 50°C/min | 750 | 750 | TEMPERATURE LOWERED TO ROOM TEMPERATURE |
| Total flow (sccm) | 1000 | 1000 | 1000 | 1000 |
| He (sccm) | 600 | 510 | 850 | 1000 |
| $H_2$ (sccm) | 400(H1) | 400(H2) | 0 | 0 |
| X (sccm) | 0 | 50 | 50 | 0 |
| $C_2H_4$ (sccm) | 0 | 0 | 100 | 0 |

DIGITAL CAMERA IMAGES OF ALIGNED SINGLE-WALLED
CNT AGGREGATE OF 1 CM HEIGHT

SEM IMAGES OF ALIGNED SINGLE-WALLED CNT AGGREGATE
OF 12 μm HEIGHT OBSERVED JUST FROM THE LATERAL SIDE

GROWING CURVE OF ALIGNED SINGLE-WALLED
CNT AGGREGATE MEASURED DURING GROWTH
BY USING TELECENTRIC OPTICAL MEASURING SYSTEM

ALIGNED SINGLE-WALLED CARBON NANOTUBE AGGREGATE, BULK ALIGNED SINGLE-WALLED CARBON NANOTUBE AGGREGATE, AND POWDERED ALIGNED SINGLE-WALLED CARBON NANOTUBE AGGREGATE

This is a Continuation-in-part of Ser. No. 11/658,577, filed Jan. 26, 2007 now U.S. Pat. No. 7,854,991 which is the U.S. National Stage of PCT/JP2005/014239, filed Jul. 27, 2005.

BACKGROUND OF THE INVENTION

1. Field of the Invention

The present invention relates to an aligned single-walled carbon nanotube aggregate, a bulk aligned single-walled carbon nanotube aggregate, and a powdered aligned single-walled carbon nanotube aggregate and, more specifically, it relates to an aligned single-walled carbon nanotube aggregate, a bulk aligned single-walled carbon nanotube aggregate, and a powdered aligned single-walled carbon nanotube aggregate, not available until now, possessing high purity, high specific surface area, able to be produced in large scale and in patterns.

2. Description of the Related Art

In recent years, development of carbon nanotubes (CNTs) has been expected for new functional materials such as new electronic device materials, optical device materials, conductive materials, and bio-related materials, and studies have been progressed earnestly for application use, quality, mass productivity, etc.

Among CNTs, single-walled CNTs have attracted attention as a material for nano-electronic devices, nano-optical devices, and energy storage devices since they are extremely excellent in electrical property (extremely high current density), thermal property (heat conductivity comparable with diamond), optical property (light emission in an optical communication band wavelength region), hydrogen storing performance, and metal catalyst supporting performance as well as have both properties of semiconductors and metals.

In a case of effectively utilizing the single-walled CNTs for the application uses described above, it is desired that a plurality of single-walled CNTs form a bundle, film, or aggregate gathered in a specified direction and the single-walled CNT aggregate provides electric or electronic, and optical functionality. Further, it is desired that the length (height) of the single-walled CNT aggregate is larger. It is expected that the application field of CNT is greatly extended when such aligned single-walled CNT aggregate is created.

On the other hand, one of methods for producing CNT, a chemical vapor deposition method (hereinafter also referred to as a CVD method) has been known (refer, for example, to JP-A-2003-171108). The method has a feature of bringing a carbon compound into contact with fine metal particles as a catalyst in an atmosphere at a high temperature of about 500° C. to 1,000° C. and CNTs can be produced while variously changing the kind and the arrangement of the catalyst, kind of carbon compounds, and reaction conditions, and it has attracted attention as being suitable to mass production of CNTs. Further, the CVD method has an advantage capable of producing both single-walled carbon nanotube (SWCNT) and multi-walled carbon nanotube (MWCNT) and capable of producing a number of CNTs aligned vertically to the surface of a substrate by using a substrate supporting the catalyst.

The aligned CNT aggregate having a high specific surface area, alignment property, and having moldability to various forms and shapes is extremely suitable as substance—energy storage materials in various application uses such as electrodes for super capacitors and heat conducting and heat dissipating materials having directional anisotropy, but such CNT aggregate has yet not been obtained so far.

Since the existent CNT aggregates are a one-dimensional elongate flexible material with extremely high aspect ratio and tend to adhere to each other due to a strong Van der Waals force, they tend to form a disordered and not-aligned aggregate with a low specific surface area. Then, since it is extremely difficult to re-constitute the alignment property of the once disordered and not-aligned aggregate, it was difficult to produce an aligned CNT aggregate of high specific surface area having moldability.

In view of the problems in the prior art described above, the present invention mainly intends to provide an aligned single-walled CNT aggregate, a bulk aligned single-walled CNT aggregate, and an powdered aligned single-walled CNT aggregate which can be produced easily and has a high specific surface area, in which individual CNTs are aligned in an orderly direction and which has moldability due to low bulk density. "Aligned single-walled CNT aggregate" referred to in the present specification means a aggregate of a plurality of single-walled CNTs grown to a predetermined direction from a substrate used for growth, "bulk aligned single-walled CNT aggregate" means an object obtained by peeling the aligned single-walled CNT aggregates together from a substrate, and "powdered aligned single-walled CNT aggregate" means an object obtained by peeling the aligned single-walled CNT aggregates from the substrate into a powder form.

SUMMARY OF THE INVENTION

For solving the problems described above, the present application provides the following inventions.

1. An aligned single-walled CNT aggregate having a substrate, fine particles of an iron catalyst disposed on an alumina co-catalyst on the substrate at a density (number of iron catalyst per unit area) of $1 \times 10^{11}$ to $1 \times 10^{14}/cm^2$, and a plurality of single-walled CNTs grown from the fine particles of the iron catalyst, in which the plurality of the single-walled CNTs have a specific surface area from 600 $m^2/g$ to 2600 $m^2/g$ and a weight density from 0.002 $g/cm^3$ to 0.2 $g/cm^3$, and the alignment degree is defined by at least one of the following conditions:

(1) in a case where X-rays are incident from a first direction parallel to the longitudinal direction of CNT and a second direction perpendicular to the first direction to measure an X-ray diffraction intensity (θ-2θ method), a θ angle and a reflection direction where the reflection intensity from the second direction is larger than the reflection intensity from the first direction are present, and a θ angle and a reflection direction where the reflection intensity from the first direction is larger than the reflection intensity from the second direction are present, (2) in a case where measuring an X-ray diffraction intensity in two-dimension diffraction pattern images obtained by entering X-rays from the direction perpendicular to the longitudinal direction of CNT (Lane method), a diffraction peak pattern showing the presence of anisotropy appears, (3) in a case where Herman's orientation factor is more than 0 and less than 1 when using the X-ray diffraction intensity obtained by the θ-2θ method or the Laue method.

2. A bulk aligned single-walled CNT aggregate having a specific surface area from 600 $m^2/g$ to 2600 $m^2/g$, and a weight density from 0.002 $g/cm^3$ to 0.2 $g/cm^3$ in which the alignment degree is defined by at least one of the following conditions:

(1) in a case where X-rays are incident from a first direction parallel to the longitudinal direction of CNT and a second direction perpendicular to the first direction to measure an X-ray diffraction intensity (θ-2θ method), a θ angle and a reflection direction where the reflection intensity from the second direction is larger than the reflection intensity from the first direction are present, and a θ angle and a reflection direction where the reflection intensity from the first direction is larger than the reflection intensity from the second direction appears,
(2) in a case where measuring an X-ray diffraction intensity in two-dimensional diffraction pattern images obtained by entering X-rays from the direction perpendicular to the longitudinal direction of CNT (Laue method), a diffraction peak pattern showing the presence of anisotropy develops,
(3) in a case where Herman's orientation factor is more than 0 and less than 1 when using the X-ray diffraction intensity obtained by the θ-2θ method or the Lane method.
3. An aligned single-walled CNT aggregate in which in the X-ray diffraction method described above in (1) or (2), the degrees of the diffraction intensity for the (CP) diffraction peak, (002) peak attributable to the packing between single-wailed CNTs and that of the diffraction peak intensity for the (100), (110) peaks attributable to the hexagonal carbon ring structure that constitutes the single-walled CNT are different from each other for the parallel and the perpendicular incident directions.
4. A powdered aligned single-walled CNT aggregate having a specific surface area from 600 $m^2/g$ to 2600 $m^2/g$, and a weight density from 0.0005 $g/cm^3$ to 0.16 $g/cm^3$, in which the alignment degree thereof is defined by a value of Herman's orientation factor that is more than 0 and less than 1 when calculated based on the intensity profile obtained from images obtained by Fast Fourier Transformation of scanning electron microscopic images or atomic force microscopic images.

The present invention can provide an aligned single-walled CNT aggregate, a bulk aligned single-walled CNT aggregate, and a powdered aligned single-walled CNT aggregate having an extremely useful properties such as high specific surface area, high alignment property, and low density. CNT is a material having a one-dimensional structure with an extremely high aspect ratio and the function thereof also shows a directional anisotropy Accordingly, when individual CNTs constituting a CNT aggregate are aligned in an orderly direction, the properties of each CNTs are directionally anisotropic, as a result, a CNT structure of superior properties can be obtained. That is, the aligned single-walled CNT aggregate of the invention in which each of CNTs is aligned in the orderly direction shows higher directional anisotropy in view of the transmission property for the alignment direction compared with a CNT aggregate in which the directions of individual CNTs are not-ordered, that is, with no alignment. Due to the high directional anisotropy, the CNT aggregate shows more preferred electric property (for example, higher conductivity), more preferred mechanical property (for example, higher strength), and more preferred thermal property (for example, higher heat conductivity). Further, the property of such CNT aggregate is different between the alignment direction and other directions, that is, it is anisotropic, and thus is effective, for example, to selectively diffuse and discharge heat or the like in a desired direction and this is suitable for applications such as a heat conductive material.

Further, the aligned single-walled CNT aggregate of the invention has a remarkable feature that the specific surface area is extremely high from 600 $m^2/g$ to 2600 $m^2/g$. Such a high specific surface area is effective for a catalyst support or an energy or material storage material and is suitable to an application use, for example, a super capacitor or an actuator.

Further, the aligned single-walled CNT aggregate of the invention has a weight density as low as from 0.002 $g/cm^3$ to 0.2 $g/cm^3$. In the aligned single-walled CNT aggregate grown at such a low density on the substrate, interaction between individual single-walled CNTs to each other constituting the aggregate is weak and it is easy to uniformly disperse the aligned single-walled CNT aggregate detached from the substrate, for example, in a solvent. Accordingly, various functional materials can be attained, for example, by preparing a liquid dispersion of single-walled CNTs using the aligned single-walled CNT aggregate as a carbon source material and compositing them with a different material. On the contrary, in the aligned CNT aggregate grown at a high density on a substrate, since interaction between the CNTs increases, preparation of the liquid dispersion is difficult.

In addition, the aligned single-walled CNT aggregate of the invention which is properly aligned and at a low density is easy for the density control by a post treatment process after growth and CNTs can be packed at a high density with no gaps like a flattened field of corn by way of a density-increasing process. In this case, the aligned single-walled CNT aggregate can be molded into various shapes by controlling the density-increasing process.

BRIEF DESCRIPTION OF THE DRAWINGS

FIG. 11 is a schematic view of a bundle structure of CNTs in which FIG. 11(a) shows a structure with a large diameter, a broad size distribution and low linearity and FIG. 11(b) shows a structure with a small diameter, a narrow size distribution and high linearity;

FIG. 21 is a schematic constitutional view showing a measuring apparatus by a θ-2θ method in which

FIG. 22 is an X-ray diffraction spectral, diagram when measuring the aligned single-walled CNT aggregate by a θ-2θ method;

FIG. 23 is an X-ray diffraction spectral diagram of a (CP) diffraction peak when measuring the aligned single-walled CNT aggregate by the θ-2θ method in which FIG. 23(a) shows a case where the X-ray incident direction and the CNT alignment direction are parallel and FIG. 23(b) shows a case where the X-ray incident direction and the CNT alignment direction are perpendicular to each other;

FIG. 42 is a flow chart showing the procedure of synthesizing an aligned single-walled CNT aggregate;

PREFERRED EMBODIMENTS OF THE INVENTION

The present invention will be described in detail by way of preferred embodiments with reference to the appended drawings.

Figure 1:
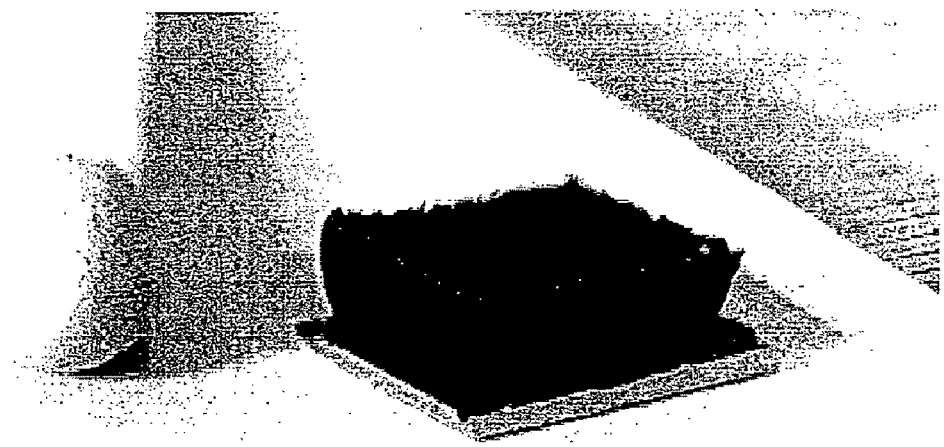
FIG. 1 shows digital camera images of an aligned single-walled CNT aggregate according to the invention.
Figure 2:
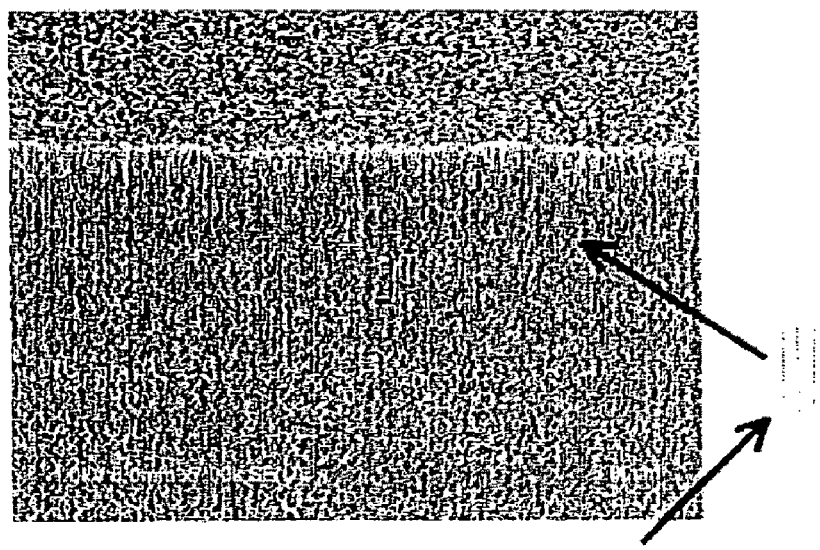
FIG. 2 shows enlarged electron microscopic (SEM) images for a portion of an aligned single-walled CNT aggregate shown in FIG. 1.
Figure 3:
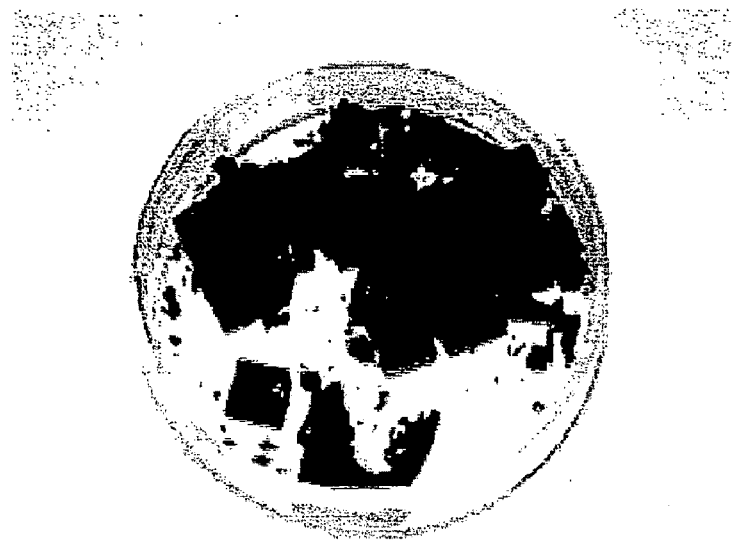
FIG. 3 shows digital camera images of bulk aligned single-walled CNT aggregate peeled from a substrate and placed in a container.
Figure 4:
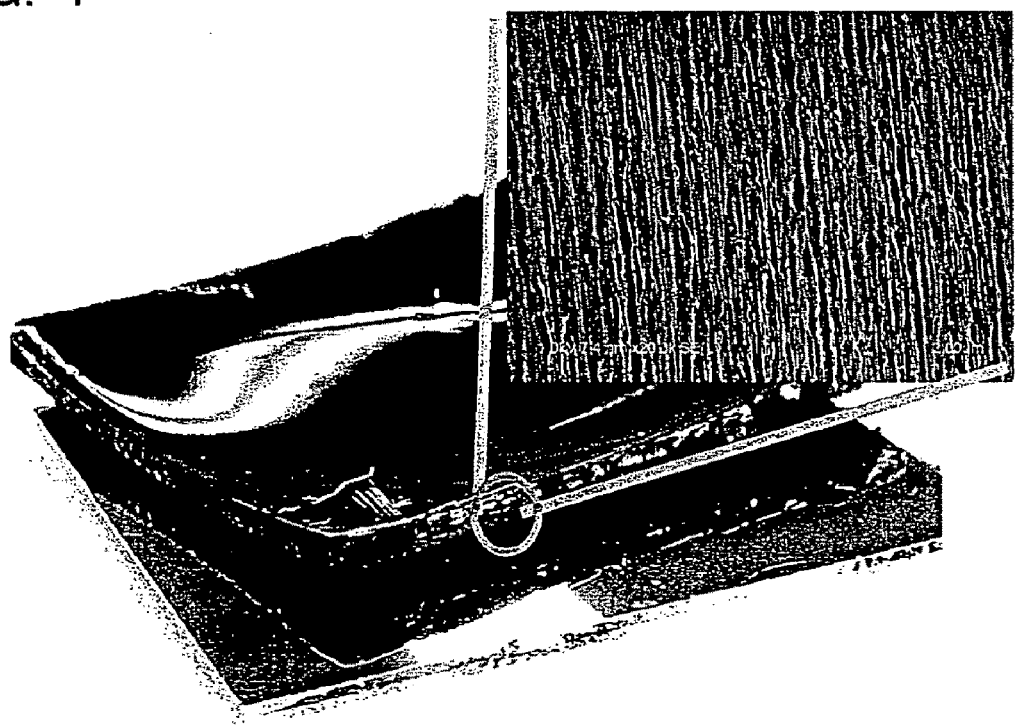
FIG. 4 shows digital cameral images of a bulk aligned single-walled CNT aggregate peeled from a substrate and enlarged scanning electron microscopic (SEM) images for a portion of the side thereof.
Figure 5:
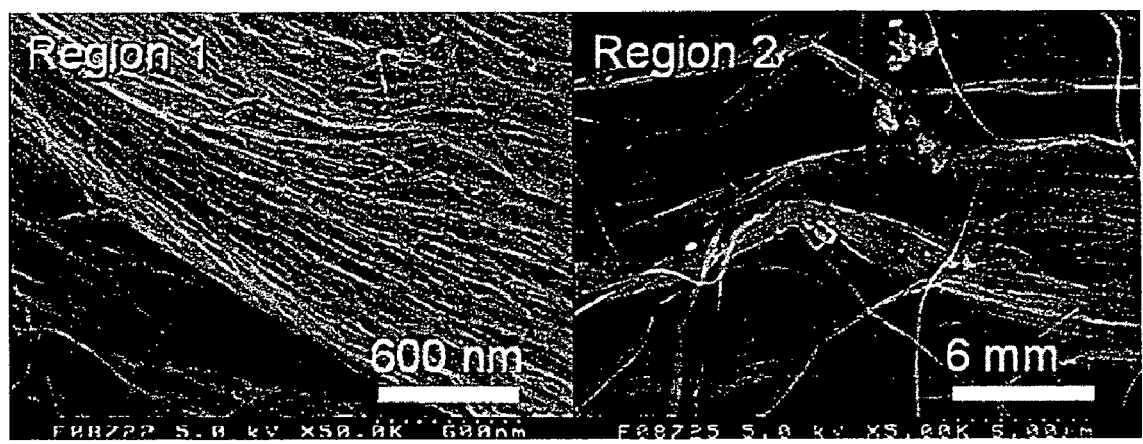
FIG. 5 shows scanning electron microscopic (SEM) images for portions of a powdered aligned single-walled CNT aggregate peeled from a substrate enlarged at magnifying factors different from each other.

FIG. 1 shows images taken by a digital camera for an entire aligned single-walled CNT aggregate of the invention and FIG. 2 shows scanning electron microscopic (hereinafter also referred to as SEM) images in an enlarged scale for a portion of the aligned single-walled CNT aggregate, FIG. 3 shows images taken by a digital camera for bulk aligned single-walled CNT aggregates after peeling them off from a substrate, FIG. 4 shows digital cameral images for bulk aligned single-walled CNT aggregates peeled from a substrate, with enlarged SEM images of the side, and FIG. 5 shows SEM images for powdered aligned single-walled CNT aggregates after peeling from a substrate. The physical and chemical properties such as specific surface area, density, and alignment of the aligned single-walled CNT aggregate, bulk aligned single-walled CNT aggregates, and powdered aligned single-walled CNT aggregates are basically similar.

[Specific Surface Area of CNT]

A preferred specific surface area of the aligned single-walled CNT aggregate including the bulk aligned single-walled CNT aggregate and the powdered aligned single-walled CNT aggregate is 600 m$^2$/g or more in a case where the single-walled CNT is not-opened mostly and 1300 m$^2$/g or more in a case where single-walled CNT is opened mostly.

A not-opened CNT aggregate having the specific surface area of less than 600 m$^2$/g or an opened CNT aggregate having the specific surface area of less than 1300 m$^2$/g contain impurities, such as metals or carbon impurities by several tens percent (about 40%) by weight, and cannot exhibit the inherent properties of CNT and is not suitable to applications such as catalyst support, energy or material storage, super capacitor, and actuator.

Generally, while larger specific surface area of the aligned single-walled CNT aggregate is more preferred, it has a theoretical upper limit, which is about 1300 m$^2$/g for a not-opened aggregate and about 2600 m$^2$/g for an opened aggregate.

Figure 6:
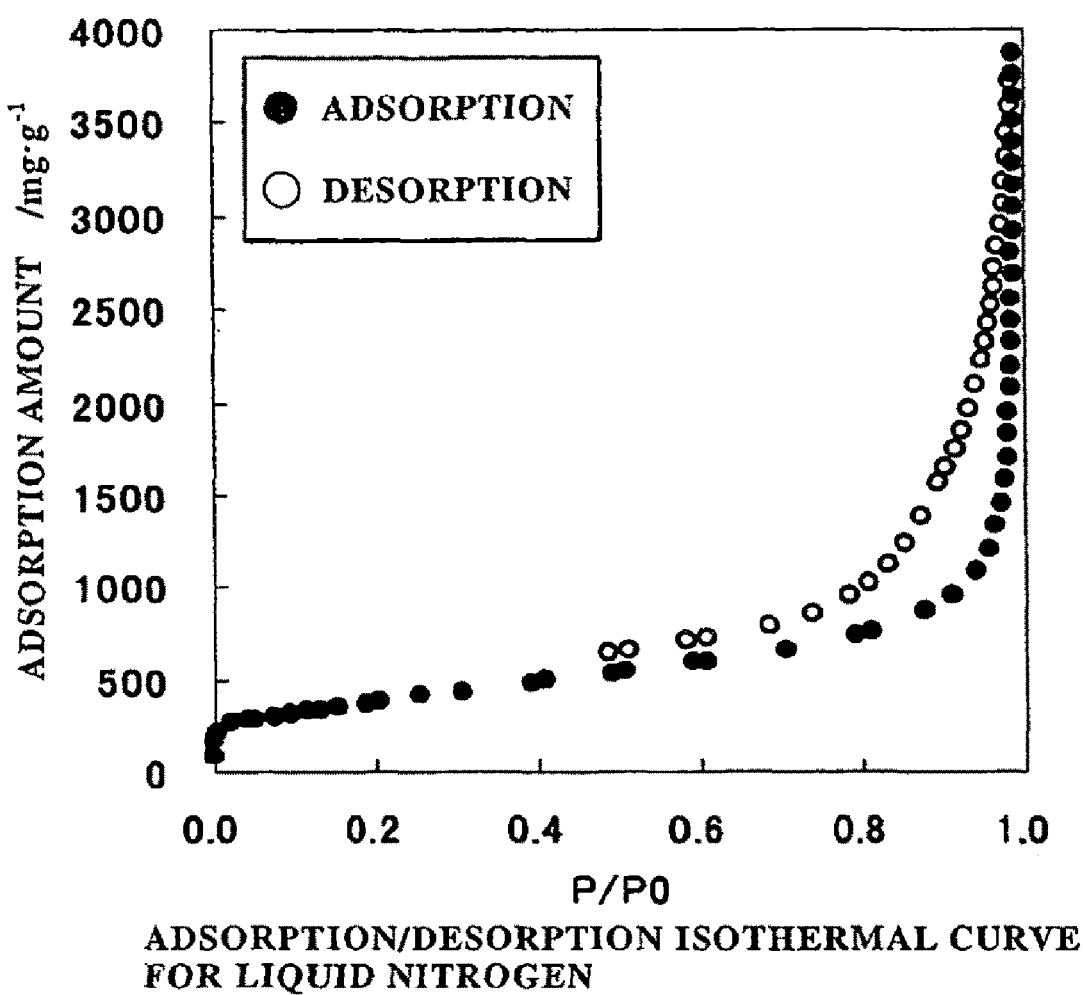
FIG. 6 shows a nitrogen adsorption/desorption isotherm curve at 77K for an aligned single-walled CNT aggregate with no opening treatment applied.

The specific surface area of the aligned single-walled CNT aggregate can be determined by measuring a nitrogen adsorption/desorption isothermal curve at 77K. As an example, FIG. 6 shows an adsorption/desorption isothermal curve measured for 30 mg of the bulk aligned single-walled CNT aggregate by using BELSORP-MINI (produced by BEL Japan Inc.) (adsorption equilibrium time: 600 sec). When the specific surface area was measured from the adsorption/desorption isothermal curve by a method of Brunauer-Emmett-Teller, it was 1100 m$^2$/g. In the graph, P is an adsorption equilibrium pressure and P$_0$ is a saturation vapor pressure.

Figure 7:
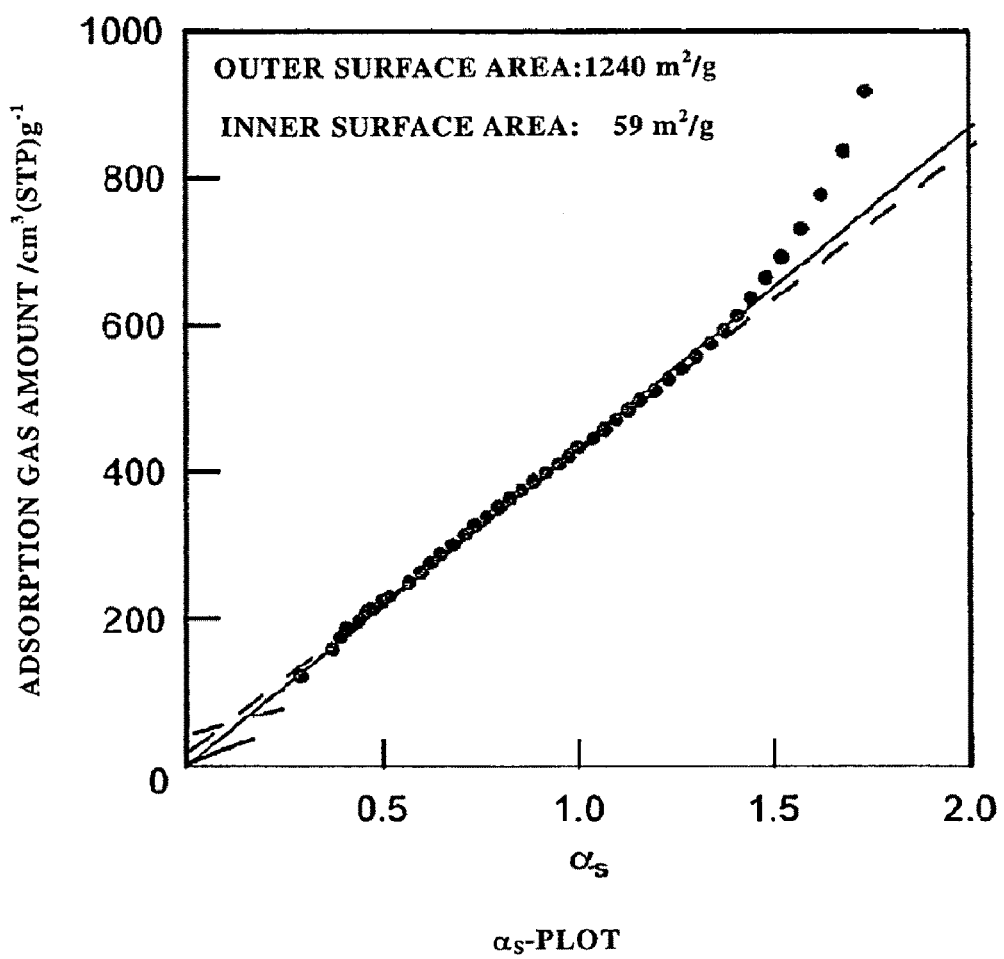
FIG. 7 shows an $\alpha_s$ plot diagram for an aligned single-walled CNT aggregate with no opening treatment applied.

An adsorption/desorption isothermal curve for a not-opened aligned single-walled CNT aggregate shows a high linearity in a region of a relative pressure of 0.5 or lower. Further, as shown in FIG. 7, also an $\alpha_s$ plot showed a linearity in a region of 1.5 or less. The measuring result shows that the single-walled CNT is not-opened.

The specific surface area of the aligned single-walled CNT aggregate can be further increased by applying the opening treatment to the single-walled CNT. As the opening treatment, a dry process treatment by oxygen can be used. Further, in a case where a wet process treatment can be used, acid treatment, specifically, a treatment of refluxing hydrogen peroxide, a cutting treatment with hydrochloric acid at high temperature, etc. can be used.

Figure 8:
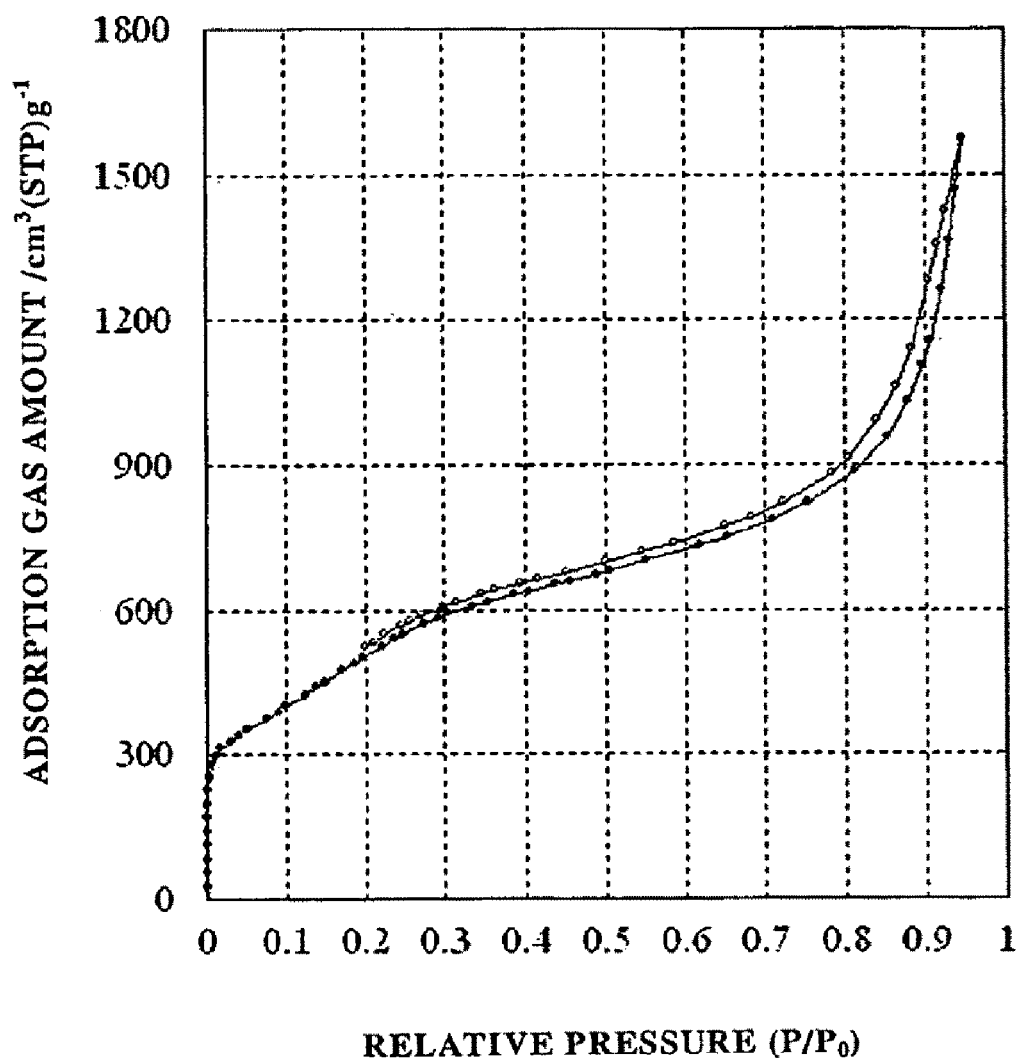
FIG. 8 shows a nitrogen adsorption/desorption isotherm curve at 77K for an aligned single-walled CNT aggregate with opening treatment applied.
Figure 9:
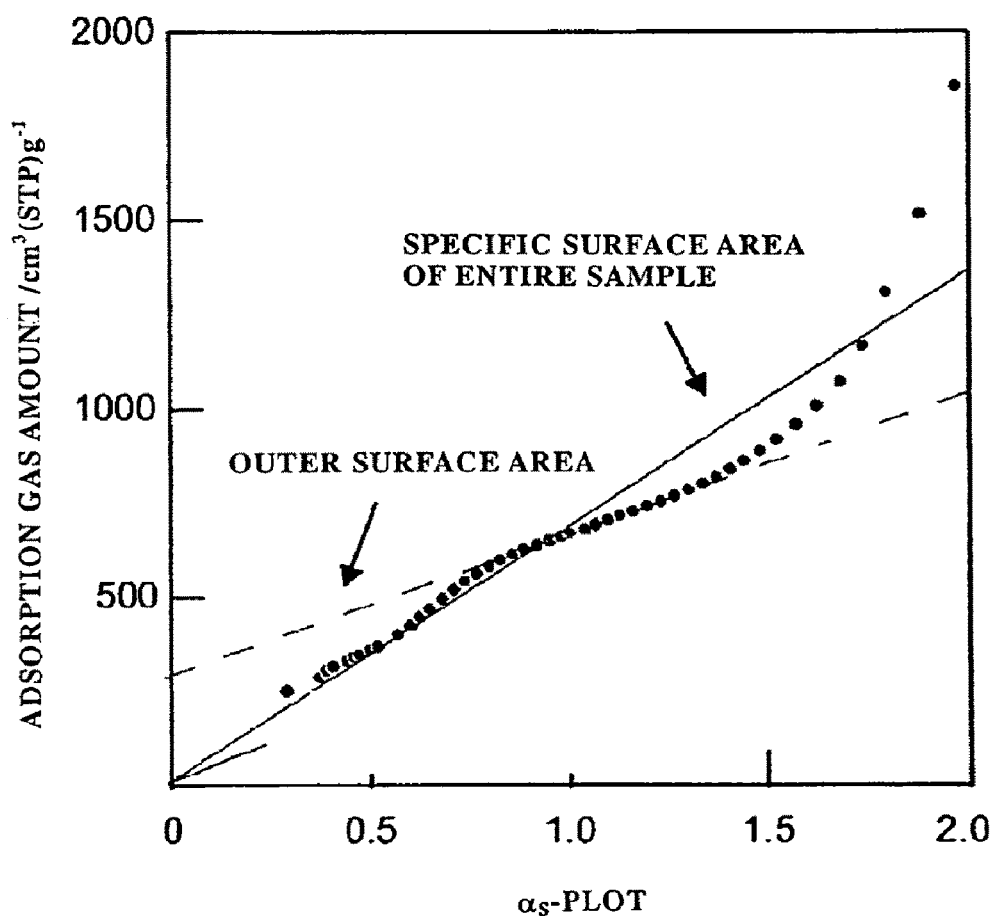
FIG. 9 shows an $\alpha_s$ plot diagram for an aligned single-walled CNT aggregate applied with the opening treatment.

The adsorption/desorption isothermal curve of an aligned single-walled CNT aggregate applied with an opening treatment by the method described in the Journal of Carbon, vol. 45, p 722-726 (2007) (up to 500° in dry air at a temperature elevation rate of 1° C./min) is characterized by a large rising in initial adsorption and by showing a convex form in a region of a relative pressure of 0.5 or lower as shown in FIG. 8. Further, as shown in FIG. 9, also the $\alpha_s$ plot does not show a linearity in which the increment of the adsorption amount is relatively large in a region of 0.7 or lower and relatively small in a region of 0.7 or higher and it shows a convex form in a region of 1.0 or lower.

The specific surface area of the aligned single-walled CNT aggregate can be derived in the $\alpha_s$ plot from a region of 0.7 or lower where the increment of the adsorption amount is large. In a case of a sample in FIG. 8, it was 2236 m$^2$/g and it was found that the specific surface area increased by the opening treatment.

The adsorption/desorption isothermal curve and the $\alpha_s$ plot show a convex form because adsorption is generated on the inner surface and the outer surface in the CNT opened. That is, it can be distinguished whether the CNT is not-opened or opened by measuring the adsorption/desorption isothermal curve.

Figure 10:
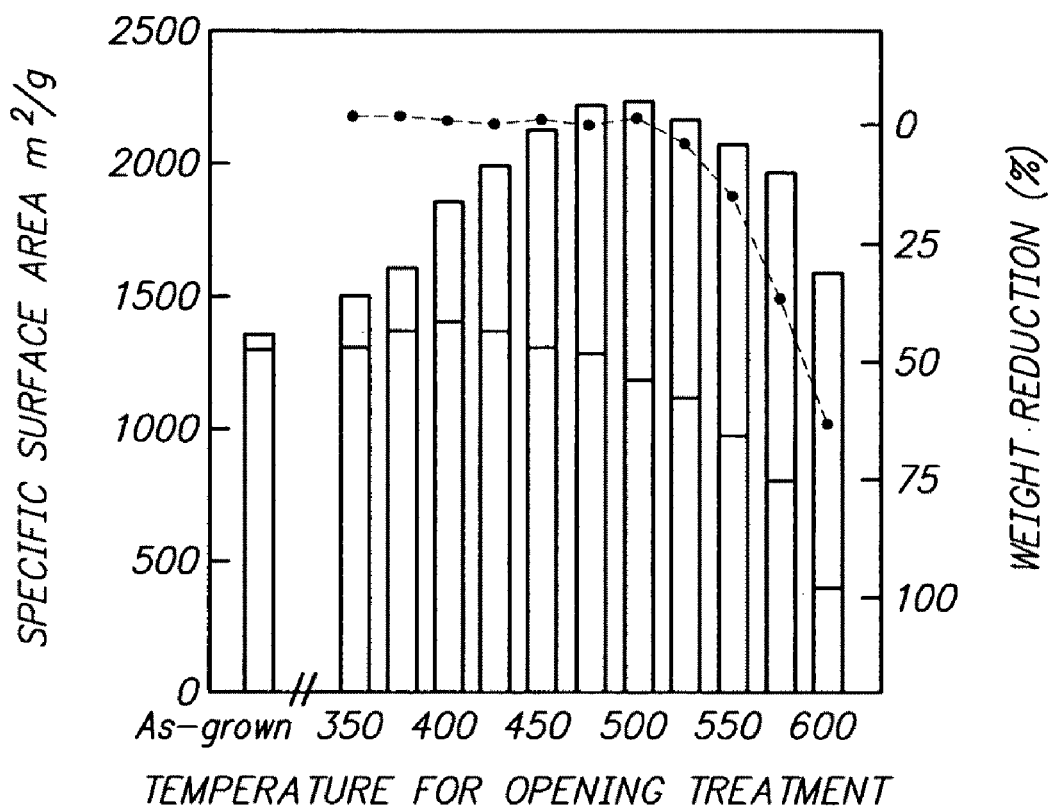
FIG. 10 is a graph showing a relation between the temperature of the opening treatment and the specific surface area of the aligned single-walled CNT aggregate.

There is a correlation between the opening treatment temperature and the specific surface area and, as shown in FIG. 10, the specific surface area of the aligned single-walled CNT aggregate could be changed within a range from 1,000 m$^2$/g to 2,300 m$^2$/g continuously by changing the opening treatment temperature from 350° C. to 600° C.

Even when the opening treatment is applied, it could be that not all of CNT are opened.

In the aligned single-walled CNT aggregate, not-opened CNT and opened CNT may be present in admixture to a degree where the deteriorating of the properties are not serious.

The aligned single-walled CNT aggregate having such an extremely high specific surface area has not been obtained so far and has been obtained for the first time by the invention. The reason why the specific surface area of the aligned single-walled CNT aggregate according to the invention is extremely large is attributable to the provision of the following conditions.

1. The Aligned CNT Aggregate Comprises Single-Walled CNTs.

In the aligned CNT aggregate comprising multi-walled CNTs, since nitrogen atoms cannot diffuse between carbon layers of CNTs, the specific surface area is decreased greatly. For example, the specific surface area of an aligned double-walled CNT aggregate is about one-half of that of the aligned single-walled CNT aggregate. The content of the single-walled CNT in the aligned CNT aggregate of the invention was 99.5% or more when determined from transmission electron microscopic (hereinafter also referred to as TEM) images (refer to FIG. 13).

2. Single-Walled CNT Constituting Aligned CNT Aggregate is of High Purity.

For obtaining a high specific surface area, it is desired that the purity of the single-walled CNT is as high as possible. The purity referred to herein is a carbon purity, which shows the weight percentage of the carbon constituting the weight of the aligned single-walled CNT aggregate. There is no upper limit of the purity for obtaining a high specific surface area, but it is difficult to obtain an aligned single-walled CNT aggregate at a purity of 99.9999% or higher because of contamination during the production. When the purity is lower than 95%, it is difficult to obtain a specific surface area exceeding 1,000 $m^2/g$ in a case of a not-opened single-walled CNT. Further, in a case where metal impurities are contained and the carbon purity is lower than 95%, since metal impurities react with oxygen and prevents controlled opening of the single-walled CNT in the opening treatment process for single-walled CNT and, as a result, increase of the specific surface area becomes difficult. In view of the above, it is preferred that the purity of the single-walled CNT is 95% or higher.

The purity of the aligned single-walled CNT aggregate of the invention is obtained by elemental analysis using fluorescent X-rays. When an aligned single-walled CNT aggregate formed by the method of Example 1 to be described below was put to elemental analysis by fluorescent X-rays, carbon was 99.98%, iron was 0.013%, and other elements were not measured. Further, when the aligned single-walled CNT aggregate formed on a substrate made of nickel-iron alloy was characterized by elemental analysis by fluorescent X-rays, carbon was 99.9%, and nickel was 198 ppm and iron was 100 ppm as impurities.

3. The Average Outer Diameter of the Single-Walled CNTs Constituting the Aligned CNT Aggregate is Large, and the Full-Width at Half Maximum Representing the Range for the Outer Diameter Distribution is Large.

The single-walled CNTs constituting an aligned single-walled CNT aggregate are not independent and isolated from each other but form a bundle in which a number of single-walled CNTs are touching each other as shown in FIG. 11(a).

Figure 12:
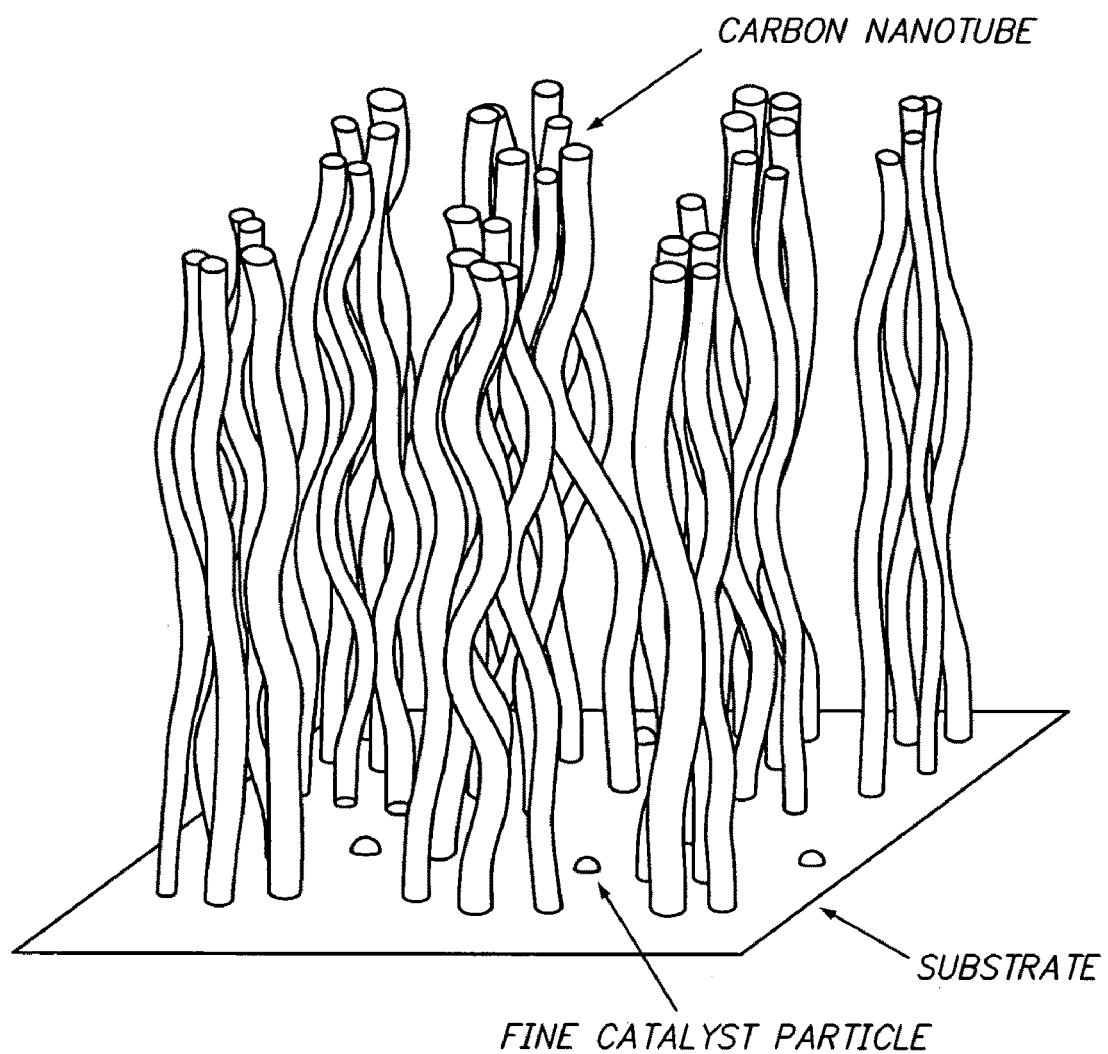
FIG. 12 is a schematic view of a bundle structure of CNTs in the aligned single-walled CNT aggregate of the invention.

The bundle of the single-walled CNTs constituting the aligned single-walled CNT aggregate of the invention comprises single-walled CNTs having a large average outer diameter (2 nm or more) a broad outer diameter distribution range (full-width at half maximum of 1 nm or more) and, in addition, low linearity (G/D ratio of 50 or less) as shown in FIG. 11(a). Then, in the aligned single-walled CNT aggregate of the invention, single-walled CNTs grown from fine particles of catalyst on the substrate are grown in the direction normal to the surface of a substrate while forming a plurality of bundles where several to several tens of CNTs are touching to each other each as shown in FIG. 12. Accordingly, a gap through which nitrogen atoms can diffuse is formed between CNTs resulting in a high specific surface area. That is, large average outer diameter and a broad outer diameter distribution range of the single-walled CNT are suitable for obtaining a high specific surface area.

For the range of the average outer diameter and the full-width at half maximum of the single-walled CNTs desired for obtaining an aligned single-walled CNT aggregate of high specific surface area, the average outer diameter is 1.5 nm or more and 4 nm or less, and the full-width at half maximum is 1 nm or more.

In a case where the average outer diameter exceeds 4 nm, since the amount of the multi-walled CNT increases, the specific surface area decreases. Further, in a case where the average outer diameter exceeds 4 nm, since the single-walled CNT tends to be deformed into a flattened shape, the specific surface area when opened is decreased. In a case where the average outer diameter is less than 1.5 nm, since many CNTs are touching each other with no gaps tending to form a large bundle, the specific surface area decreases. Further, in a case where the full-width at half maximum is less than 1 nm, that is, the outer diameter of CNT constituting the aligned single-walled CNT aggregate becomes uniform, since a number of CNTs are also adhered to each other with no gaps tending to form a large bundle, this causes decrease of the specific surface area. The full-width at half maximum has no particular upper limit.

On the contrary, as shown in FIG. 11(b), in an existent aligned single-walled CNT aggregate having a small average outer diameter (less than 1.5 nm), a narrow outer diameter distribution range (full-width at half maximum: less than 0.5 nm), and a high linearity (G/D ratio of 50 or more), it usually tends to form a bundle where the single-walled CNTs are closely packed by the number of several hundreds to several tens thousand. In this case, nitrogen atoms cannot diffuse through the gap between each of the CNTs in the bundle to decrease the specific surface area. For example, according to the description of The Journal of Carbon, vol. 41, pp 1273-1280 (2003), the HiPco single-walled CNT produced by Carbon Nanotechnologies Co. has an average outer diameter of about 0.75 nm, a full-width at half maximum of less than 0.5 nm and a high linearity. According to the description of The Journal of Nano Letters, vol. 2, pp 385 to 388 (2002), the specific surface area of such HiPco single-walled CNT is 861 $m^2/g$ even when the opening treatment is applied, which is extremely smaller compared with the specific surface area of the aligned single-walled CNT aggregate of the invention.

Figure 13:
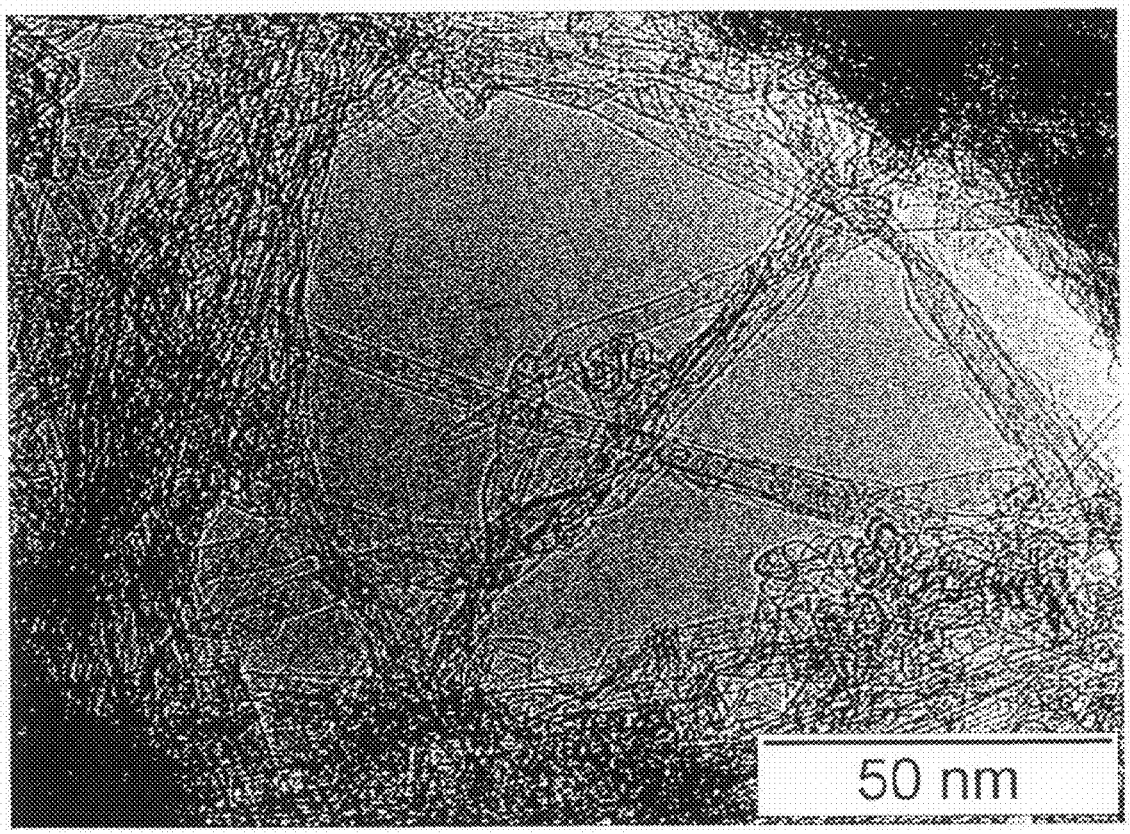
FIG. 13 shows electron microscopic (TEM) images of single-walled CNTs in the aligned single-walled CNT aggregate.
Figure 14:
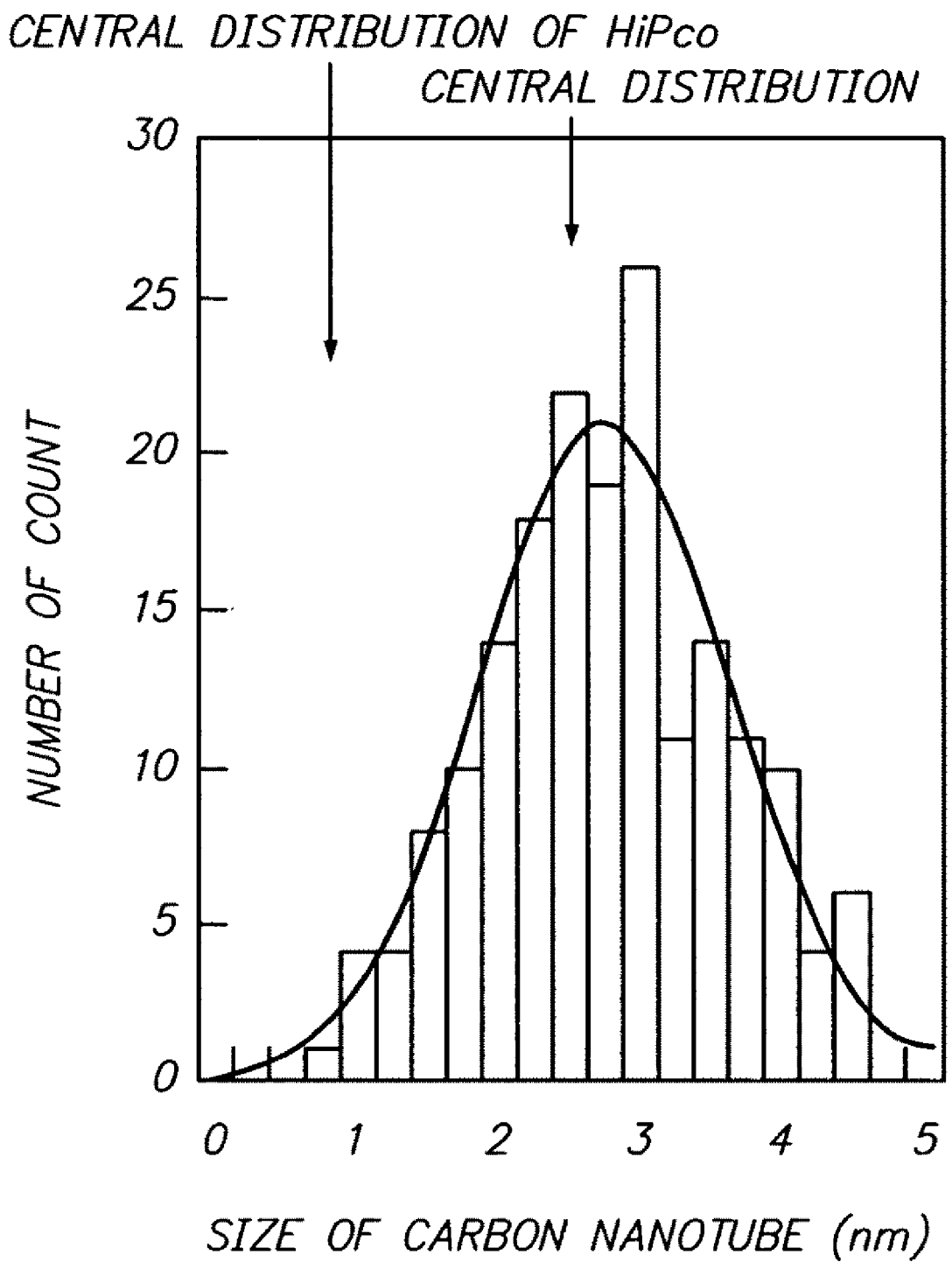
FIG. 14 is a graph showing the result of measurement for the size distribution (outer diameter) of CNT in the aligned single-walled CNT aggregate.

The average outer diameter and the full-width at half maximum of CNTs constituting the aligned single-walled CNT aggregate according to the invention can be determined based on a histogram which is prepared by measuring the outer diameter for individual CNTs from TEM images for an aligned single-walled CNT aggregate as shown in FIG. 13. FIG. 14 shows an example for the average outer diameter and the full-width at half maximum of the single-walled CNT in the aligned single-walled CNT aggregate produced according to Example 1 of the invention obtained as described above. In the case of this example, the outer diameter distributes over a range of 0.8 to 4.5 nm, the average outer diameter is 2.8 nm, and the full-width at half maximum is 2 nm. The average outer diameter and the full-width at half maximum can be controlled by the preparation of fine particles of catalyst.

Figure 15:
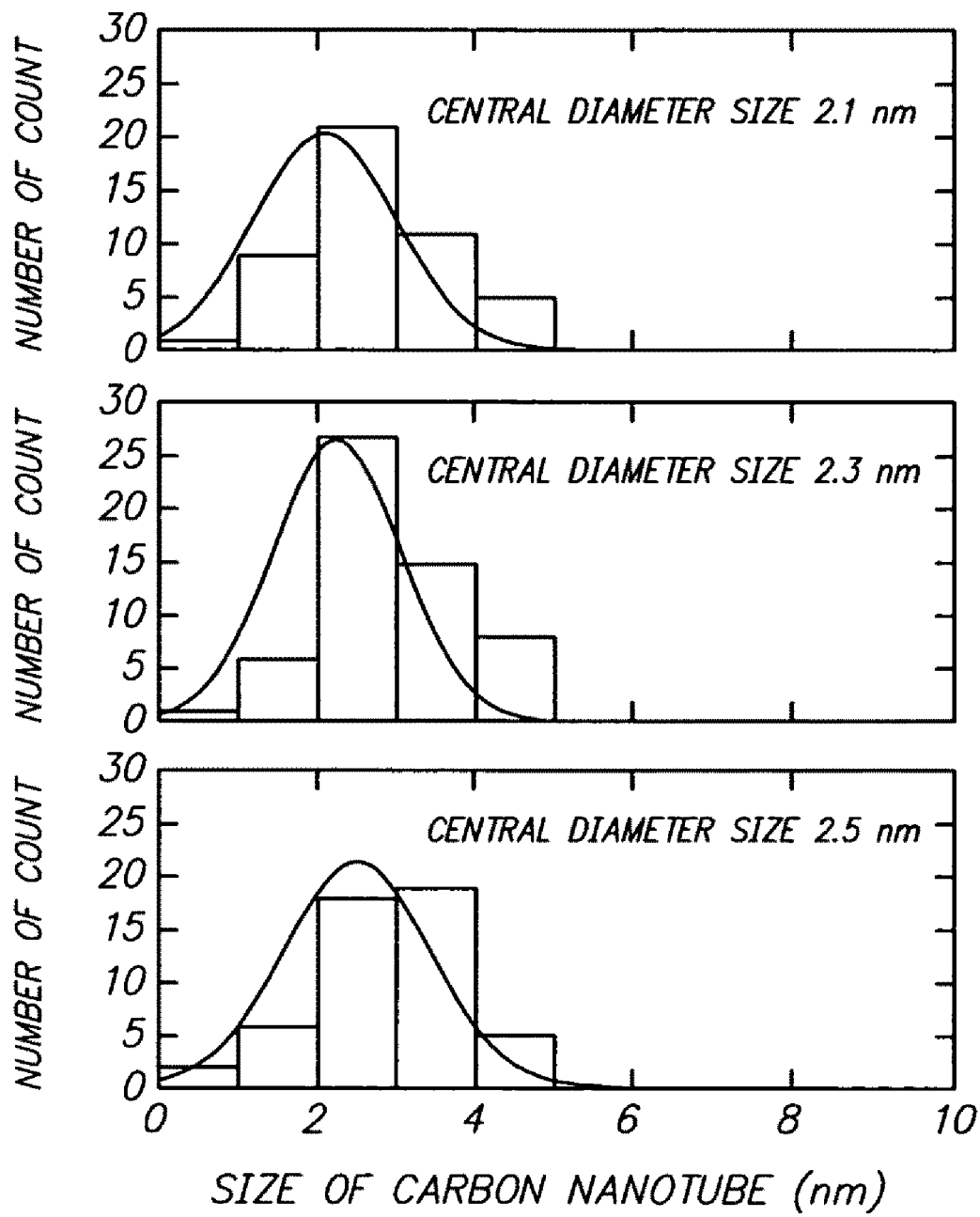
FIG. 15 is a graph showing the result of measurement for the size distribution (outer diameter) of CNT in a second aligned single-walled CNT aggregate.
Figure 16:
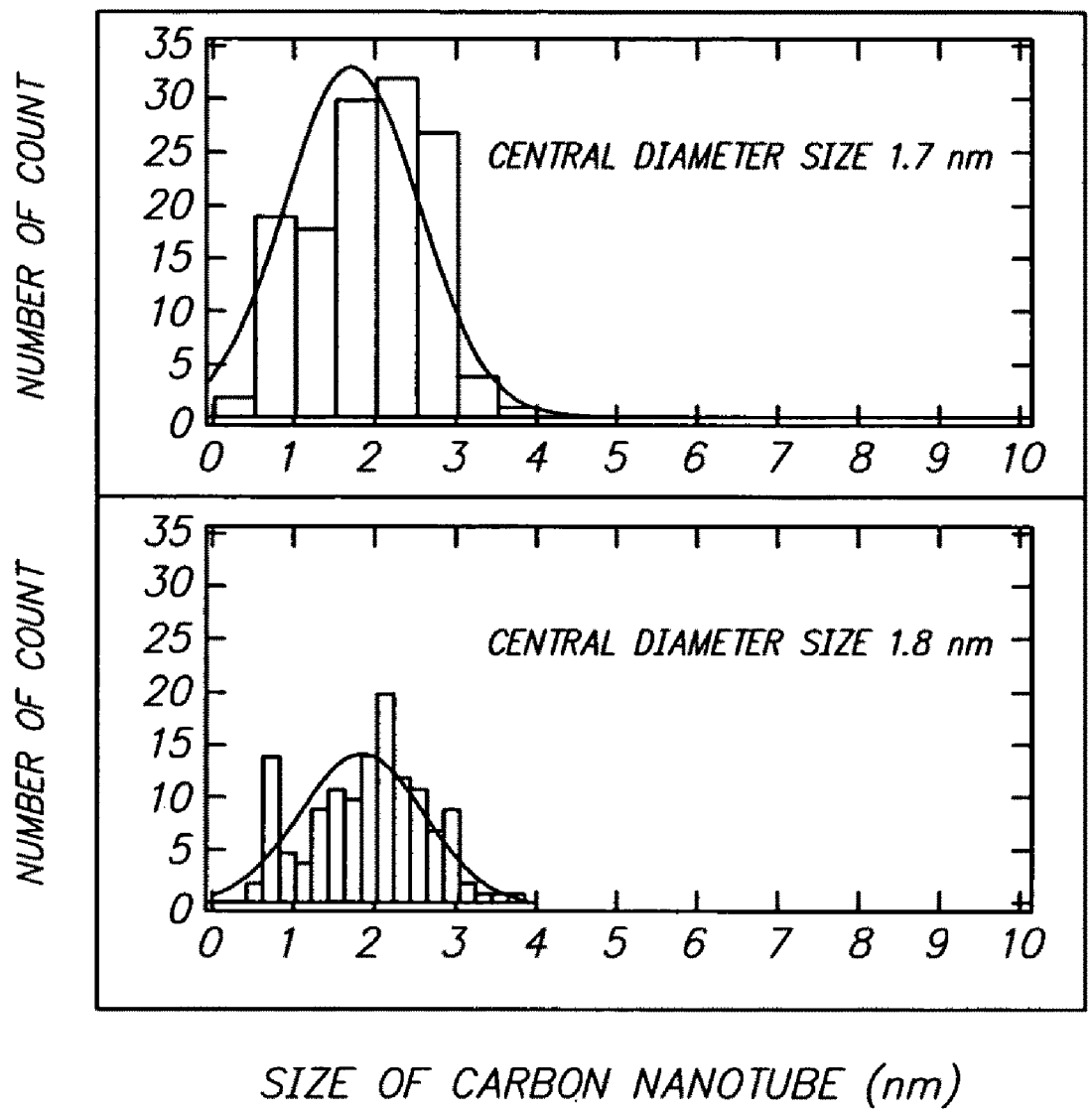
FIG. 16 is a graph showing the result of measurement for the size distribution (outer diameter) of CNT in a third aligned single-walled CNT aggregate.
Figure 17:
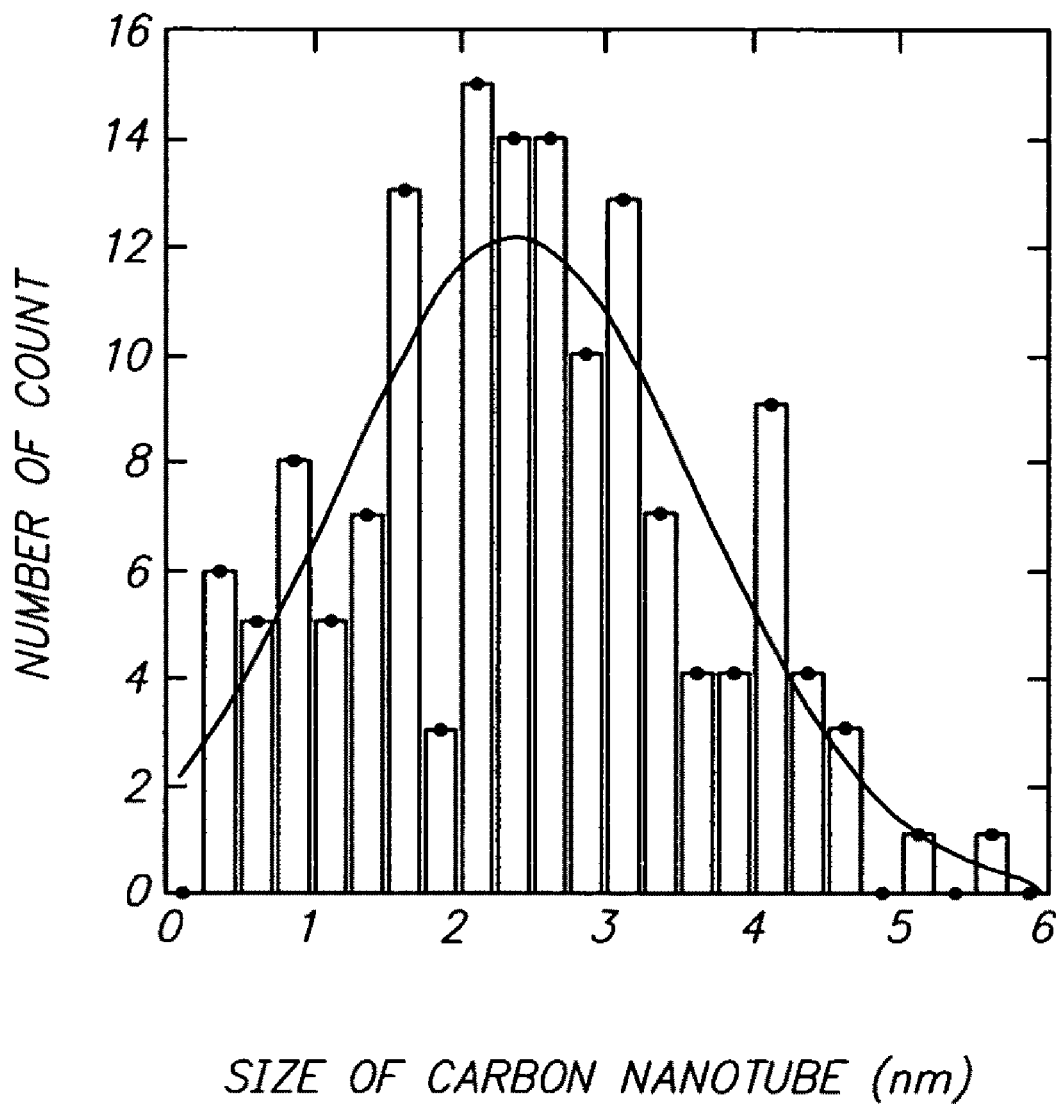
FIG. 17 is a graph showing the result of measurement for the size distribution (outer diameter) of CNT in a fourth aligned single-walled CNT aggregate.

FIG. 15 shows the result of measurement for the average outer diameter and the full-width at half maximum of the single-walled CNT in the aligned single-walled CNT aggregate formed by placing substrates each having a catalyst thickness of 1.3 nm at three places different from each other in a synthesis furnace (near the center, 4 cm to the downstream, 8 cm to the downstream) for a growth time of 5 min in the method of Example 1-2 to be described later (average outer diameter: 2.1 nm, 2.3 nm, 2.5 nm, full-width at half maximum: 2 nm) and FIG. 16 shows the result of measurement for the average outer diameter and the full-width at half maximum of the single-walled CNT in the aligned single-walled CNT aggregate in a case of defining the catalyst thickness to 0.8 nm also in the method of Example 1-2 (average outer diameter: 1.7 nm, full-width at half maximum: 1.6 nm, average outer diameter: 1.8 nm, full-width at half maximum: 1.8 nm). Further, FIG. 17 shows the result of measurement for the average outer diameter and the full-width at half maximum of the single-walled CNT in the aligned single-walled CNT aggregate in a case of defining the thickness of the catalyst to 1.3 nm in the method of Example 1 to be described later (average outer diameter: 2.5 nm, full-width at half maximum: 3 nm).

From the result of the measurement, it was found that the aligned single-walled CNT aggregate of the invention can be formed within a range of the average outer diameter of from 1.7 to 2.8 nm and within a range of the full-width at half maximum of from 1.6 to 3 nm.

4. Linearity (Crystallinity) of Single-Walled CNT is Low.

The linearity (crystallinity) of a single-walled CNT can be evaluated by the G/D ratio for Raman spectrum to be described later specifically, and a preferred range for the linearity (crystallinity) of the single-walled CNT of the G/D ratio for obtaining an aligned single-walled CNT aggregate of a high specific surface area is 1 or more and 50 or less. G/D is defined as the intensity ratio between the G-band and D-band of the Raman spectrum. The G-band originates from the C-C stretching mode at around 1590 $cm^{-1}$, and the D-band associated with defects and amorphous carbon is observed at around 1340 $cm^{-1}$.

A CNT with the G/D ratio of less than 1 has low crystallinity of the single-walled CNT and suffers from high level of amorphous carbon and, in addition, it is considered that the content of multi-walled CNTs is large. On the contrary, a CNT with the GM ratio exceeding 50 has a high linearity and tends to form a large bundle with less gap for the single-walled CNT and the specific surface area may possibly be decreased.

Figure 18:
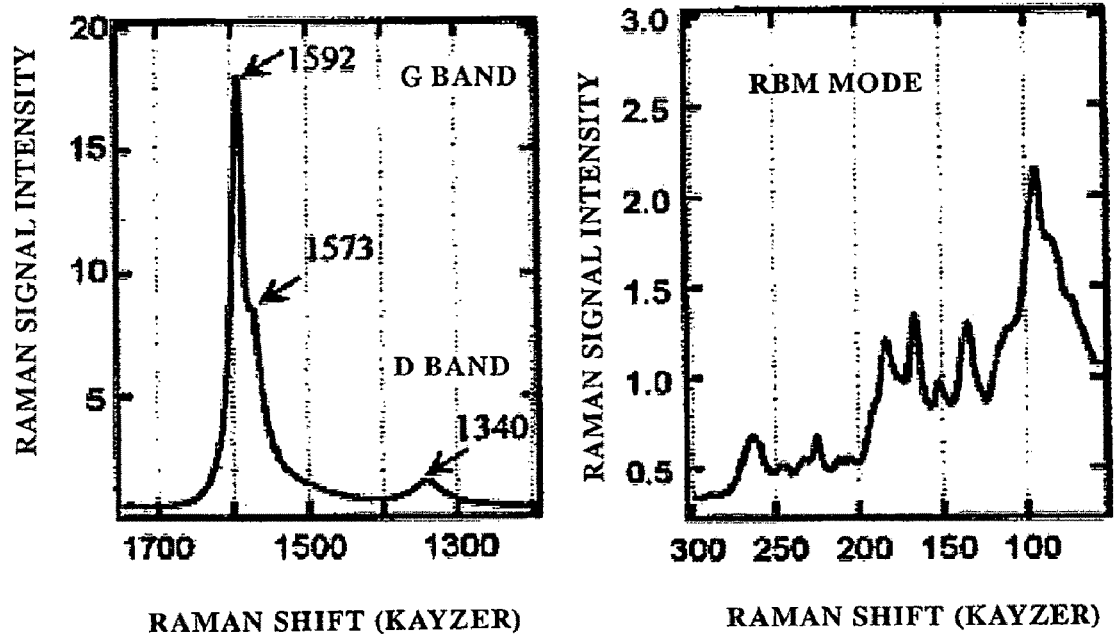
FIG. 18 is a graph showing the result of measurement for Raman spectroscopy of CNT in an aligned single-walled CNT aggregate.
Figure 19:
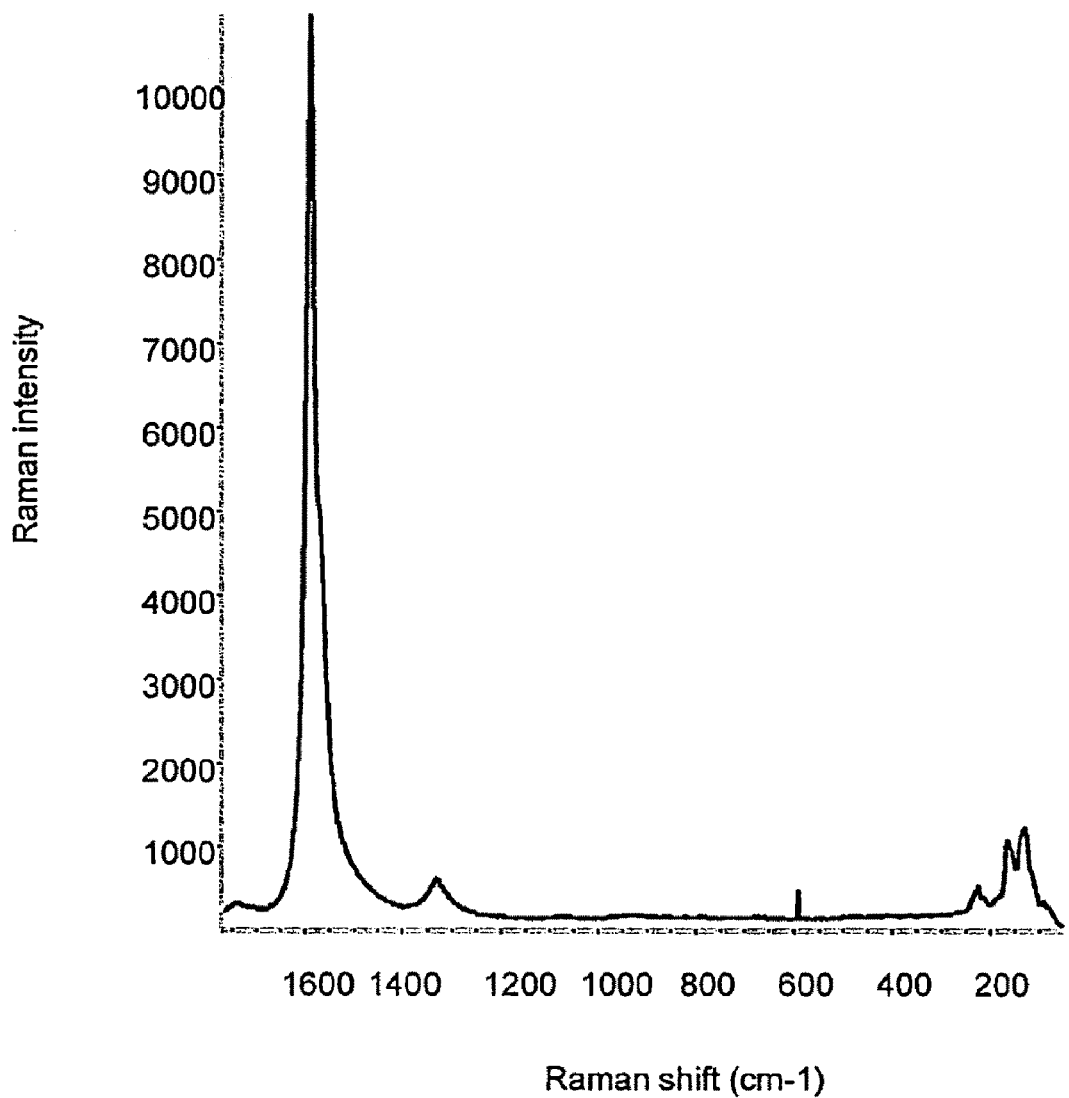
FIG. 19 is a graph showing the result of measurement for Raman spectroscopy of CNT in a second aligned single-walled CNT aggregate.
Figure 20:
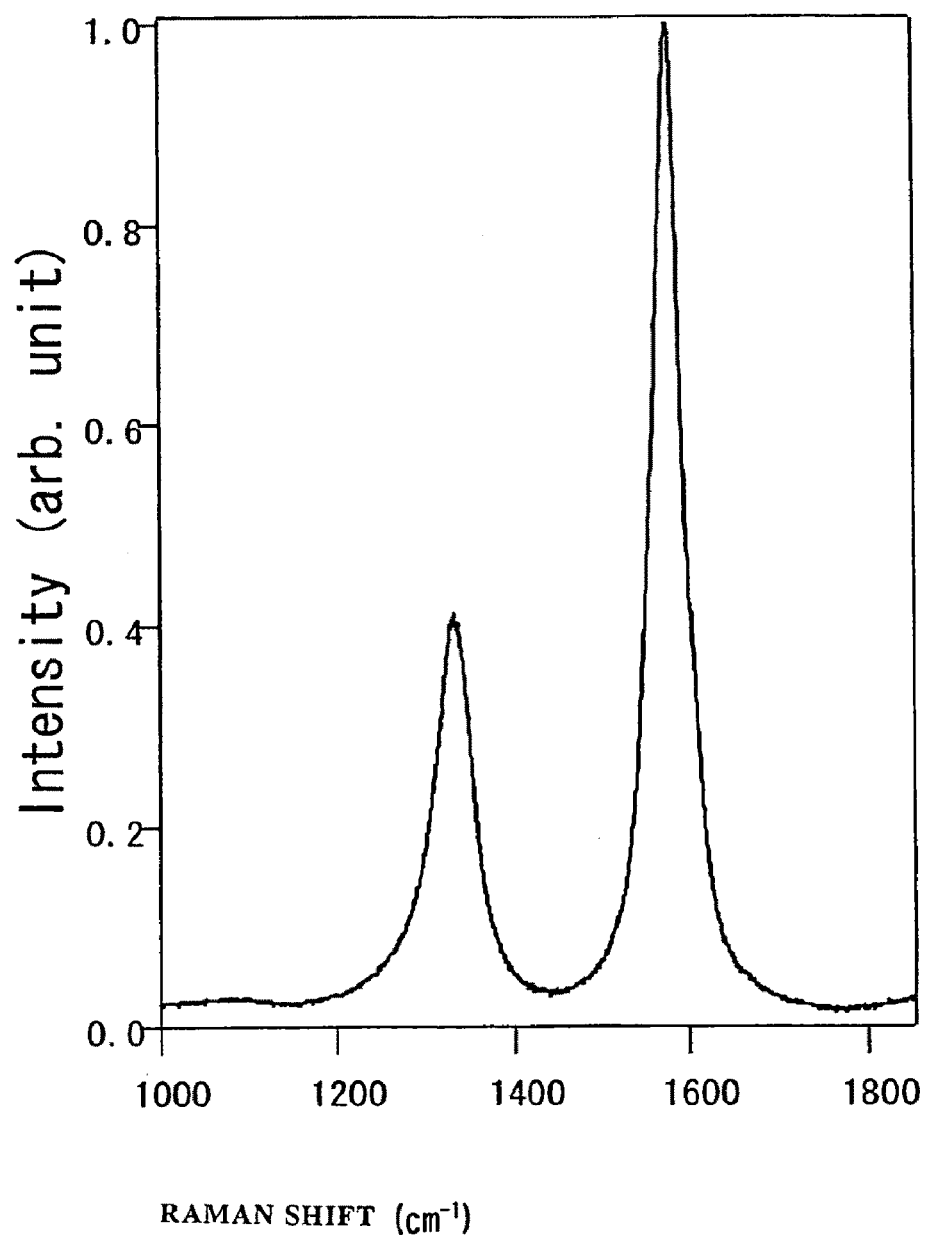
FIG. 20 is a graph showing the result of measurement for Raman spectroscopy of CNT in a third aligned single-walled CNT aggregate.

FIG. 18 to FIG. 20 show examples of Raman spectral data for aligned single-walled CNT aggregates of the invention. FIG. 18 shows the result of measurement of Raman spectroscopy (532 nm) for the aligned single-walled CNT aggregate formed by the method of Example 1 to be described later for a growth time of 10 min, FIG. 19 shows that for the aligned single-walled CNT aggregate by the method of Example 1-2 to be described below formed for the growth time of 1 min. FIG. 20 shows the result of measurement of Raman spectroscopy (532 nm) for the aligned single-walled CNT aggregate formed with the addition amount of water content being decreased to one-half in the method of Example 1-2.

In FIG. 18, a sharp. G band peak is observed near 1590 Kaiser which means that a graphitic hexagonal carbon ring structure is present in the CNTs constituting the aligned single-walled CNT aggregate of the invention. Further, a D band peak attributable, for example, to defect structure is observed near 1340 Kaiser. Further, since an RBM mode attributable to a plurality of single-walled CNTs is observed on the side of low wavenumber (100 to 300 Kaiser), it can be seen that the graphite layer is a single-walled CNT.

The intensity ratio between the G band and the D band (G/D ratio) is 15 for those shown in FIG. 18, 25 for those shown in FIG. 19, and 2.5 for those shown in FIG. 20. When TEM images (FIG. 13) were observed, it can be seen that the single-walled CNT of the invention is bent or deformed or buckled, and thus have low linearity.

On the contrary, according to the description in the Journal of J. Phys. Chem. B, vol. 110, p 5849-5853 (2006), the G/D ratio of a high quality single-walled CNT with high linearity and not containing defect structure is generally 50 or more and sometimes 200 or more.

From the abovementioned discussion, it is considered that the G/D ratio can be defined as an evaluation index for the linearity of CNT.

It is preferred that the aligned single-walled CNT aggregate of the invention satisfies all of the five conditions described above, but it is not always necessary to satisfy all the conditions for obtaining a high specific surface area and it may suffice to satisfy only a few of the conditions properly.

[Alignment Property of CNT]

While the evaluation method for alignment will be described specifically, Herman's orientation (alignment) factor calculated by using the X-ray diffraction intensity obtained by the θ-2θ method or the Laue method, or the intensity profile obtained from images obtained by fast fourier transformation of SEM images or atomic force microscopic (hereinafter referred to also as AFM) images is more than 0 and, less than 1 and, more preferably, 0.38 or more and 1 or less in the aligned single-walled CNT aggregate of the invention. The aligned single-walled CNT aggregate within a range of such alignment shows good electric property, good mechanical property, and good thermal property, also has a high specific surface area, and is highly integrated, easy to handle with, and also satisfactory in view of the shape fabrication. In addition, it shows sufficient thermal conductivity, electric, or mechanical anisotropy and is suitable to various application uses.

On the contrary, an aligned single-walled CNT aggregate with the Herman's orientation factor of less than 0 shows no alignment property. Further, in the aggregate with the Herman's orientation factor of less than 0.25, CNTs within the aggregate are offset by an average of 45° from the alignment direction and the effect of alignment would be decreased roughly to the half. Further, in the aggregate with the Herman's orientation factor of less than 0.62, CNTs within the aggregate are offset by an average of 30° from the alignment direction and the effect of alignment would be decreased considerably from a perfect alignment. Further, the aligned single-walled CNT aggregate with the Herman's orientation factor of 1 is perfectly aligned.

For the aligned single-walled CNT aggregate to show a good degree of alignment and high specific surface area, it is preferred that the aligned single-walled CNT aggregate has a height (length) within a range of 10 μm or more and 10 cm or less. The aligned single-walled CNT aggregate within the range of the height has a good degree of alignment and a high specific surface area. In a case where the height is less than 10 μm, the degree of alignment decreases. Further, in the aggregate with the height exceeding 10 cm, since it takes a long time to grow, carbonaceous impurities tend to deposit resulting in a decrease of the specific surface area. Further, the aligned single-walled CNT aggregate within the range of the height works as a single cohesive unit, is easy to handle with, and can be formed into various shapes.

The alignment property of the aligned single-walled CNT aggregate can be evaluated by the following methods.

(1) Evaluation for Alignment Property by an X-Ray Diffraction (θ-2θ Method)

Figure 21A:
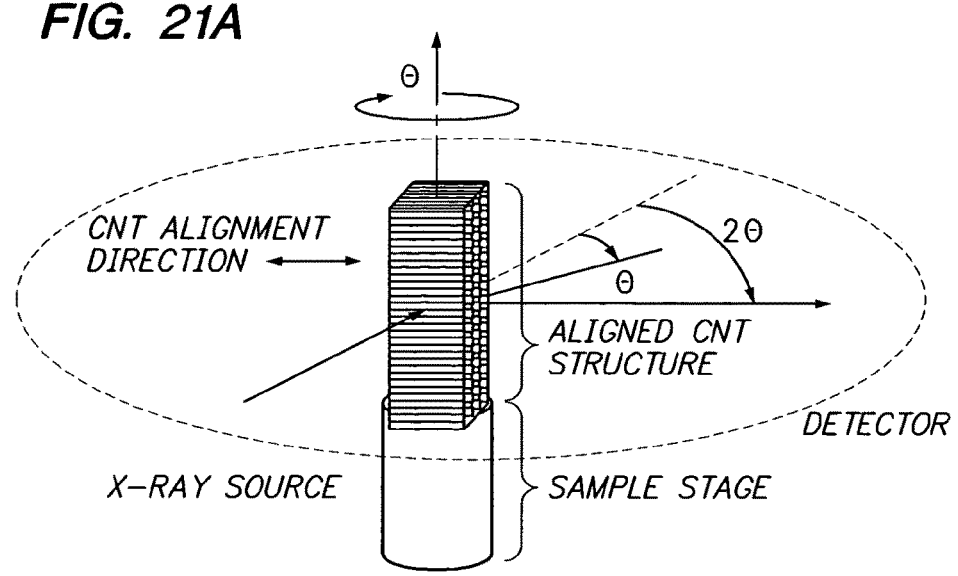
FIG. 21(a) is a perspective view thereof and FIG. 21(b) is a plan view thereof.
Figure 21B:
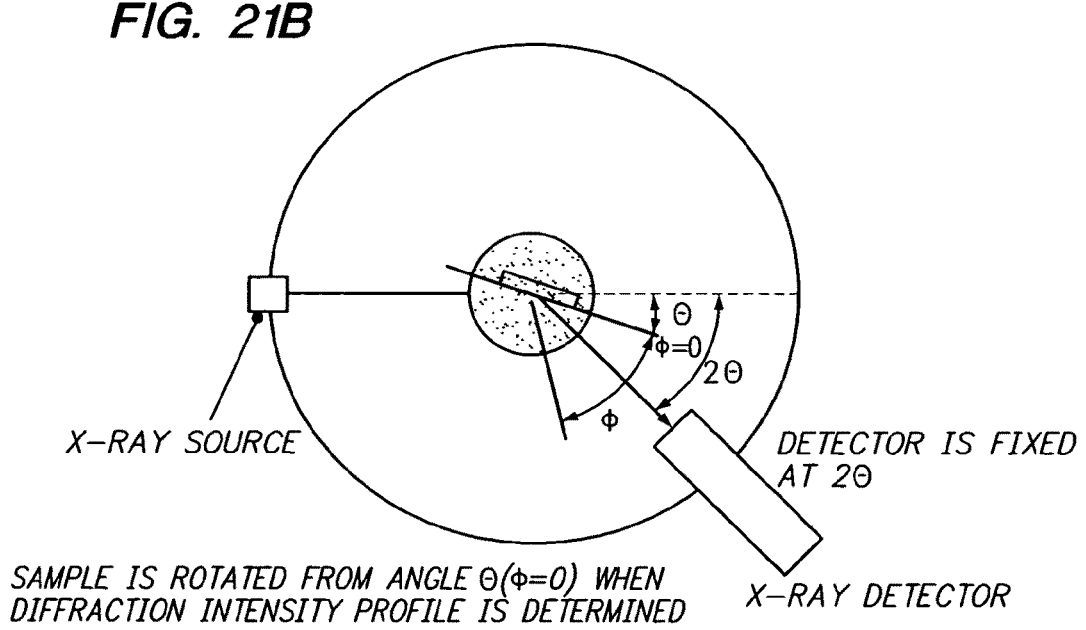

FIG. 21 shows a set up state of an X-ray diffraction apparatus by a θ-2θ method. In the constitution described above, when X-ray diffraction spectrum is measured for an object having the alignment property both for the case where X-rays are incident from the first direction parallel with the alignment direction (hereinafter referred to as parallel incidence) and for the case where X-rays are incident from the second direction perpendicular to the alignment direction (hereinafter referred to as perpendicular incidence), an angle θ and a reflection direction where the reflection intensity of the perpendicularly incidence is larger than the reflection intensity of the parallel incidence are present, and an angle θ and a reflection direction where the reflection intensity of the parallel incidence is larger than the reflection intensity of the perpendicular incidence are present.

Figure 24:
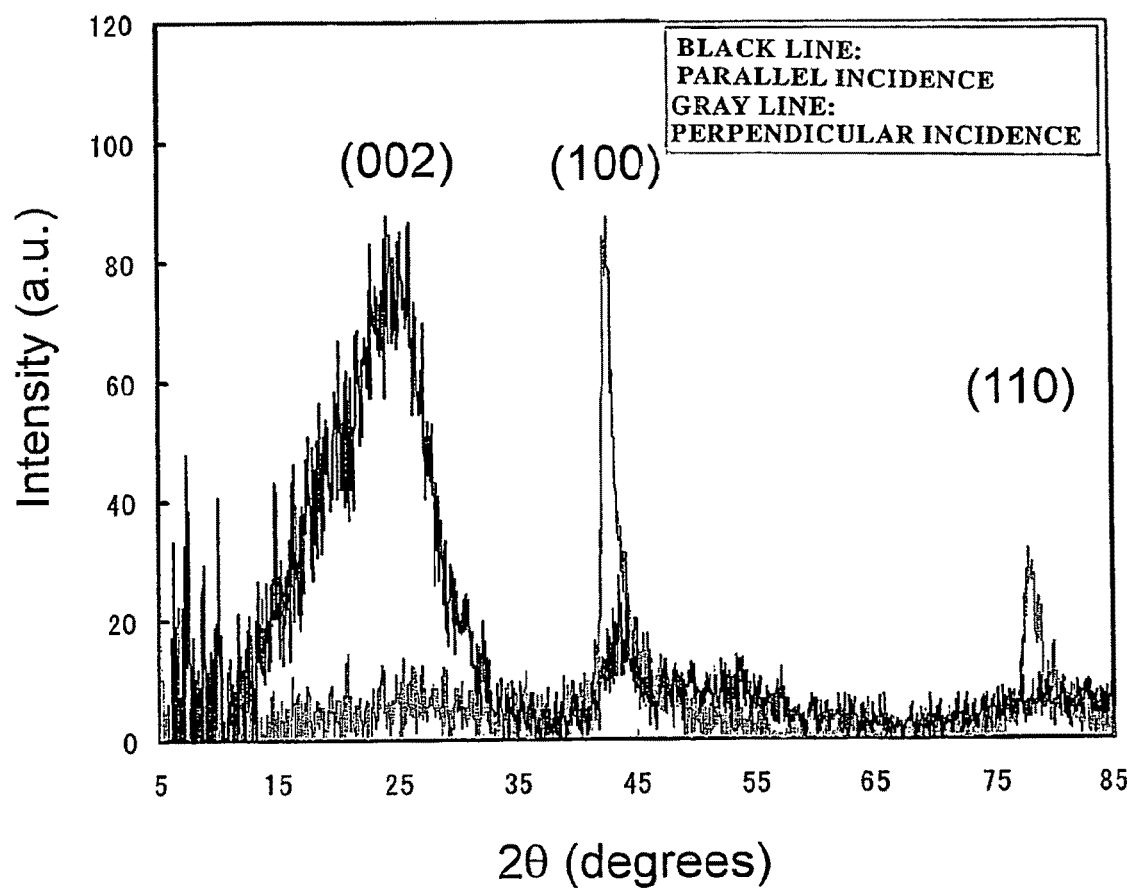
FIG. 24 is an X-ray diffraction spectral diagram for (002), (100), (110) diffraction peaks, when measuring the aligned single-walled CNT aggregate by the θ-2θ method in a case where the X-ray incident direction and the CNT alignment direction are in parallel to each other and in a case where the X-ray incident direction and the CNT alignment direction are perpendicular.

In the aligned single-walled CNT aggregate of the invention, as shown in FIG. 22 to FIG. 24, for the peak diffraction intensity of X-ray diffraction spectrum of parallel incidence, (CP=close-packing) and (002) attributable to the packing between the single-walled CNTs are higher than the perpendicular incidence, and (100) and (110) attributable to the hexagonal carbon ring structure that constitute the single-walled CNT are lower than the perpendicular incidence. Further, for the peak diffraction intensity of the X-ray diffraction spectrum of perpendicularly incidence, (CP) and (002) are lower than the parallel incidence and (100) and (110) are higher than the parallel incidence.

As, described above, in the aligned single-walled CNT aggregate of the invention, the peak diffraction intensity at (CP) and (002) and the peak diffraction intensity at (100) and (110) change greatly when the incidence direction of X-rays changes. Since the diffraction intensity does not change depending on the incident direction of X-rays in a case of a completely isotropic (non-alignment) object, this shows that the aligned single-walled CNT aggregate of the invention has anisotropy, in other words, has a high alignment property.

Table 1 shows the result of comparing the intensity ratio for each of diffraction peaks depending on the incident direction of X-rays between the aligned single-walled CNT structure (aggregate) of the invention and the not-aligned CNT structure (aggregate).

TABLE 1

| Diffraction peak | Aligned CNT structure (Ip:In) | Not-aligned CNT structure (Ip:In) |
| --- | --- | --- |
| (CP) | ~2:1 | 1:1 |
| (002) | 9:1 | 1:1 |
| (100) | 1:4.5 | 1:1 |
| (110) | 1:3 | 1:1 |

Ip = diffraction peak intensity in the direction of parallel incidence
In = diffraction peak intensity in the direction of perpendicular incidence (2) Evaluation for Alignment Property by X-Ray Diffraction (Laue Method)

Figure 25:
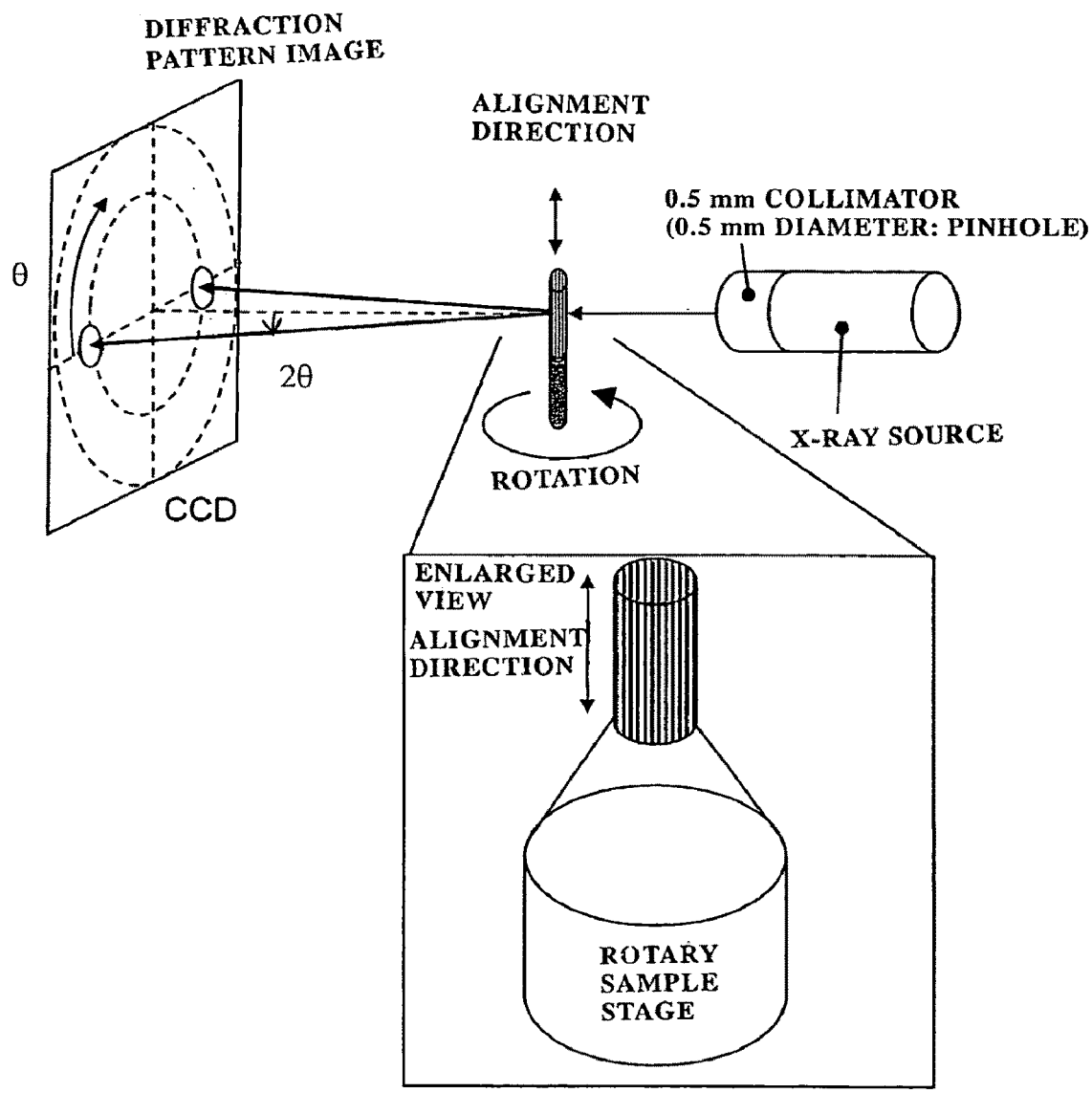
FIG. 25 is a schematic constitutional view showing a measuring apparatus by Lane method.

FIG. 25 shows a set up state of an X-ray diffraction apparatus by the Laue method. In the Laue method, a circular columnar sample of an aligned single-walled CNT aggregate is rotated on an axis parallel to the alignment direction, and X-rays passing through a pinhole collimator of 0.5 mm diameter are irradiated to the sample in the direction perpendicular to the alignment direction and refraction pattern images were focused on a CCD panel.

Figure 26:
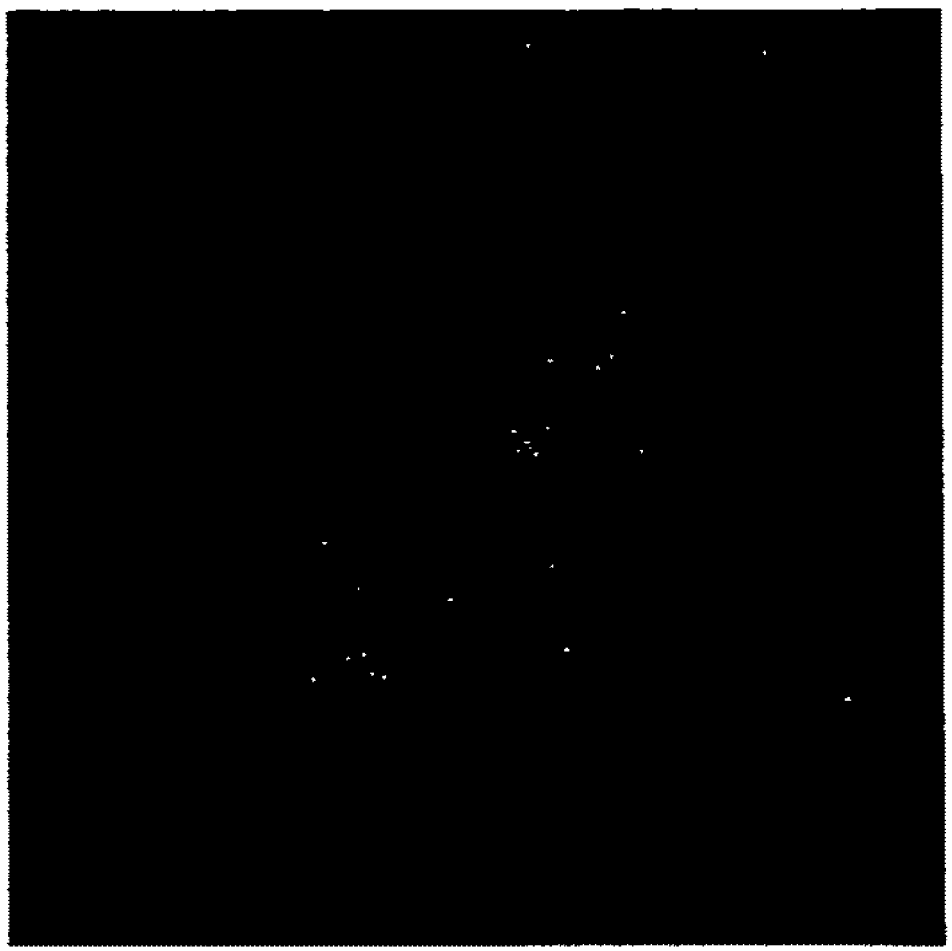
FIG. 26 shows refraction pattern images of an aligned single-walled CNT aggregate by the Laue method.

As a result, as shown in FIG. 26, pattern images for refraction peaks such as (CP), (002), (100) of a powdered aligned single-walled CNT aggregate according to the invention formed an elliptic shape. Since Lane diffraction pattern images of a completely isometric object form a perfect circular shape, this shows that the aligned single-walled CNT aggregate according to the invention has an anisotropy, that is, the aggregate is aligned.

(3) Evaluation for Alignment Property by Fast Fourier Transformation Images.

Figure 27:
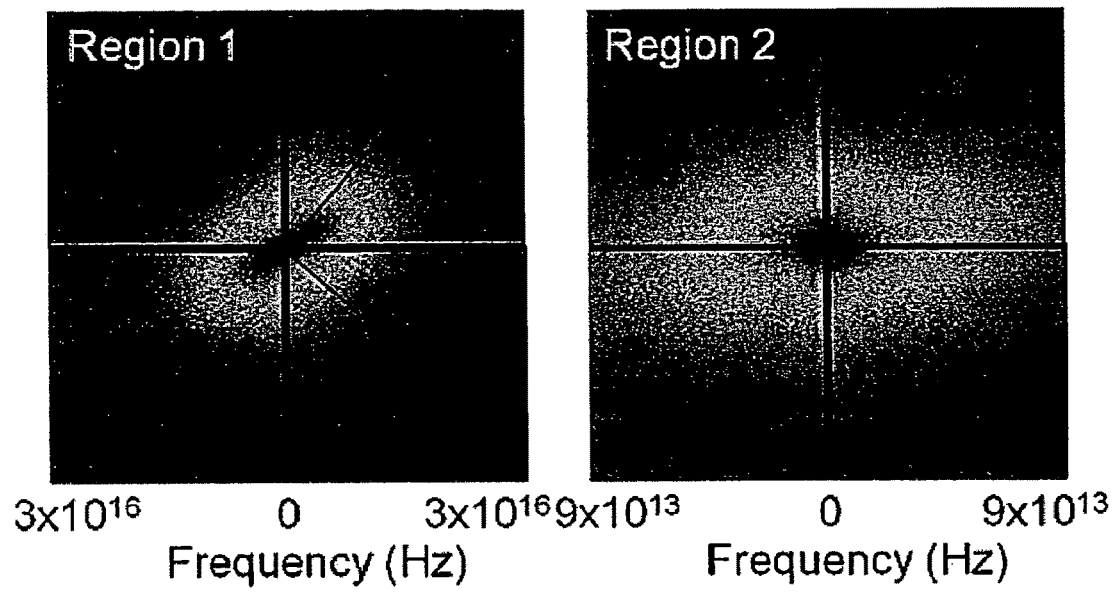
FIG. 27 shows fast Fourier transformation images for scanning electron microscopic images in FIG. 5.

FIG. 27 shows fast fourier transformation (hereinafter also referred to as FFT) images of the scanning electron microscopic images in FIG. 5 of a powdered aligned single-walled CNT aggregate. Alignment in the aggregate CNT samples is observed in the FFT images as a anisotropy in its elongated shape in FIG. 27. A perfectly isotropic sample would yield a perfectly circular FFT shape. Then, this shows that the alignment property is higher as the elongated shape is flattened more.

(4) Evaluation for Alignment Property by Herman's Orientation Factor

The orientation factor of a single-walled CNT aggregate can be evaluated quantitatively calculating the Herman's orientation factor.

Herman's orientation factor F is defined by the following equation.

$$F \equiv \frac{1}{2}(3\langle\cos^2\phi\rangle - 1) \quad [\text{Equation 1}]$$

$$\langle\cos^2\phi\rangle = \frac{\int_0^{\pi/2} I(\phi)\cos^2\phi\sin\phi \, d\phi}{\int_0^{\pi/2} I(\phi)\sin\phi \, d\phi}$$

where $\phi$ is an azimuthal angle with $\phi=0$ as a reference (standard) azimuth and $I(\phi)$ is a diffraction intensity profile.

In the Herman's orientation factor, F=1 for complete alignment and F=0 for non-alignment in the direction: $\phi=0$.

Figure 29:
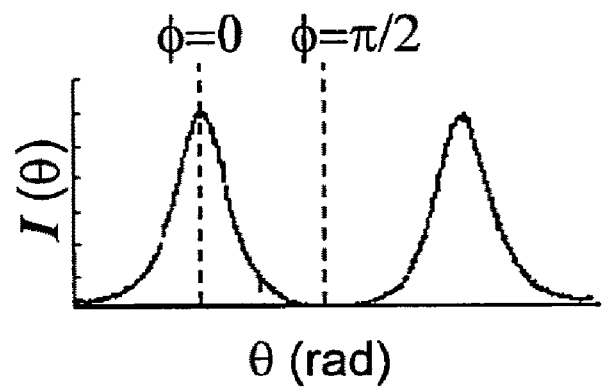
FIG. 29 shows an example of an X-ray intensity function from diffraction pattern images by the Laue method.

At first, the diffraction intensity profile $I(\phi)$ is determined. For this purpose, in a θ-2θ normal X-ray diffraction apparatus, the X-ray detector is fixed at an angle 2θ corresponding to a specific diffraction intensity, then the sample is rotated from angle θ (corresponding to an diffraction peak, defining $\phi=0$) by an angle $\phi$ (refer to FIG. 21(b)). Thus, an X-ray diffraction intensity profile $I(\phi)$ as a function of $\phi$ is obtained (refer to FIG. 29).

The Herman's orientation factor F is determined by calculating equation described above using as a variable the X-ray diffraction intensity profile $I(\phi)$ from $\phi=0$ to $\phi=\pi/2$ excluding the background (zero base line). Thus, the alignment degree for the direction: $\phi=0$ can be evaluated quantitatively.

Figure 30:
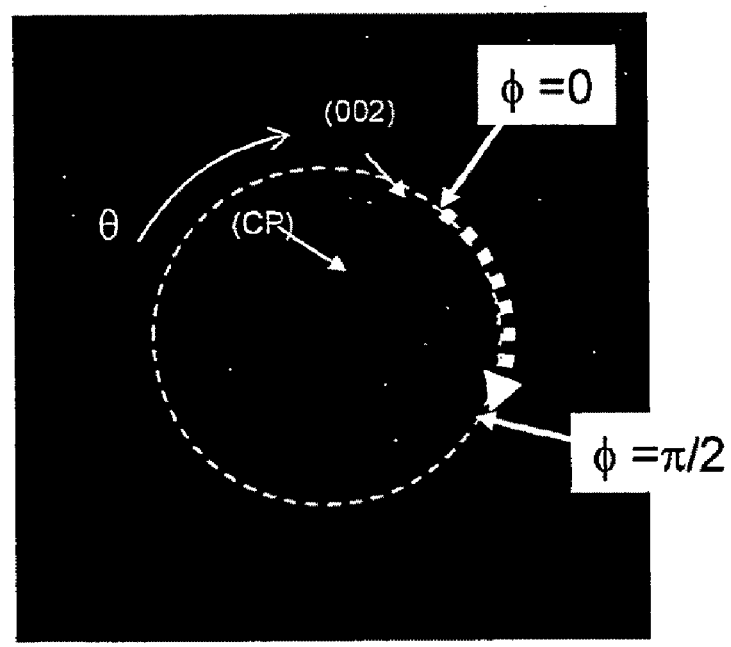
FIG. 30 is an explanatory view showing the method of deriving an X-ray intensity function from diffraction pattern images by the Laue method.
Figure 31:
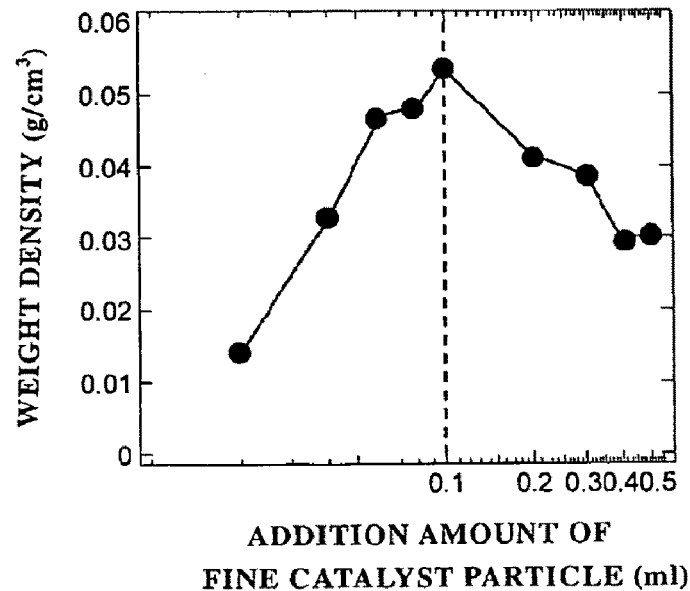
FIG. 31 is a graph showing a relation between the addition amount of fine particles of catalyst and the weight density of an aligned single-walled CNT aggregate.

In a case of determining the diffraction intensity profile $I(\phi)$ by the Laue method, the Herman's orientation factor F is determined by determining a diffraction intensity profile from the reference direction ($\phi=0$) to $\phi=\pi/2$ in the radial direction while keeping an equal distance from the original point in 2-dimensional diffraction pattern images (refer to FIG. 30), and calculating the equation described above. Thus, the alignment degree for the direction: $\phi=0$ can be evaluated quantitatively.

Figure 28:
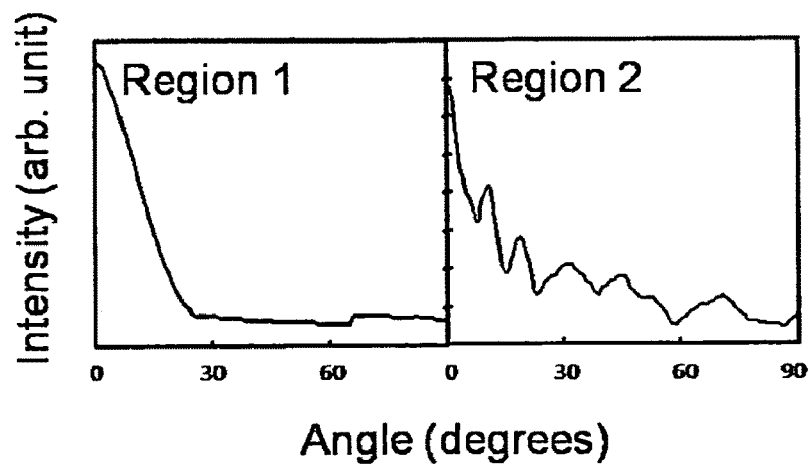
FIG. 28 shows an intensity profile determined from the fast Fourier transformation images in FIG. 27.

The alignment property can be evaluated quantitatively also by calculating the Herman's orientation factor using the intensity profiles taken from the FFT images (FIG. 27) based on SEM images, etc. of an aligned single-walled CNT aggregate. In this case, the intensity profile is determined from the reference direction ($\phi=0$) to $\phi=\pi/2$ in the radiation direction while keeping an equal distance from the center of FFT images, and this is defined as a diffraction intensity profile (FIG. 28). The reference direction is defined as the outermost peak of the elongation in the FFT image. The diffraction intensity profile shows the profile of the periodicity along the azimuthally path beginning from the outermost peak on the FFT image. The radial distance from the center corresponds to different length scales in real space. For example, the distance in real space corresponding to the distance of $30\times10^{13}$ Hz from the center of FFT images is 100 nm. By calculating the equation described above using the diffraction intensity profile, the alignment degree in the reference direction can be evaluated quantitatively.

[Weight Density]

The weight density of the aligned single-walled CNT aggregate of the invention is from 0.002 to 0.2 g/cm$^3$. The weight density can be controlled by controlling the density and the size of the fine particles of catalyst. For example, FIG.

31 shows a relation between the addition amount of the fine particles of catalyst used to grow the aligned single-walled CNT aggregate formed under the condition of Example 1 to be described later and the weight density of the aligned single-walled CNT aggregate formed by using fine iron particle with which the catalyst is synthesized by a method described in the Journal of Chem. Mater. vol. 13, pp 1008 (2001). Thus, it can be seen that the weight density of the aligned single-walled CNT aggregate can be controlled in the range of 0.01 to 0.055 $g/cm^3$ by changing the addition amount of the fine particles of catalyst.

Figure 32:
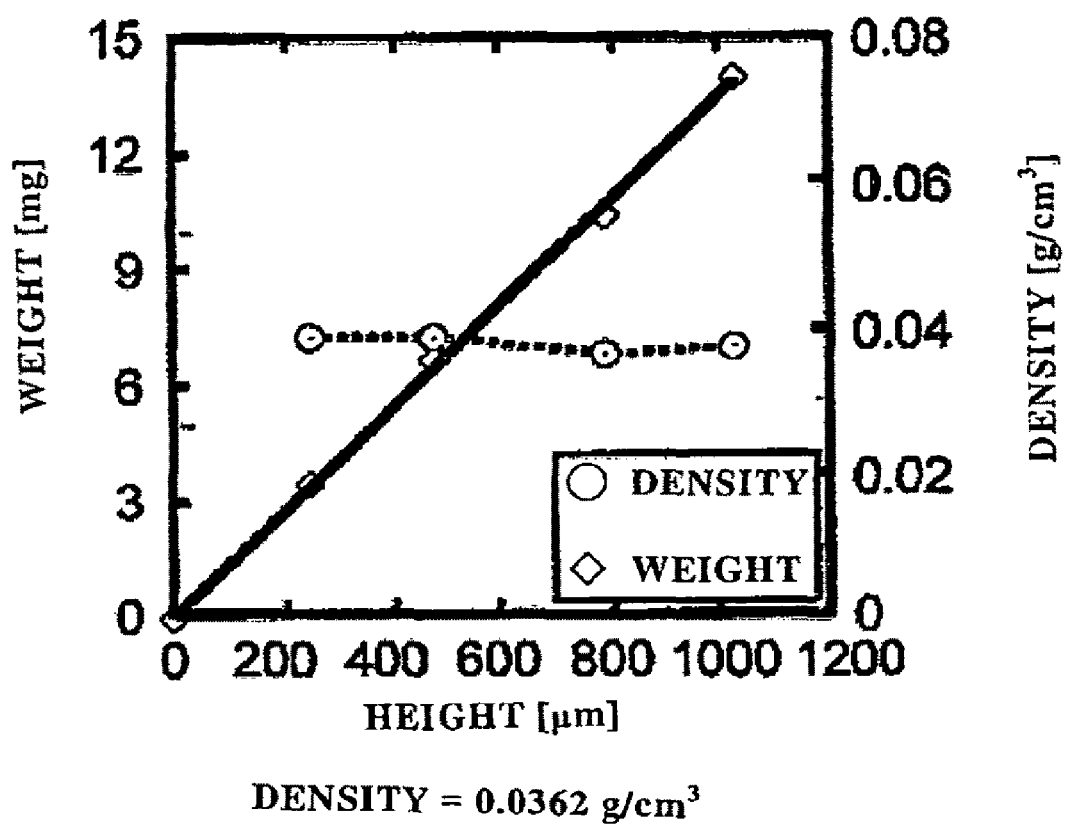
FIG. 32 is a graph showing a relation for height-weight and height-density of an aligned single-walled CNT aggregate.

FIG. 32 shows an example of a relation between the growth height, and the weight and the density of the single-walled CNT aggregate of the invention. In view of the graph, it can be seen that the weight increases in proportion to the growth height and the structure of the aligned single-walled CNT aggregate is homogenous irrespective of the growth height. Then, when the weight density is defined as a quotient of a volume divided by the weight of an aligned single-walled CNT aggregate, it can be seen that the weight density is almost constant (0.036 $g/cm^3$) irrespective of the growth height.

In a case where the weight density is within a range from 0.002 $g/cm^3$ to 0.2 $g/cm^3$, adjacent CNTs can be packed at a high density with no gaps like a flattened field of corn by way of a density-increasing process. In this case, by controlling the process of the density-increasing treatment by utilizing, for example, a method described in the Journal of Nature Materials, vol. 5, pp 987-994 (2006), the aligned single-walled CNT aggregate can be formed in various forms, for example, of a film at a high density.

In a case where the weight density is less than 0.2 $g/cm^3$, since adhesion between CNTs constituting the aligned single-walled CNT aggregate is weak, the aligned singled walled CNT aggregate can be easily dispersed homogeneously when they are stirred in a solvent or the like. On the contrary, in a case where the weight density exceeds 0.2 $g/cm^3$, it is not only difficult to obtain a homogenous liquid dispersion but also the rigidity and the integrity of the aligned single-walled CNT aggregate become excessive making it difficult to apply the density-increasing treatment after the growth, thereby forming the same into various shapes. Further, in a case where the weight density is less than 0.002 $g/cm^3$, since the integrity of the aligned single-walled CNT aggregate is lost the aligned single-walled CNT aggregate tend to be disintegrated, and the molding fabrication becomes almost impossible.

[Production Method]

Figure 33:
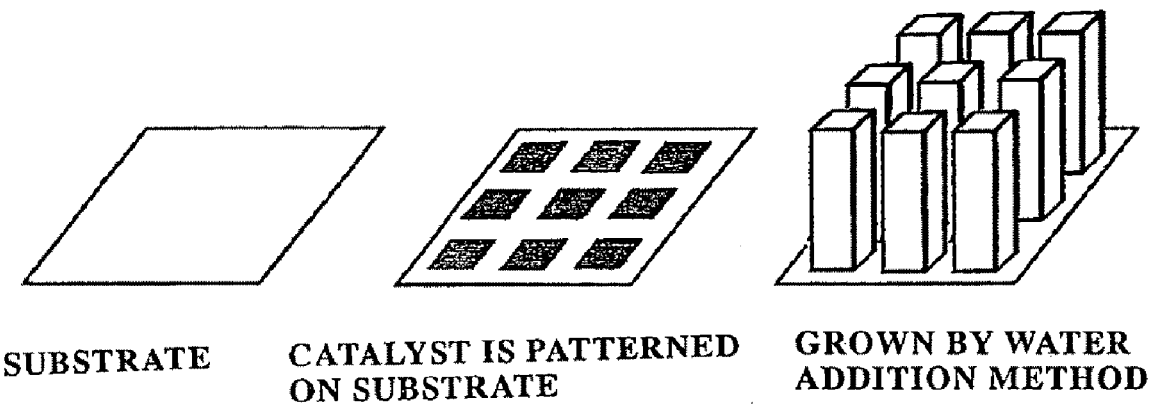
FIG. 33 is a schematic step chart showing the outline of producing steps for a patterned bulk aligned single-walled CNT aggregate.

For producing the aligned single-walled CNT aggregate according to the invention, known CVD method can be applied. As in the outlined process schematically showing FIG. 33, this is a method of patterning a thin film of a metal catalyst on a substrate and chemically vapor phase growing a plurality of single-walled CNTs to the metal catalyst.

Figure 34:
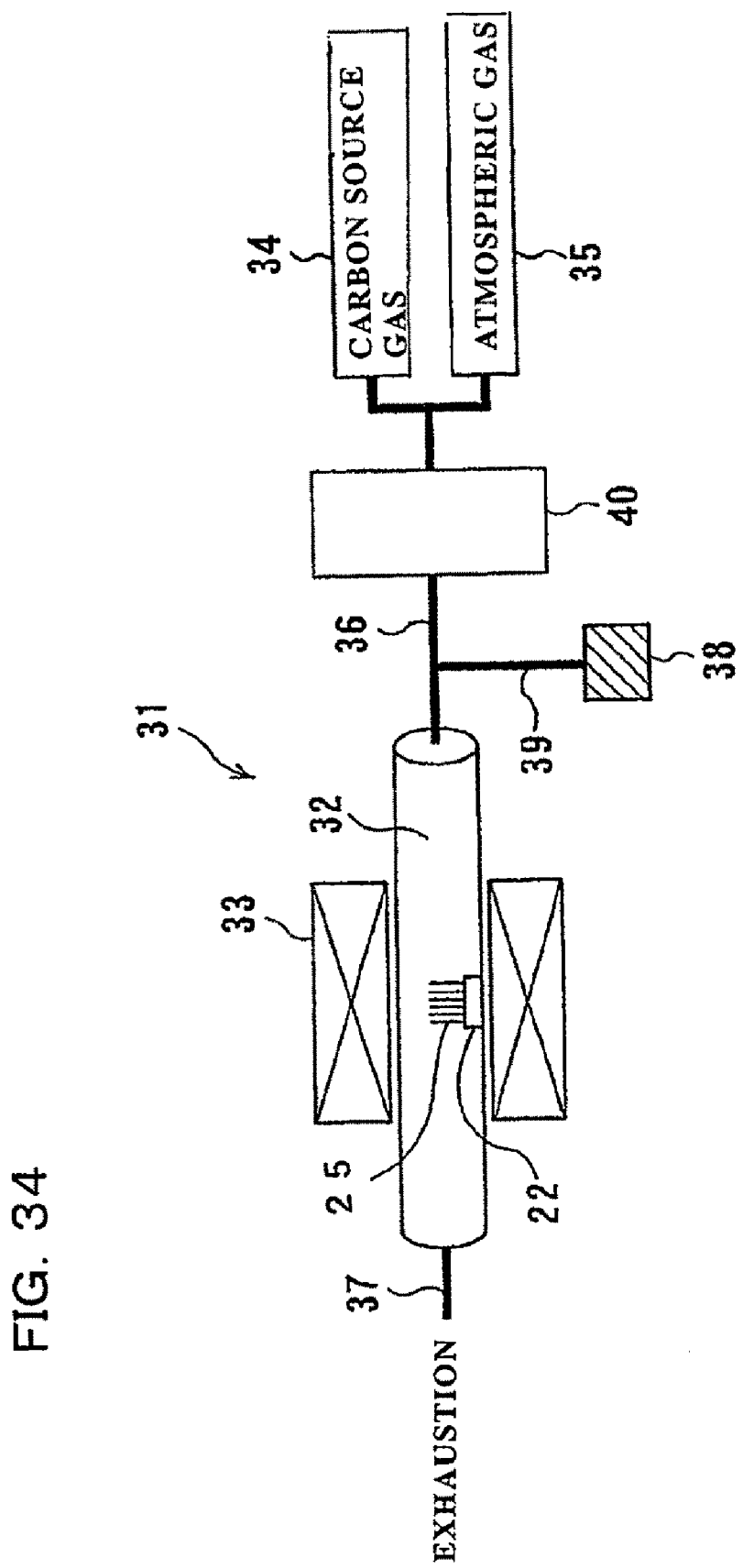
FIG. 34 is a schematic constitutional view showing the outline of a production apparatus for an aligned single-walled CNT aggregate.

FIG. 34 shows an example of a CVD apparatus applied with the present invention. The CVD apparatus includes a tubular reaction chamber 32 (30 mm diameter, 360 mm heating length) comprising quartz glass for containing a substrate 22 that supports a metal catalyst, a heating coil 33 disposed so as to externally surround the reaction chamber 32, a supply pipe 36 connected to one end of the reaction chamber 32 so as to supply a carbon source gas 34 and an atmospheric gas 35, an exhaustion pipe 37 connected to the other end of the reaction chamber 32, and a catalyst activator supply pipe 39 connected to an intermediate portion of the supply pipe 36 so as to supply a catalyst activator 38. Further, for supplying an extremely small amount of the catalyst activator under control at a high accuracy, a purifying device 40 for removing a catalyst activator from the carbon source gas 34 and the atmospheric gas 35 is disposed to the supply pipe 36 for the carbon source gas 34 and the atmospheric gas 35. Further, although not illustrated, control devices including a flow control valve, a pressure control valve, etc. are located at appropriate positions.

For the metal catalyst used in the invention, any of those that have been produced actually for existent CNTs can be used and they specifically includes, for example, an iron chloride thin film, an iron thin film formed by sputtering, an iron-molybdenum thin film, an alumina-iron thin film, an alumina-cobalt thin film, as well as an alumina-iron-molybdenum thin film, aluminum-iron thin film, aluminum-iron-molybdenum thin film and a copper thin film.

As the existent amount of the catalyst, the catalyst can be used within such a range of amount that has been used actually in the production of existent CNT. For example, in a case of using iron, the thickness is, preferably, 0.1 nm or more and 100 nm or less, more preferably, 0.5 nm or more and 5 nm or less and, particularly preferably, 0.8 nm or more and 2 nm or less. Further, the existent area of the catalyst can be set optionally in accordance with the size of the CNT structure to be produced.

The substrate for supporting the catalyst includes, for example, thin films, sheets, plates, powders, and porous materials of metals such as iron, nickel, chromium, molybdenum, tungsten, titanium, aluminum, manganese, cobalt, copper, silver, gold, platinum, niobium, tantalum, lead, zinc, gallium, indium, germanium, arsenic, phosphorus, and antimony, as well as alloys containing such metals or oxides thereof and, in additions, wafers or thin films of non-metals such as silicon, quartz, glass, mica, graphite, and diamond and, ceramics.

In the production method of the invention, the shape of the aligned single-walled CNT aggregate can be controlled optionally such as a thin film shape, a circular columnar shape, a square columnar shape and other complicated shapes depending on the patterning of the catalyst formed above the substrate and the growth type of CNT.

Particularly, in the aligned single-walled CNT aggregate of the thin film shape, although the thickness (height) is extremely small compared with the the length and the width, the length and the width can be controlled by the pattern of the patterned catalyst and the thickness (height) can be controlled optionally by the growth time.

Such a plurality of single-walled CNTs aligned and aggregated, and patterned to a predetermined shape have been obtained for the first time by the inventors of the present application.

As the catalyst patterning method, known methods can be used properly irrespective that they are a wet process or a dry process so long as the catalyst metal can be patterned directly or indirectly to a substrate. Specifically, a method of vapor depositing a metal catalyst to a substrate by way of a mold or a mask formed by photolithography or nano-inprinting, or a method of patterning other material to which the catalyst is adsorbed selectively on the substrate by using any one of the methods described above and adsorbing the catalyst to the material can be used.

As the carbon source material used for growning CNT in the invention, hydrocarbons, among all, lower hydrocarbons such as methane, ethane, propane, ethylene, propylene, and acetylene are suitable and one or a mixture of two or more of them can be used. In addition, oxygen-containing compounds of low number of carbon atoms such as lower alcohols, for example, methanol, and ethanol, acetone, carbon monoxide, etc. may be used so long as they conform to reaction conditions.

As the atmospheric gas for the reaction, any gas that is inert at a temperature of growing CNT and does not react with growing CNT may be used and include suitably, for example, helium, argon, hydrogen, nitrogen, neon, krypton, carbon dioxide, and chlorine or a gas mixture thereof and nitrogen, helium, argon, hydrogen and a mixed gas thereof are suitable.

As the atmospheric pressure for the reaction, a range of pressure at which existent CNTs have been produced so far may be used and it is, preferably, $10^2$ Pa or higher and $10^7$ Pa (100 atm) or lower, more preferably, $10^4$ Pa or higher and $3\times10^5$ Pa (3 atm) or lower, and more preferably, $5\times10$ Pa or higher and $9\times10$ Pa or lower.

The reaction temperature for growing CNT is properly determined while considering the metal catalyst, the carbon source, the reaction pressure, etc. In a case of including a step of adding a catalyst activator for removing by-products that cause catalyst deactivation, it is desired that the temperature is set within a range where the catalyst activator efficiently works.

The catalyst activator used herein may be any material so long as it generally contains oxygen and does not damage CNT at the growth temperature and, water vapor, as well as hydrogen sulfide, oxygen, ozone, acidic gas, nitrogen oxide, oxygen-containing compounds of low number of carbon atoms such as carbon monoxide and carbon dioxide, alcohols such as ethanol or methanol, ethers such as tetrahydrofuran, ketones such as acetone, aldehydes, esters, nitrogen oxide, and mixtures thereof are effective. Among them, water, oxygen, carbon dioxide, carbon monoxide, or ether such as tetrahydrofuran is preferred and, particularly, water are preferred.

The addition amount of the catalyst activator has no particular restriction but may be in a small amount. For example, in a case of water, it is preferably defined within a range of 10 ppm or more and 10,000 ppm less, preferably, 50 pm or more and 1,000 ppm or less and, more preferably, 200 ppm or more and 700 ppm or less.

In a case of adding the catalyst activator described above, a most desired temperature range is given by determining a temperature at which the catalyst activator can remove the by-products as a lower limit and a temperature at which CNT as the main product is not oxidized by the catalyst activator as the upper limit value. Specifically, in a case of using water as the catalyst activator, the temperature is set to, preferably, 600° C. to 1,000° C., and more preferably, 650° C. to 900° C. Further, in a case of using carbon dioxide as the catalyst activator, the temperature is preferably 1200° C. or lower and, more preferably, 1100° C. or lower.

At present, the mechanism of the function of the catalyst activator is estimated as described below.

Figure 35:
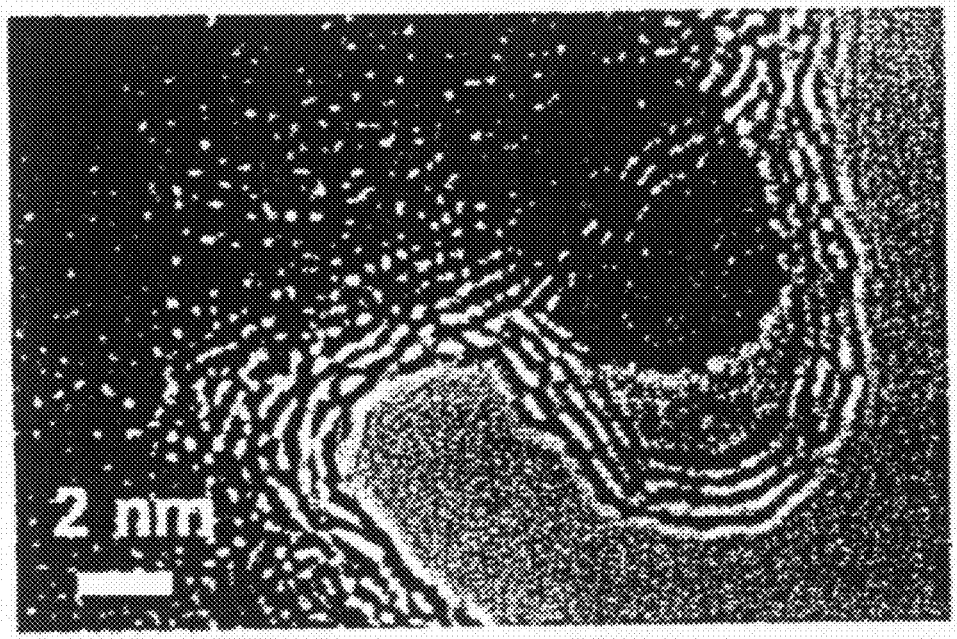
FIG. 35 shows electron microscopic (TEM) images showing the state of a catalyst deactivated by by-products.

In usual CNT growing process, by-products such as amorphous carbon or graphite are always generated, and a catalyst fails to grow CNT when covered by such by-products as shown in TEM images of FIG. 35. That is, it is considered that the catalyst is deactivated as a result of deposition of the by-products. It is considered that the catalyst is cleaned and reactivated when the catalyst activator is present in the reaction atmosphere since the by-product amorphous carbon and graphite are oxidized into CO and the like. By the effect of the catalyst activator to increase the activity of the catalyst and to extend the life time (catalyst activation effect), the amount of CNT formed is greatly increased during CVD growth reaction.

As a result that the catalyst activity is enhanced and the life time is extended by the addition of the catalyst activator, growth of CNT which terminated within 2 min without the catalyst activator continues for several tens minutes and, further, the growth yield increased by 100 times or more and, further, 1,000 times or more compared to the yield of growth without the catalyst activator. As a result of this high yield, catalyst activity, and long catalyst life time, an aligned single-walled CNT aggregate with remarkably increased height can be obtained by the catalyst activator.

Figure 36:
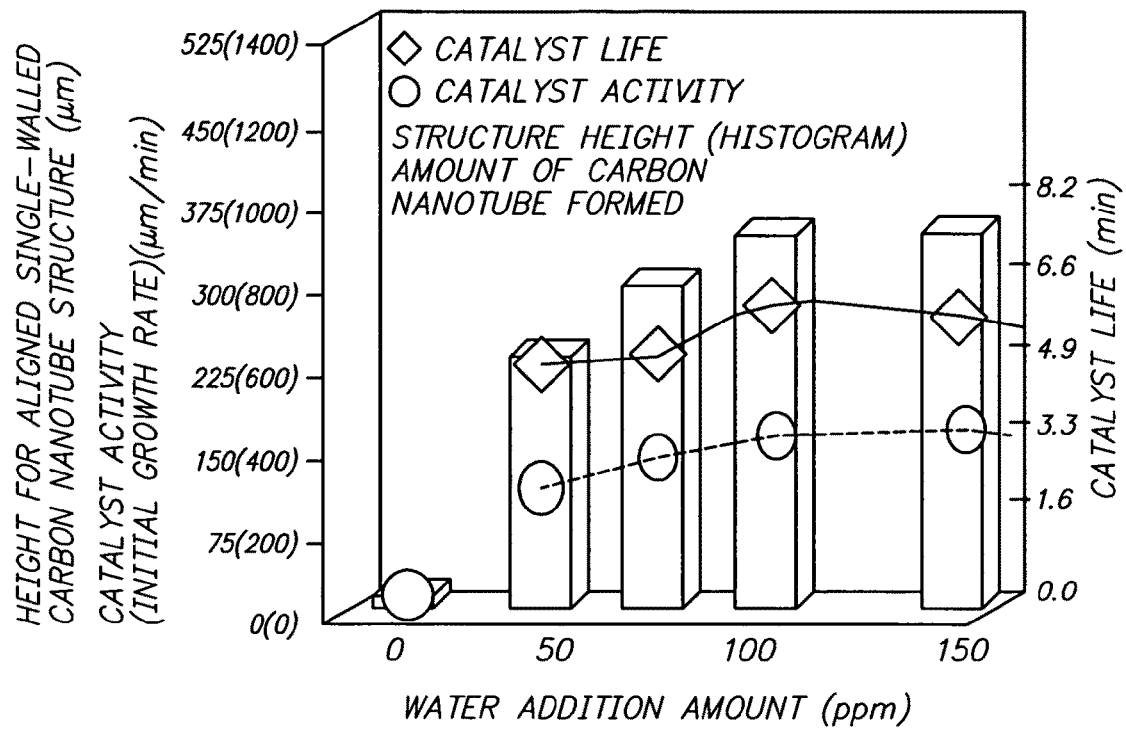
FIG. 36 is a graph showing a relation between the height of the aligned single-walled CNT aggregate, the catalyst activity (initial growth rate) and the catalyst life time, and the addition amount of water content.

FIG. 36 shows a graph of quantitatively evaluating a relation between the initial growth rate and the life time, versus the amount of water added as the catalyst activator (catalyst: iron thin film, carbon source gas: ethylene). It can be seen that the catalyst activity is increased remarkably and the catalyst life time is extended by the addition of water. On the contrary, in a case where water is not added, the catalyst activity and the catalyst life time decreased to such an level that the quantitative evaluation becomes difficult.

Figure 37:
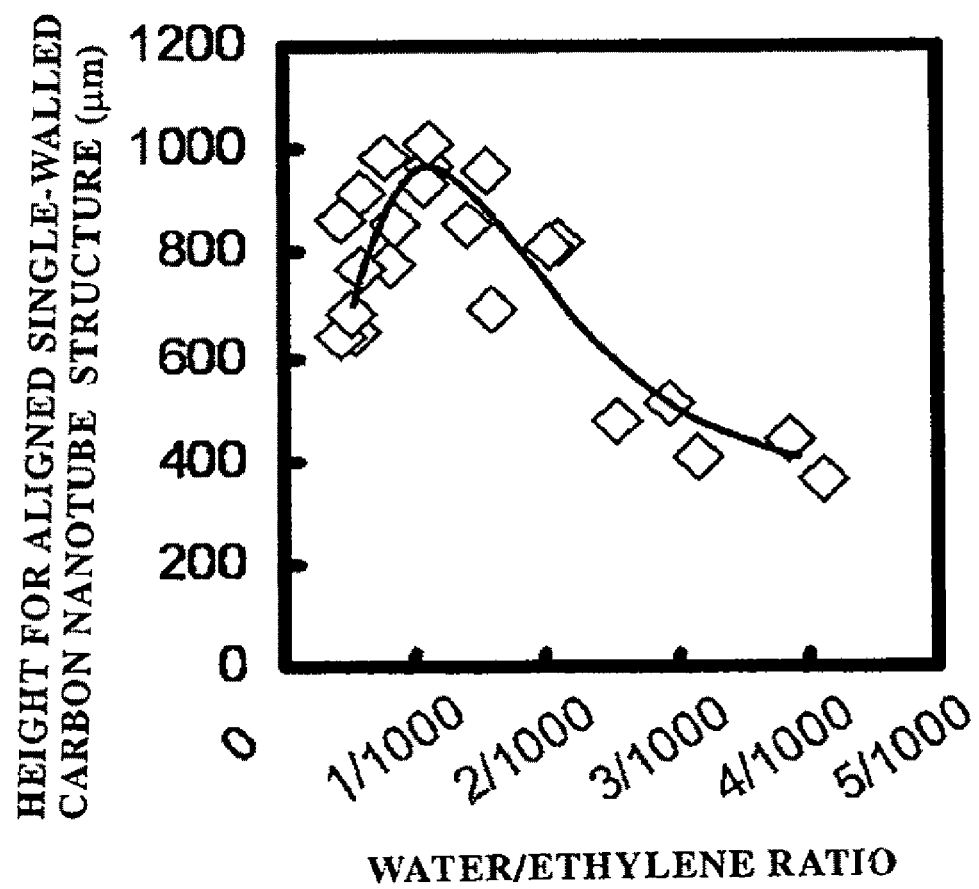
FIG. 37 is a graph showing a relation between the height of the aligned single-walled CNT aggregate and water content/ ethylene ratio.

FIG. 37 shows an example of a relation between the growth height of the aligned single-walled CNT aggregate (amount of single-walled CNT grown) and water (catalyst activator)/ ethylene (carbon source gas) ratio. From the graph, it can be seen that the height of the aligned single-walled CNT aggregate is greatly increased by the addition of water. This shows that the catalyst activity is enhanced greatly and the catalyst life time is extended by the addition of water and, as a result, the height of the single-walled CNT is increased remarkably. Further, the growth height of the aligned single-walled CNT aggregate is decreased in both cases where the addition amount of water to ethylene is insufficient or excessive and it can be seen that there exists an optimum value for the addition amount of water. This shows that for enhancing the growth efficiency of the aligned single-walled CNT aggregate, the addition amount of the catalyst activator to the carbon source gas is important. Such a finding that the growth efficiency of the aligned single-wailed CNT aggregate is enhanced greatly by the addition of the catalyst activator such as water is a break through that has been found for the first time by the inventors of the present application.

Figure 38:
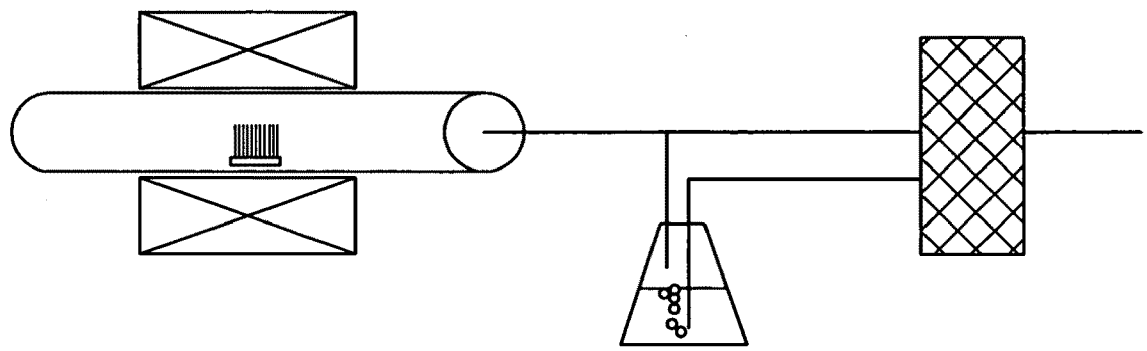
FIG. 38 is a schematic constitutional view showing the outline of a second production apparatus for aligned single-walled CNT aggregate.
Figure 39:
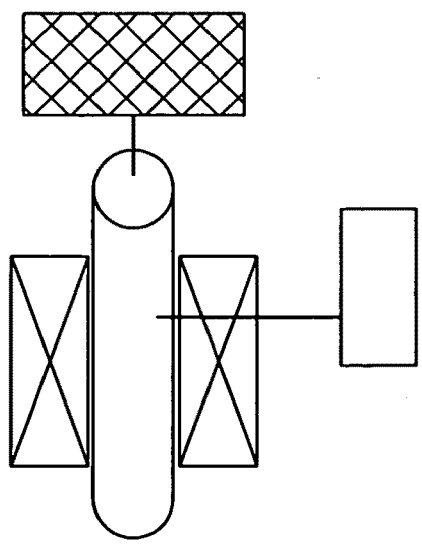
FIG. 39 is a schematic constitutional view showing the outline of a third production apparatus for aligned single-walled CNT aggregate.
Figure 40:
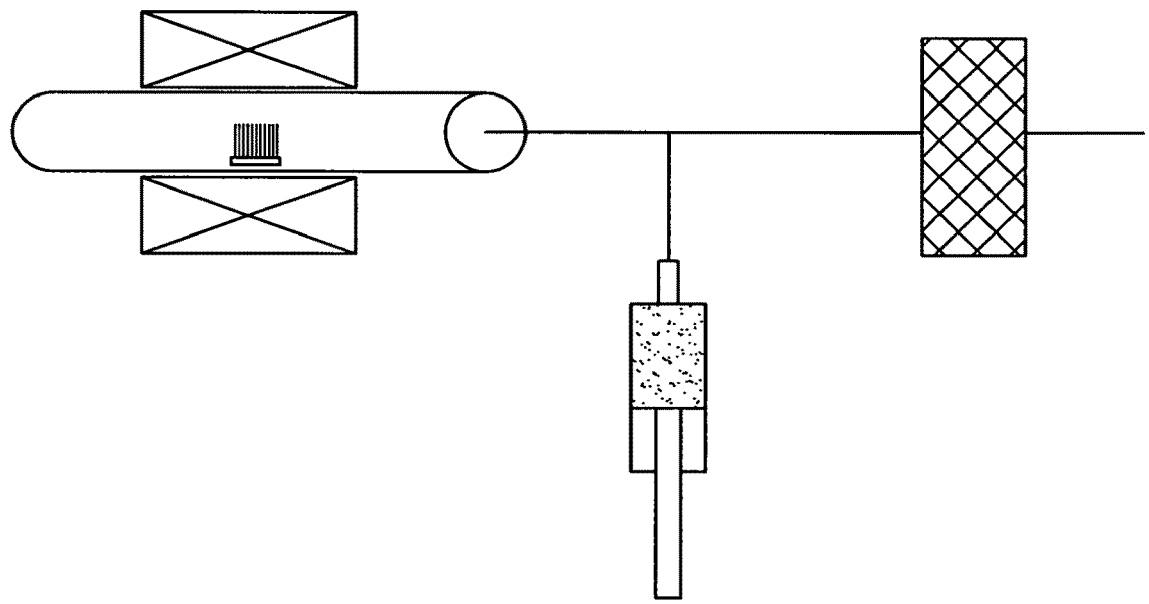
FIG. 40 is a schematic constitutional view showing the outline of a fourth production apparatus for a aligned single-walled CNT aggregate.
Figure 41:
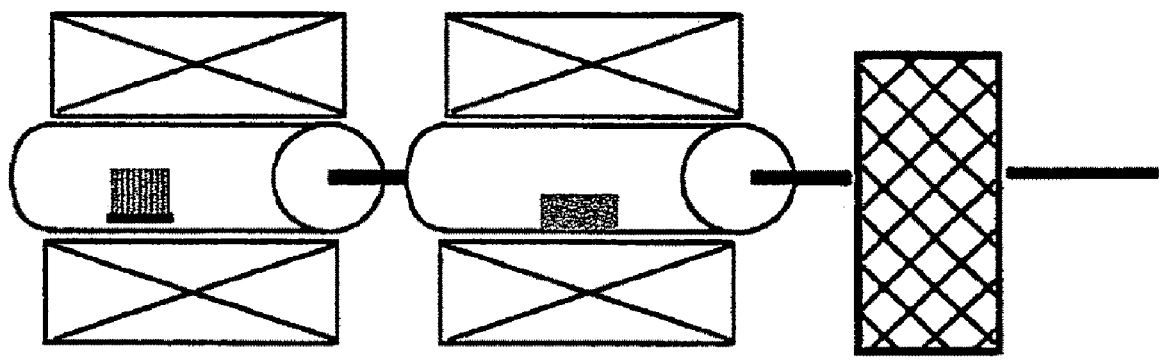
FIG. 41 is a schematic constitutional view showing the outline of a fifth production apparatus for aligned single-walled CNT aggregate.

The constitution of the supply means for the catalyst activator is not particularly restricted and, in addition to the constitution described above (FIG. 34), it includes, for example, supply by using a carrier gas by way of a bubbler (FIG. 38), supply by evaporating a solution containing a catalyst activator (FIG. 39), a supply of a gas as it is (FIG. 40), supply by liquefaction and evaporation of a solid catalyst activator (FIG. 41), etc. and a supply system can be constructed by using various equipments such as an evaporator, a mixer, a stirrer, a dilution device, a spray device, a pump, a compressor, etc.

Further, to supply a small amount of a catalyst activator at a high accuracy and stability, a purifying device for removing the catalyst activator from the carbon source gas and the atmospheric gas may be equipped additionally to the CVD apparatus as described above. In this case, it is preferred to remove catalyst activator from the carbon source gas and the atmospheric gas at the upstream of the supply channel to a synthesis furnace and add a controlled amount of the catalyst activator to the carbon source gas and the atmospheric gas at the downstream of the supply channel to the synthesis furnace. This means is effective in a case where a small amount of the catalyst activator is contained in the carbon source gas or the carrier gas.

Further, the catalyst activator can be supplied with high stability by providing a measuring device of the concentration of the catalyst activator at the supply channel or the exhaustion pipe of the carbon source gas and the atmospheric gas. The measuring device conducts feedback control to control the supply of the catalyst activator by using the output value of the measuring device.

The measuring device may be a device for measuring not only the concentration of the catalyst activator but, for example, also the synthesis amount of CTN or may be a device for measuring byproducts generated from the catalyst activator. Further, for synthesizing a great amount of CNT, the reaction furnace may also be provided with a system of supplying and taking-out substrates in plurality or continuously.

As described above, while it is necessary that the CVD apparatus used for practicing the invention is provided with supply means for the catalyst activator but other structures and constitutions for each of the portions for the CVD method are not restricted particularly and any of known CVD apparatus can be used.

A bulk aligned single-walled CNT aggregate is obtained by separating the thus obtained aligned single-walled CNT aggregate from the substrate. Further, a powdered aligned single-walled CNT aggregate is obtained by peeling the aligned single-walled CNT aggregate separated from the substrate into a powder form.

EXAMPLES

Example 1

An aligned single-walled CNT aggregate according to the invention will be described in detail with reference to specific examples. The property of the aligned single-walled CNT aggregate produced by this example depends on specifics of production conditions. In the production conditions of Example 1 to be described below, typical values are 0.03 g/cm$^3$ for the density, 1200 m$^2$/g for the BET-specific surface area, 2.5 nm for the average outer diameter, 2 nm for the full-width at half maximum, 99.9% for the carbon purity, and 0.8 for the Herman's orientation factor. Further, in Example 1-2, they are 0.03 g/cm$^3$ for the density, 1100 m$^2$/g for the BET-specific surface area, 2.8 nm for the average outer diameter, 2 nm for the full-width at half maximum, 99.9% for carbon purity and 0.7 for the Herman's orientation factor.

Figure 43:
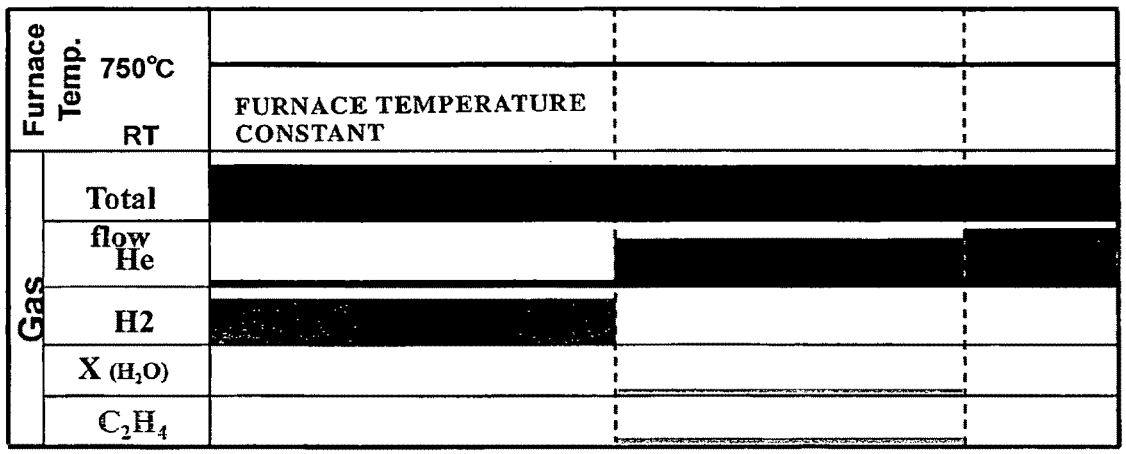
FIG. 43 shows process conditions for synthesis procedures shown in FIG. 42.

The production step according to this example includes, as shown in the flow chart of FIG. 42, a preparation step for a catalyst substrate and a synthesis step for single-walled CNT. The preparation step for the catalyst substrate includes a step of forming a co-catalyst layer of 40 nm thickness comprising alumina ($Al_2O_3$) on a substrate by RF sputtering, and forming a catalyst layer of 1 nm thickness comprising iron (Fe) on the alumina layer by sputtering. Detailed process conditions are shown in FIG. 43.

In a case of producing a patterned aligned single-walled CNT aggregate, a resist for electron beam exposure (ZEP-520A/manufactured by Zeon Corporation) was thinly coated at first by using a spin coater on a silicon substrate formed previously with a co-catalyst layer (4700 rpm/60 sec), which is then baked (200° C./3 min). Then, circular patterns each of 150 μm diameter are drawn each at an interval of 250 μm on a substrate coated with the resist by using an electron beam exposure apparatus.

Then, iron is vapor deposited by using a sputtering vapor deposition apparatus and, finally, the resist is peeled from the substrate by using a peeling liquid (ZD-MAC/manufactured by Nippon Zeon Co.). By way of the steps, a silicon substrate formed with a catalyst metal layer patterned in a desired shape, for example, a circular shape can be obtained.

The substrate is placed in a reaction furnace of a CVD apparatus (FIG. 34) kept at a furnace temperature of 750° C. and at a furnace pressure of 1.02×10$^5$ Pa, and He at: 100 sccm, and H$_2$ at 900 sccm are introduced for 6 min. This reduces the iron catalyst layer to promote the iron catalyst later to convert into fine nanoparticles suited to grow single-walled CNTs and a number of fine iron particles of a nanometer size are formed on the alumina layer (formation Step). In this case, the density (number of iron particles per unit area) of the fine iron particles is controlled to 1×10$^{11}$ to 1×10$^{14}$/cm$^2$.

Then, He at 850 sccm, C$_2$H$_4$ at 100 sccm, and H$_2$O-containing He (relative humidity 23%) at 50 sccm are supplied for 5 min into the reaction furnace in a state kept at a furnace temperature of 750° C. and at a furnace pressure of 1.02×10$^5$ Pa. Thus, the single-walled CNT is grown from the fine particles of iron catalyst (growth step). Thus, an aligned single-walled CNT aggregate is obtained.

After the completion of the growth step, only He at 1,000 sccm is supplied into the reaction furnace and a remaining carbon source gas and a catalyst activator are exhausted (flushing step).

Further, another method of producing an aligned single-walled CNT aggregate according to the invention (Example 1-2) will be described below.

Figure 44:
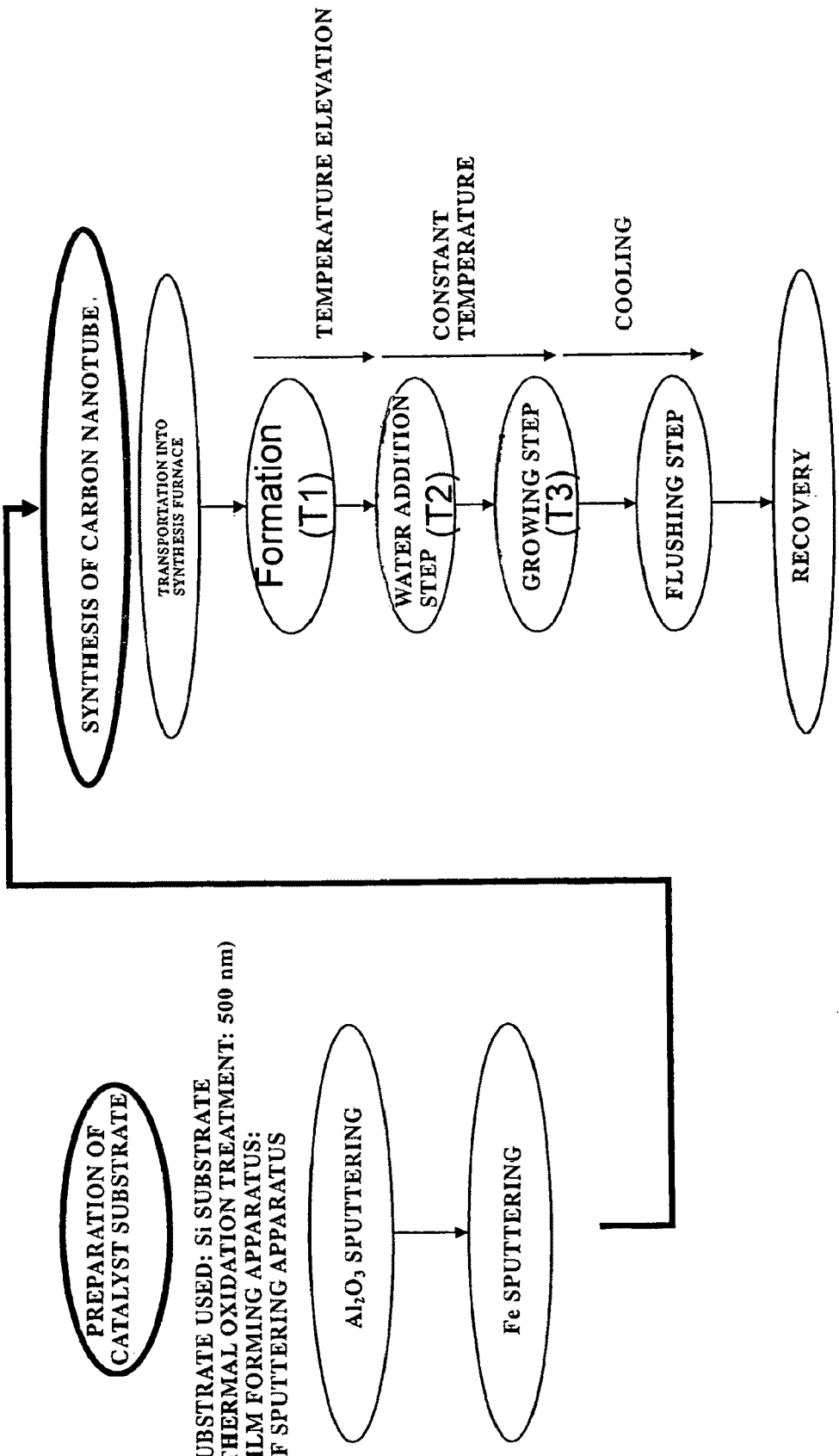
FIG. 44 is a flow chart showing the second procedure for synthesizing an aligned single-walled CNT aggregate.
Figure 45:
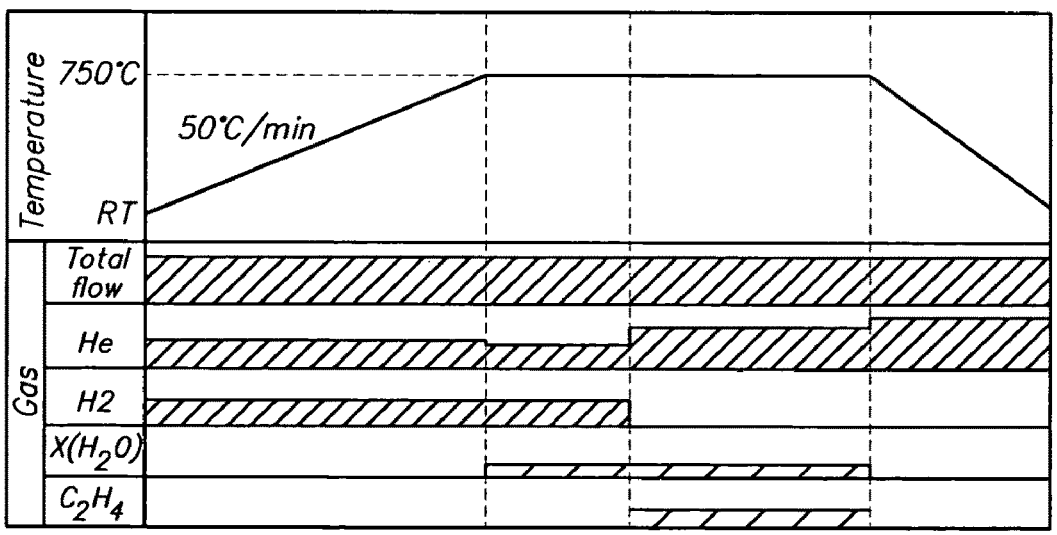
FIG. 45 shows process conditions for synthesis procedures shown in FIG. 44.

FIG. 44 shows a flow chart for the production step according to this example and FIG. 45 shows detailed process conditions.

A silicon substrate to which the same catalyst metal ($Al_2O_3$+Fe) as that for Example 1 is deposited or patterned into a desired shape is prepared and the substrate is placed in a reaction furnace of a CVD apparatus kept at a furnace temperature of a room temperature and a furnace pressure of 1.02×10$^5$ Pa, and He at 600 sccm, and H$_2$ at 400 sccm are introduced. Then, the furnace temperature is elevated at 50° C./min for 15 min to 750° C. (formation step).

Then, He at 510 sccm, H$_2$ at 400 sccm and, further, H$_2$O-containing He (relative humidity: 23%) at 90 sccm are supplied into the reaction furnace kept at a furnace temperature of 750° C. and at a furnace pressure of 1.02×10$^5$ Pa. The processing time is 5 min. Thus, the iron catalyst layer is reduced and a number of fine particles at nanometer size are formed on the alumina layer in the same manner as Example 1 (formation step+water addition step).

Then, He at 850 sccm, C$_2$H$_4$ at 100 sccm and, further, H$_2$O-containing He (relative humidity: 23%) at 50 sccm are supplied into a reaction furnace in a state at a furnace temperature of 750° C. and at a furnace pressure of 1.02×10$^5$ Pa. The processing time is 10 min. Thus, a single-walled CNT is grown from each of fine particles of iron catalyst (growth step).

After the completion of the growth step, only He at 1,000 sccm is supplied into the reaction furnace to exhaust the remaining carbon source gas and the catalyst activator (flushing step).

Figure 46:
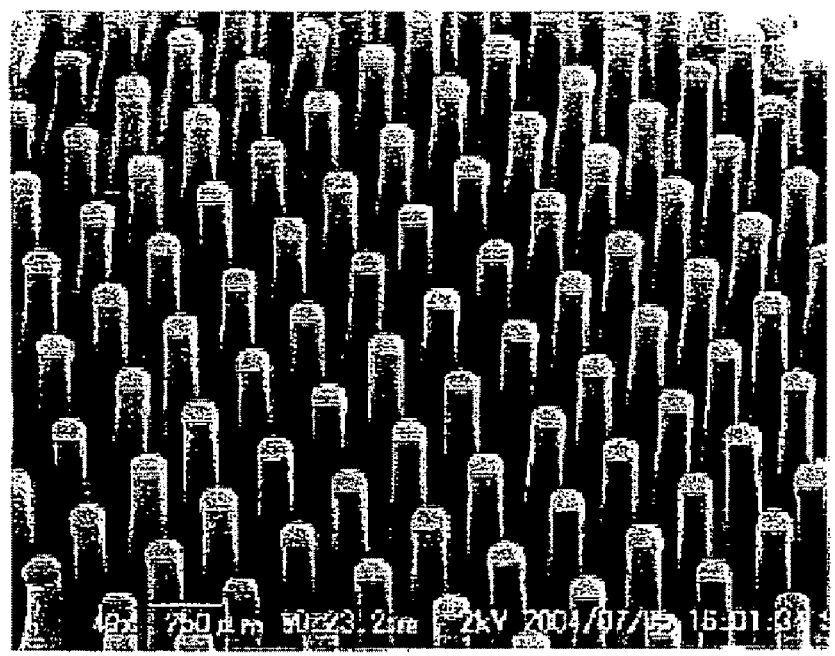
FIG. 46 shows electron microscopic (SEM) images for an aligned single-walled CNT aggregate patterned into a circular columnar shape.
Figure 47:
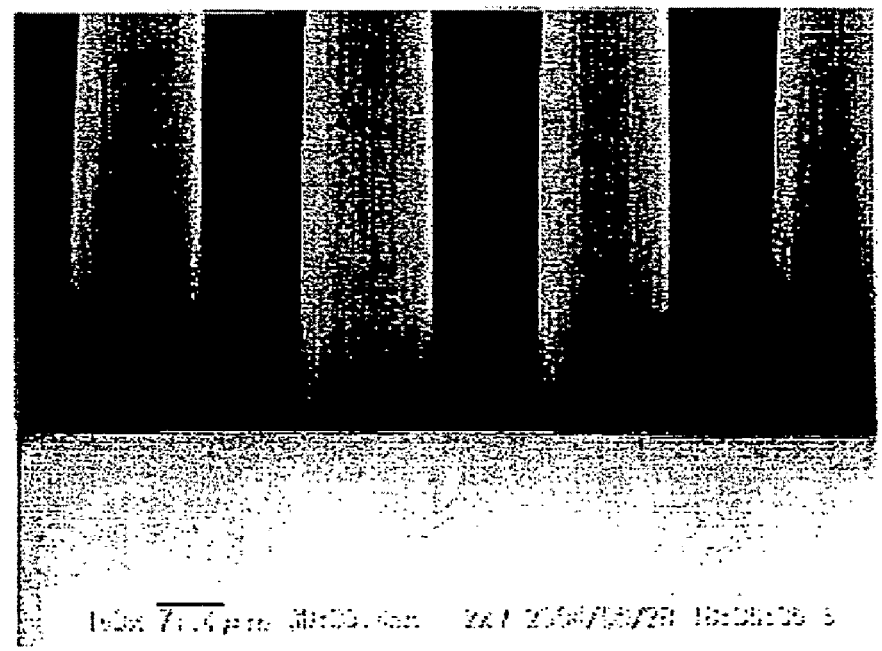
FIG. 47 shows electron microscopic (SEM) images for the base of the aligned single-walled CNT aggregate in FIG. 46.
Figure 48:
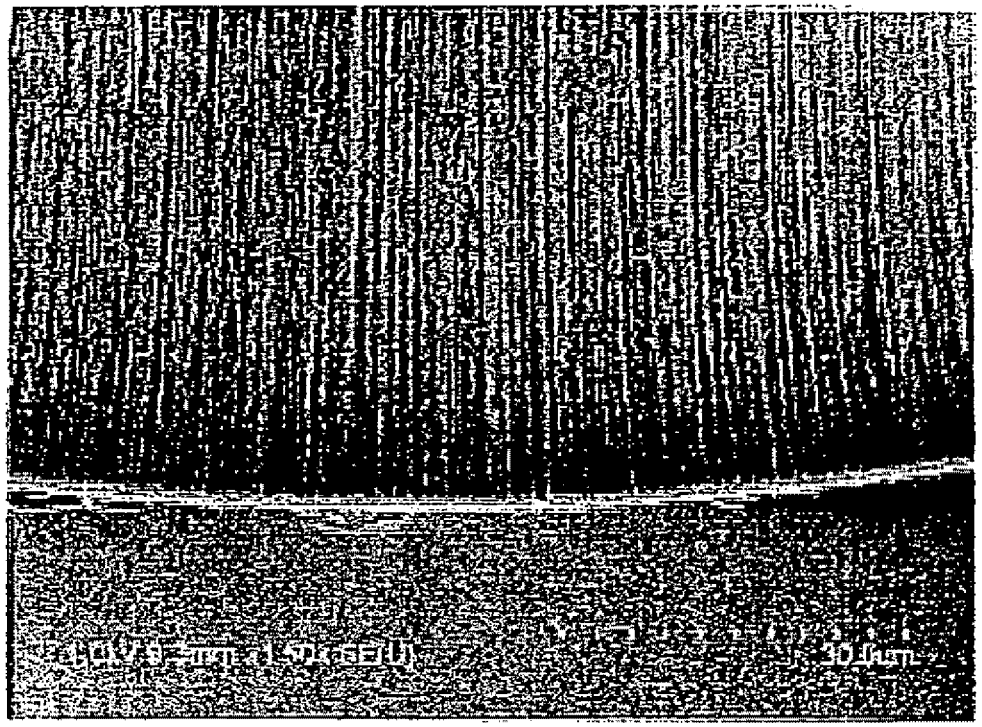
FIG. 48 shows enlarged electron microscopic (SEM) images showing the base of the aligned single-walled CNT aggregate in FIG. 46.

By the method described above, an aligned single-walled CNT aggregate of a circular columnar shape is obtained. FIG. 46 shows SEM images for a portion thereof and FIG. 47 and FIG. 48 show SEM images for the base thereof at different magnifying ratios. It can be observed in FIG. 48 that the single-walled CNTs of this example are aligned in the direction vertical to the substrate.

Figure 49:
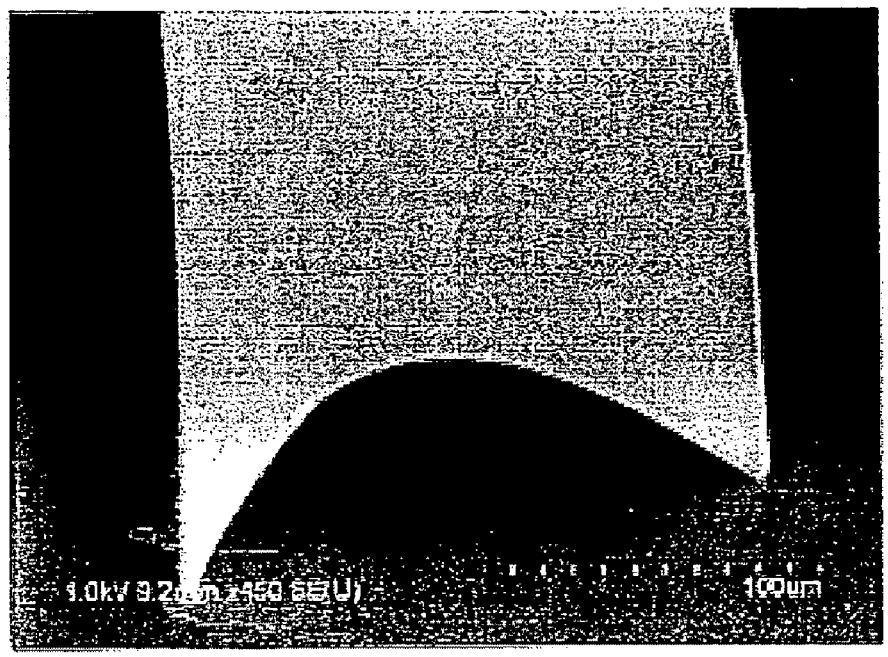
FIG. 49 shows electron microscopic (SEM) images showing an example of an aligned single-walled CNT aggregate.
Figure 50:
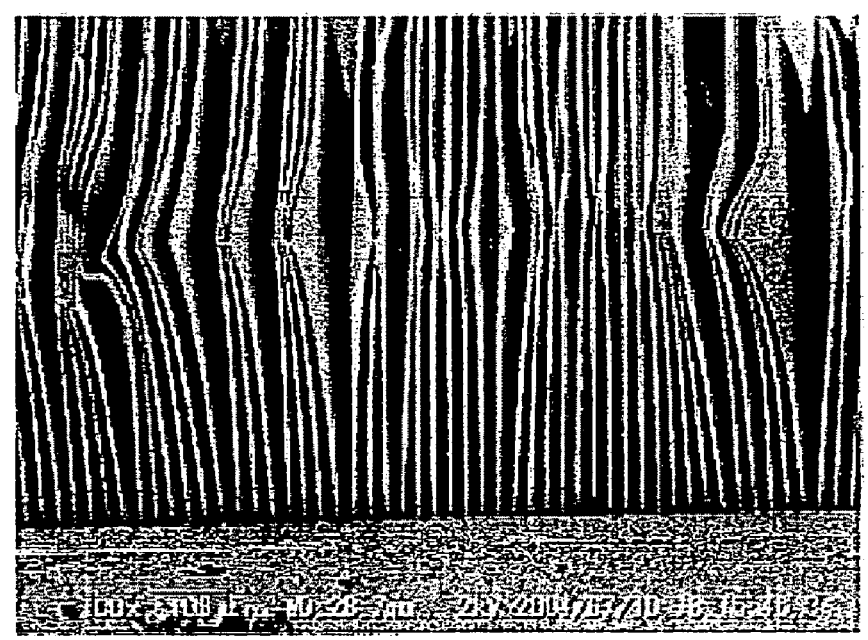
FIG. 50 shows electron microscopic (SEM) images showing a second example of an aligned single-walled CNT aggregate.
Figure 51:
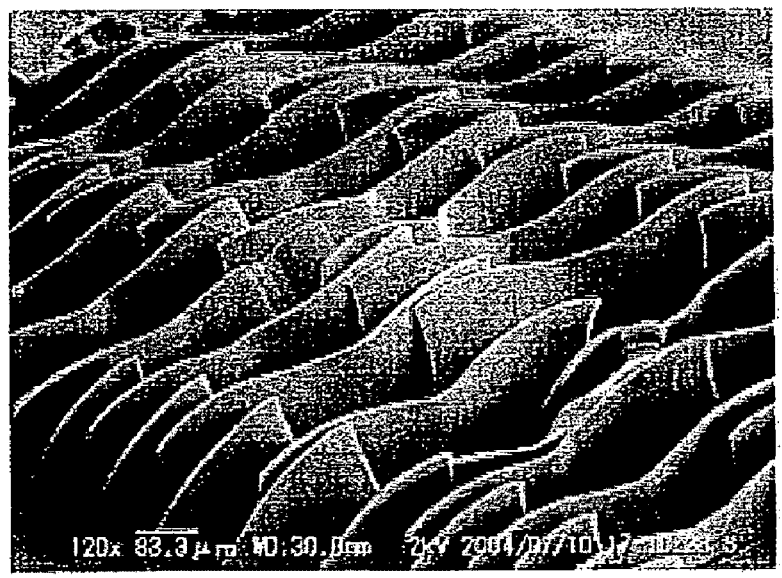
FIG. 51 shows electron microscopic (SEM) images showing a third example of an aligned single-walled CNT aggregate.
Figure 52:
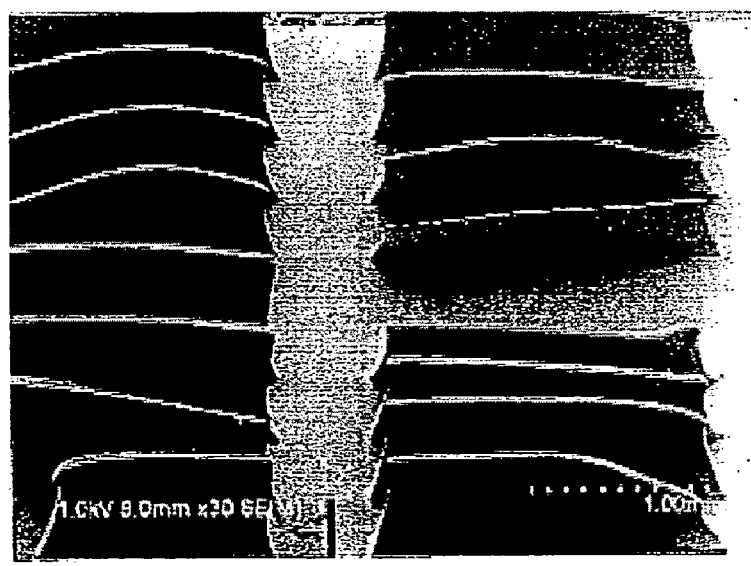
FIG. 52 shows electron microscopic (SEM) images showing a fourth example of an aligned single-walled CNT aggregate.
Figure 53:
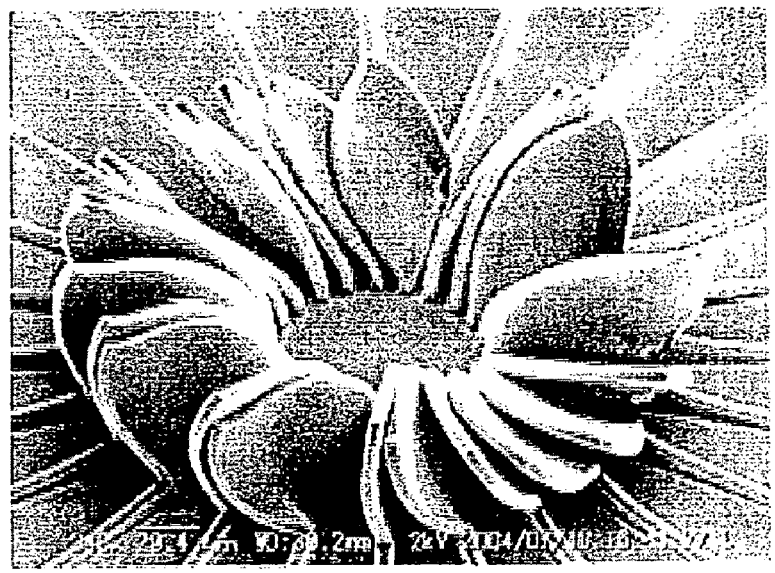
FIG. 53 shows electron microscopic (SEM) images showing a fifth example of an aligned single-walled CNT aggregate.
Figure 54:
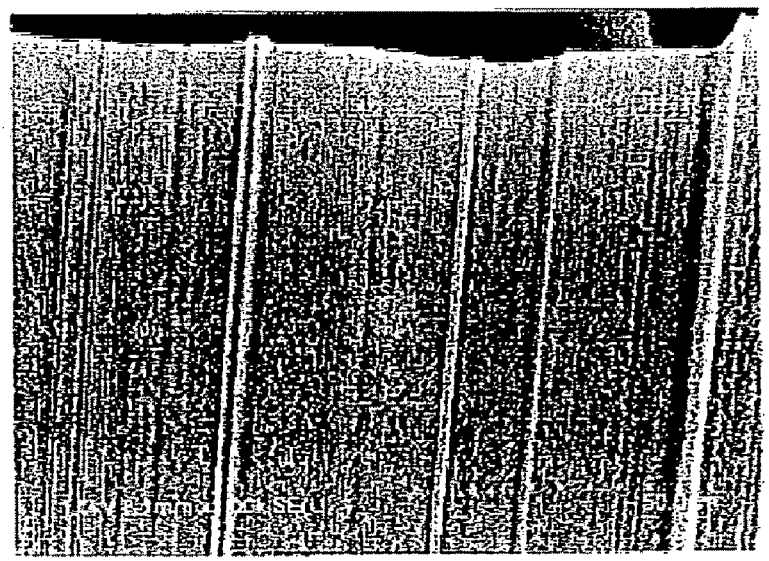
FIG. 54 shows electron microscopic (SEM) image showing the state of observing an example of a bulk aligned single-walled CNT aggregate from the frontal side.
Figure 55:
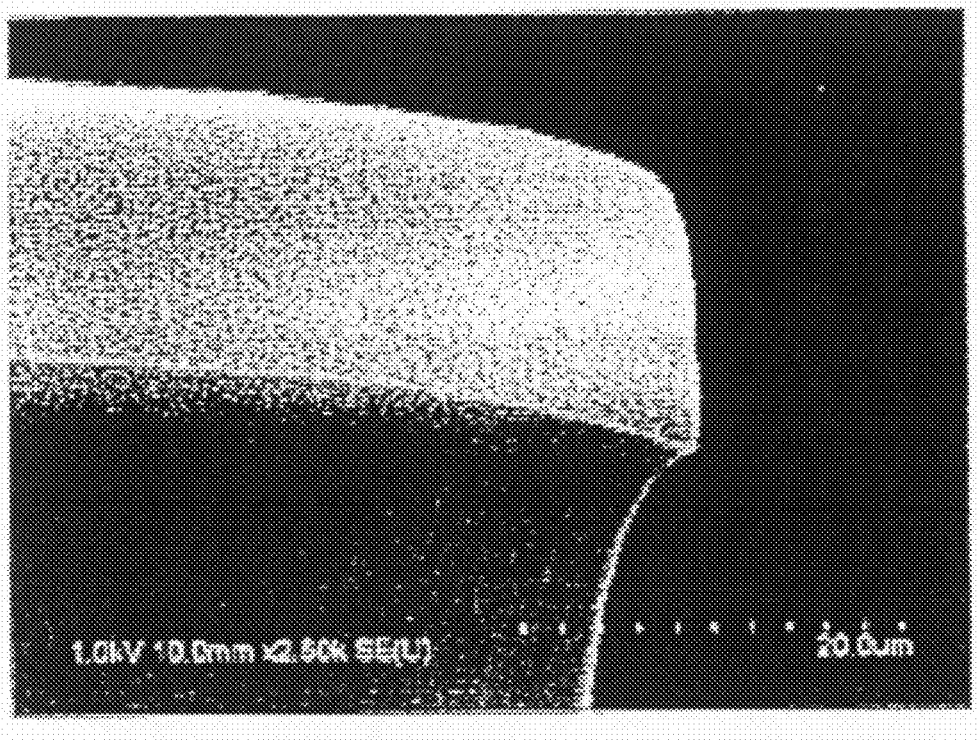
FIG. 55 shows electron microscopic (SEM) image showing the state observing an example of a bulk aligned single-walled CNT aggregate for a corner.

FIG. 49 to FIG. 55 show SEM images for five examples of aligned single-walled CNT aggregates which are produced while changing the patterning of the catalyst and the reaction time. It can be seen that the aligned single-walled CNT aggregate of FIG. 49 is of a thin film structure of 5 μm thickness and has flexibility, FIG. 50 shows images of a plurality of thin film structures as viewed from the lateral side and it can be seen that they also have flexibility. FIG. 51 shows a plurality of thin film structures arranged in complexity and FIG. 52 shows a thin-film structures of different thickness. The minimum value of the thickness obtained at present is 1 μm and a larger thickness than the minimum value can be controlled optionally by patterning of the catalyst. FIG. 53 shows a structure of a complicate shape. FIG. 54 shows SEM images observing an example of such aggregate as viewed from the upper surface and FIG. 55 shows SEM images for an example of the aggregate observed for a corner. It can be observed from any of them that the single-walled CNTs are aligned.

Figure 56:
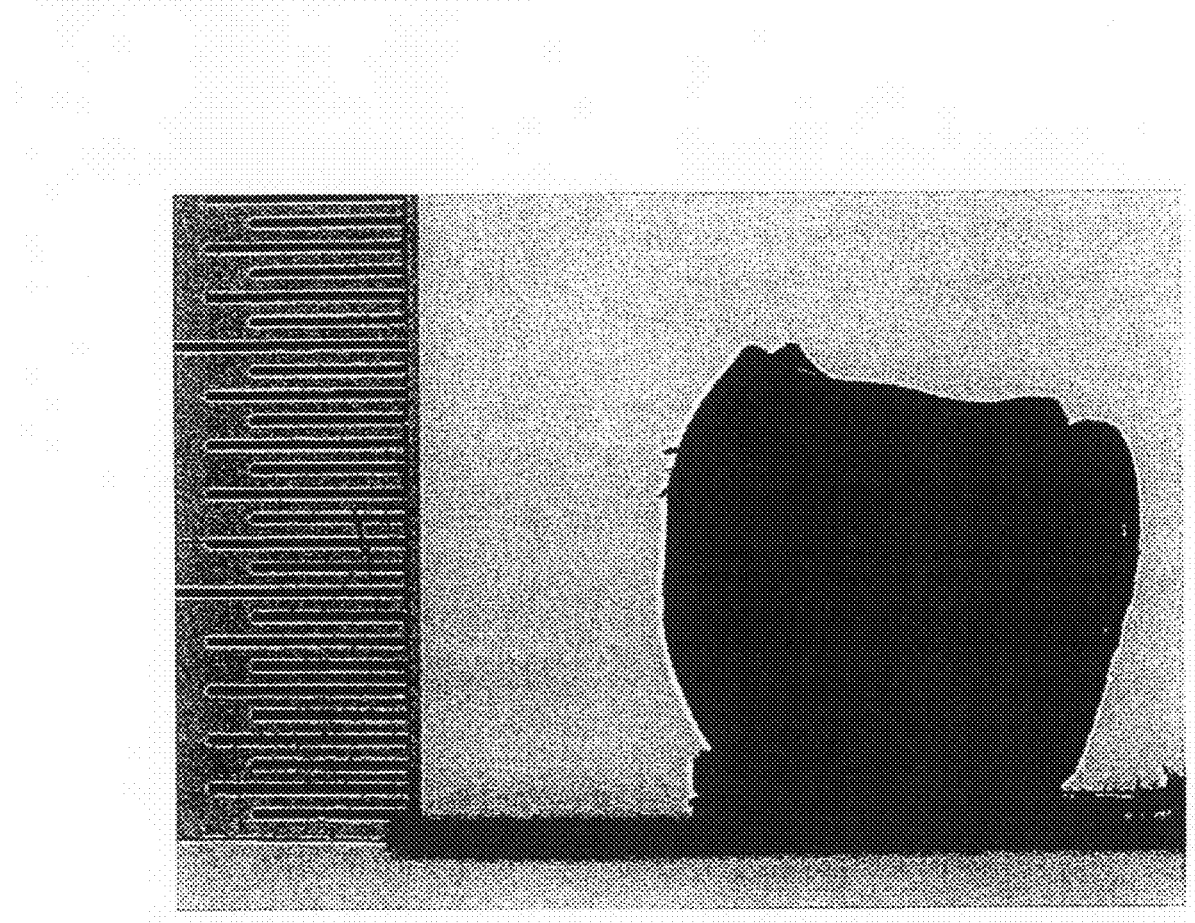
FIG. 56 shows digital camera image of an aligned single-walled CNT aggregate grown to a height of about 1 cm.
Figure 57:
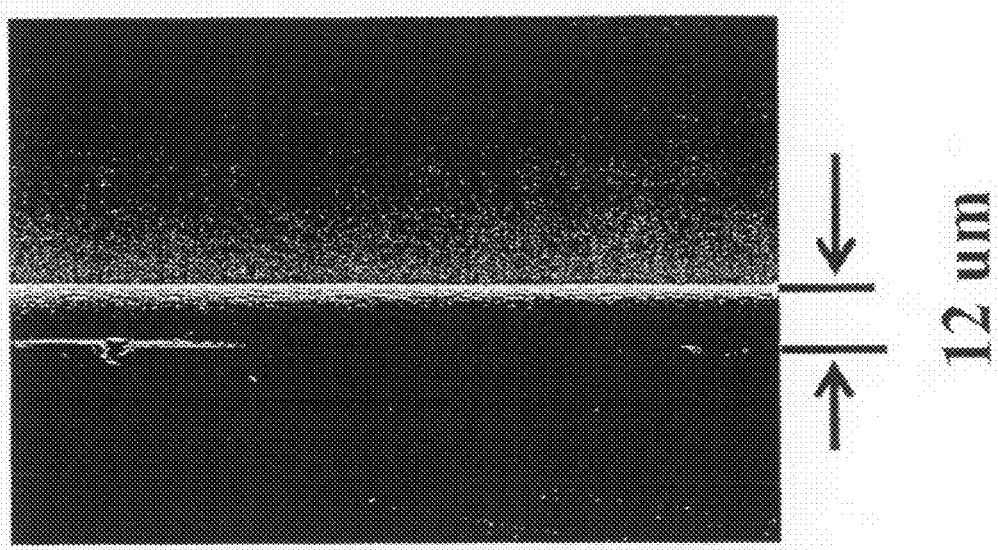
FIG. 57 shows electron microscopic (SEM) image of an aligned single-walled CNT aggregate grown to a height of 12 μm just from the side.
Figure 58:
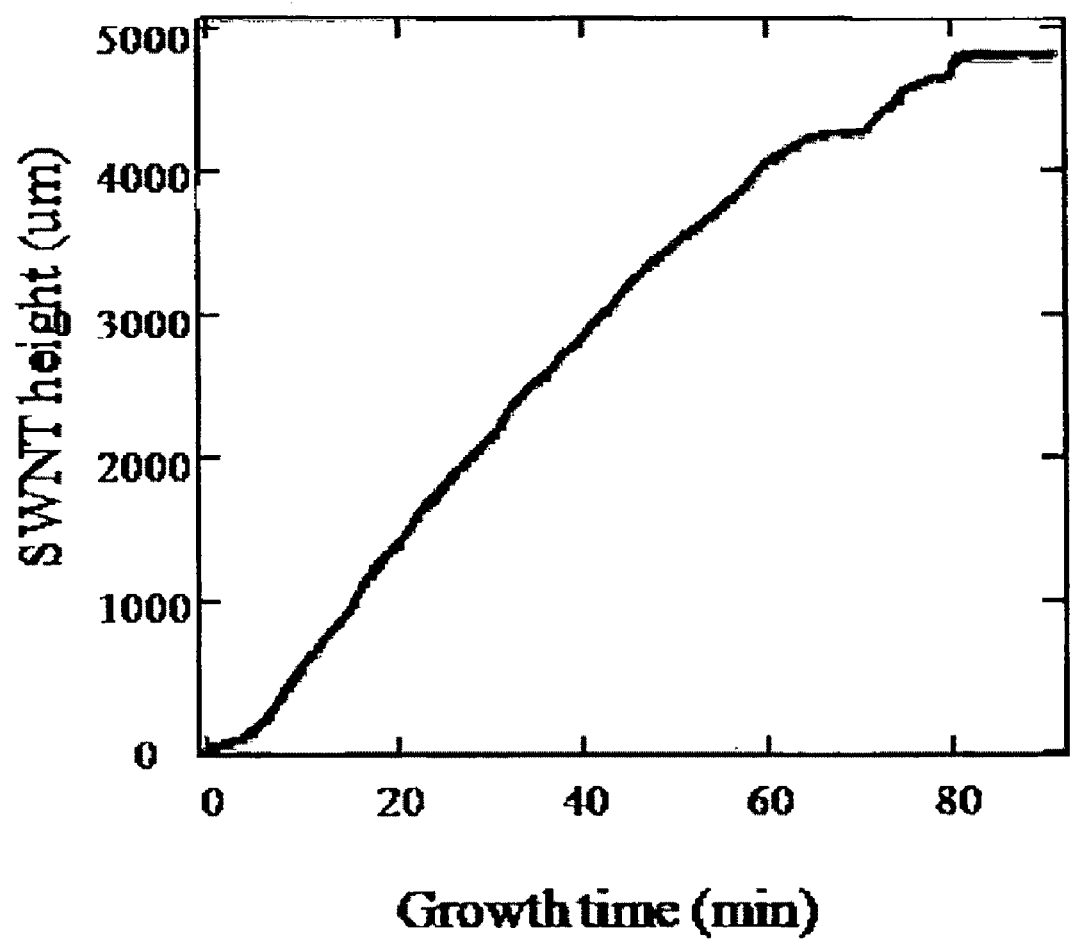
FIG. 58 is a growth curve of an aligned single-walled CNT aggregate measured during growth by using a telecentric optical measuring system.

FIG. 56 shows digital camera images of an aligned single-walled CNT aggregate of 1 cm height formed by the method of Example 1-1 with the growth time for 120 min, and FIG. 57 shows SEM images of an aligned single-walled CNT aggregate viewed from the lateral side thereof obtained by growing CNT using a method of Example 1-1 while measuring the growth height by using a telecentric measuring system described in the specification of Japanese Patent Application 2008-051321 and stopping the supply of the carbon source gas at a height of 10 μm. Further, FIG. 58 shows an example of a growth curve obtained, by measuring the height during growth at a real time by the same telecentric measuring system. By growing CNT while measuring the growth height on real time and controlling the supply of the carbon source gas in accordance with the measured value for the growth height, an aligned single-walled CNT aggregate of a desired height can be obtained by automatic control. The example shown in FIG. 57 has a time lag between the stopping of the carbon source gas and the growth stopping of the CNT and it was actually grown up to a height of 12 μm. In this manner it is possible to grow aligned single-walled CNT aggregates with determined height in the range of 10 μm to 1 cm.

Example 2

A bulk aligned single-walled CNT aggregate is obtained by separating the aligned single-wailed CNT aggregate obtained in Example 1 from the substrate. While the property of the bulk aligned single-walled CNT aggregate depends on specifics of the production conditions for the aligned single-walled CNT aggregate used, in a case of using the aligned single-walled CNT aggregate produced under the production conditions of Example 1 to be described later, typical values are 0.03 g/cm$^3$ for the density, 1200 m$^2$/g for the BET-specific surface area, 2.5 nm for the average outer diameter, 2 nm for the full-width at half maximum, 99.9% for the carbon purity, and 0.8 for the Herman's orientation factor. Further, in the case of using the aligned single-walled CNT aggregate produced under the production conditions of Example 1-2, they are 0.03 g/cm$^3$ for the density, 1100 m$^2$/g for the BET-specific surface area, 2.8 nm for the average outer diameter, 2 nm for the full-width at half maximum, 99.9% for the carbon purity, and 0.7 for the Herman's orientation factor.

As the method of peeling the aligned single-walled CNT aggregate from the substrate, a physical, chemical, or a mechanical peeling method can be shown as an example. For example, a method of peeling by using, for example, electric field, magnetic field, centrifugal force, or surface tension, a method of peeling mechanically from the substrate directly, or a method of peeling from the substrate by using a pressure or heat is applicable. While a simple peeling method includes a method of peeling from the substrate by directly pinching an aligned single-walled CNT aggregate by tweezers, peeling the aggregate from the substrate by using a thin blade suck as a cutter blade is more suitable. Further, it is also possible to suck an aligned single-walled CNT aggregate by using a vacuum pump and peeling the same from the substrate.

After peeling, a vertically aligned single-walled CNT can be newly grown by utilizing the catalyst remaining on the substrate.

Figure 59A:
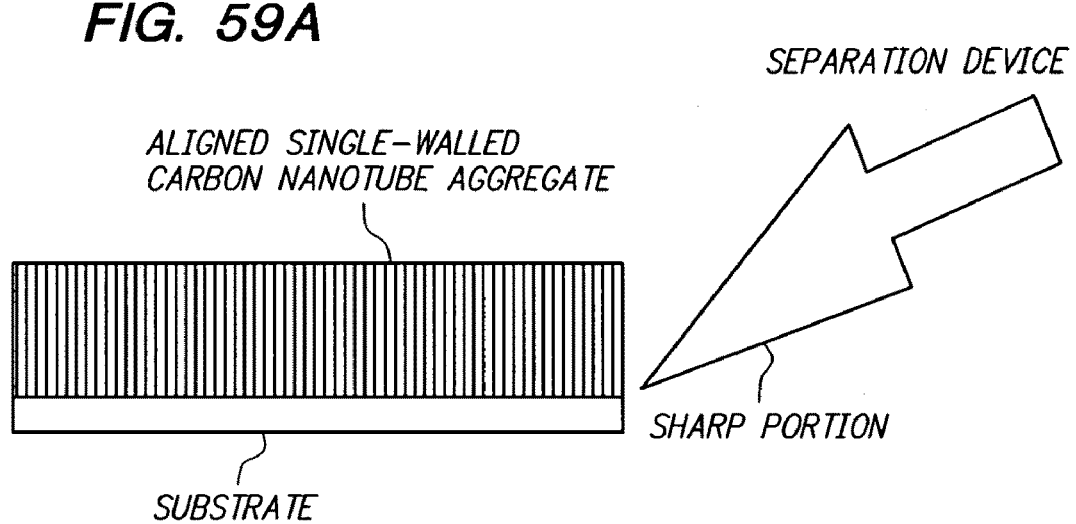
FIG. 59 is a schematic view of a separation device used for separating the bulk aligned single-walled CNT aggregate from a substrate or a catalyst.
Figure 59B:
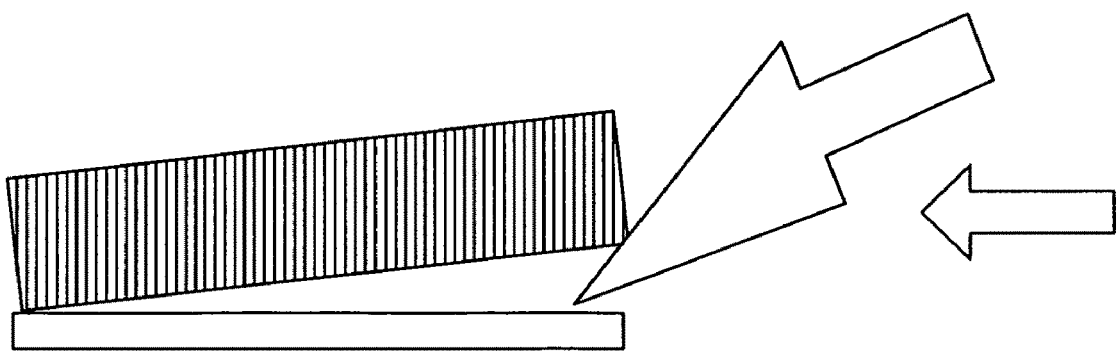

FIG. 59 shows an example of a separation device for peeling an aligned single-walled CNT aggregate from a substrate. The separation device has a sharp portion such as a cutter or a spatula. By abutting the sharp portion against a boundary between an aligned single-walled CNT aggregate and a substrate (FIG. 59(a)) and moving the sharp portion along the surface of the substrate so as to scrape off the aligned single-walled CNT aggregate from the substrate (FIG. 59(b)), the aligned single-walled CNT aggregate is peeled from the substrate. In this case, when the aligned single-walled CNT aggregate has a sufficient height of millimeter size, the aligned single-walled CNT aggregate can be easily peeled from the substrate.

A lump of 50 mg is taken out of the bulk aligned single-walled CNT aggregate thus peeled from the substrate, and adsorption/desorption isothermal curve for nitrogen was measured at 77K using BELSORP-MINI (manufactured by Bell Japan Inc.) (adsorption equilibrium time was 600 sec). Then, when the specific surface area was measured based on the adsorption/desorption isothermal curve by a method of Brunaner, Emmett, Teller, it was 1,100 m$^2$/g. Further, a lump of 50 mg was taken out from the same bulk aligned single-walled CNT aggregate, arranged evenly on a tray made of alumina, and placed in a muffle furnace. Then, when the temperature was elevated to 550° C. at 1° C./min and a heat treatment was conducted in an oxygen atmosphere (20% concentration) for 1 min, the weight of the sample was reduced to 43 mg and 7 mg thereof was burnt. When the specific surface area was measured in the same manner as described above for the sample after the heat treatment, the specific surface area was about 2,000 m$^2$/g. The specific surface area of the sample after the heat treatment was increased compared with that of the sample and it suggested that the CNT was opened by the heat treatment.

[Evaluation for Alignment Property by θ-2θ Method]

The alignment property of the obtained bulk aligned single-walled CNT aggregate was measured by an X-ray diffraction measuring method according to the θ-2θ method. The main factors of the bulk aligned single-walled. CNT aggregate used as the specimen were square columnar shape of 1 m×1 m×10 mm configurational size, 0.037 g/cm$^3$ for the density, 1200 m$^2$/g for the BET-specific surface area, 2.3 nm for the average outer diameter, 2 nm for the full-width at half maximum, and 99.9% for the carbon purity.

Figure 60:
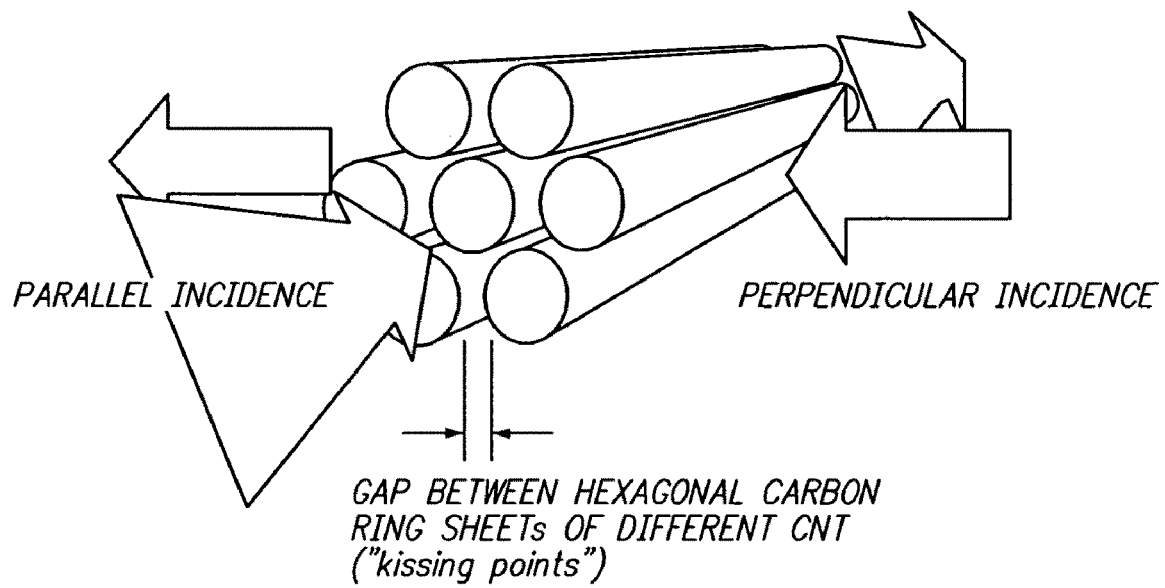
FIG. 60 is a schematic explanatory view showing a relation between the incident direction of X-rays and an alignment direction of CNT.

The X-ray diffraction spectra for the sample are as shown in FIG. 22 to FIG. 24. The observed diffraction peaks reflect the periodicity for the constitution of a hexagonal carbon ring that constitutes the single-walled CNT and the periodicity of packing between the single-walled CNTs. (CP) diffraction peaks observed at low angles (0 to 15 degree) reflect the distance between each of the single-walled CNTs. Moderate diffraction peaks observed near 25 degree reflect the gap of the hexagonal carbon ring sheets of different single-walled CNT, (refer to FIG. 60). The diffraction peak near 42° reflects the (100) face of the hexagonal carbon ring of the single-walled CNT, and diffraction peak near 77 to 78 degree reflects the (110) face. Since the hexagonal carbon ring structure of the single-walled CNT is rounded and curved, the diffraction peaks are not perfectly identical with the diffraction peak of the graphite hexagonal carbon ring structure. Further, while the peak positions change somewhat slightly both for the size and the alignment degree of the single-walled CNT, the diffraction peaks can be identified.

When the Herman's orientation factor F was calculated based on the result, it was 0.4 to 0.62 for the (CP) diffraction peak and 0.75 for the (002) diffraction peak.

[Evaluation for Alignment Property by Laue Method]

The alignment degree of the obtained bulk aligned single-walled CNT aggregate was evaluated by an X-ray diffraction method according to the Laue method.

Main factors of the bulk aligned single-walled CNT aggregate used as the sample are circular columnar shape of 1 mm diameter×0.5 mm height for the configurational size, 0.037 g/cm$^3$ for the density, 1200 m$^2$/g for the BET-specific surface area, 2.8 nm for the average outer diameter, 2 nm for the full-width at half maximum, and 99.9% for the carbon purity.

As a result, the diffraction peaks for (CP), (002), (100), etc. observed for the bulk aligned single-walled CNT aggregate are in an elliptic shape and showed anisotropy. The anisotropy shows that the single-walled CNT is aligned.

When the Herman's orientation factor F was calculated based on the result, it was 0.38 for (CP) diffraction peak and 0.61 for (002) diffraction peak.

Example 3

An aligned single-walled CNT aggregate was peeled from a substrate to obtain a powdered aligned single-walled CNT aggregate. While the property of the powdered aligned single-walled CNT aggregate depends on specifics of the production conditions of the aligned single-walled CNT aggregate used, in a case of using the aligned single-walled CNT aggregate produced under the production conditions of Example 1 to be described later, the typical values are 0.0005 g/cm$^3$ to 0.16 g/cm$^3$ for the density, 1200 m$^2$/g for the BET-specific surface area, 2.5 nm for the average outer diameter, 2 nm for the full-width at half maximum, 99.9% for the carbon purity, and 0.8 for the Herman's orientation factor. Further in a case of using the aligned single-walled CNT aggregate produced under the production conditions of Example 1-2, the values are 0.0005 g/cm$^3$ to 0.16 g/cm$^3$ for the density, 1100 m$^2$/g for the BET-specific surface area, 2.8 nm for the average outer diameter, 2 nm for the full-width at half maximum, 99.9% for the carbon purity, and 0.7 for the Herman's orientation factor.

Figure 61:
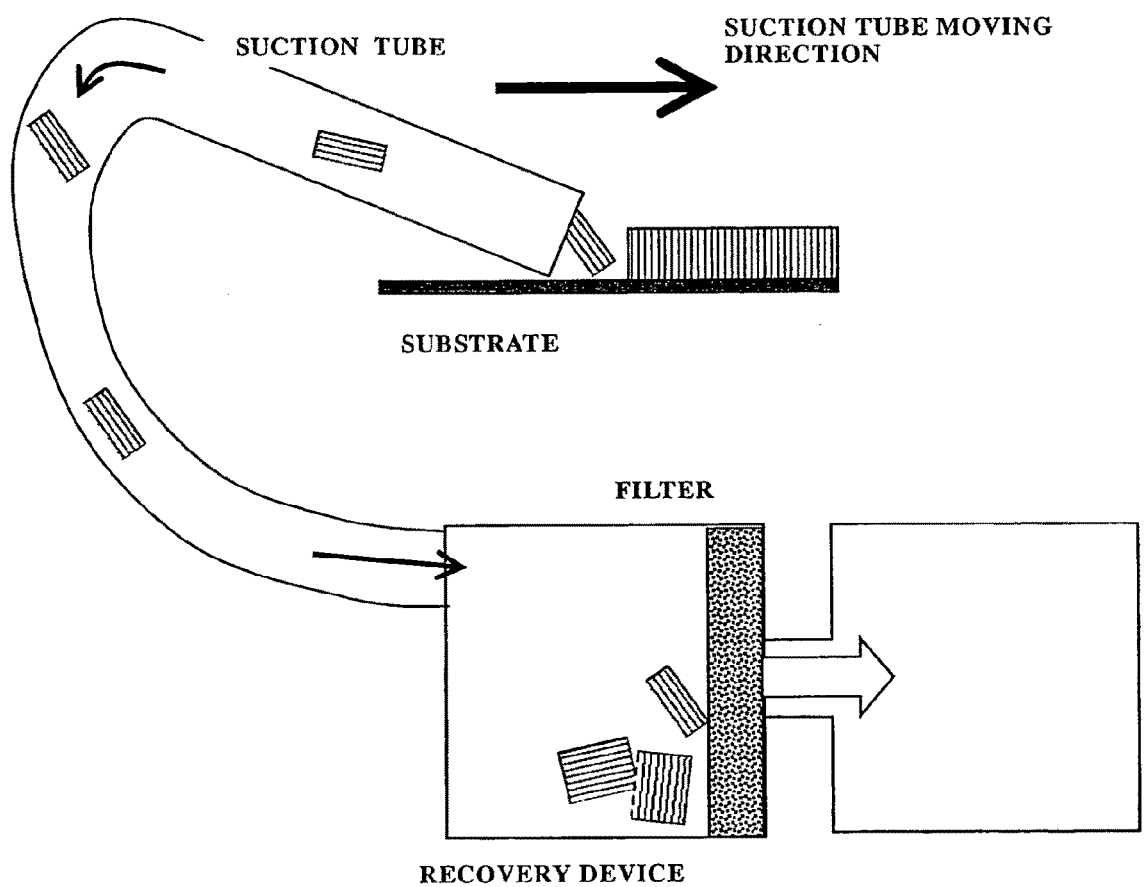
FIG. 61 is a schematic view for a separation device used for separating a powdered aligned single-walled CNT aggregate from a substrate or a catalyst.
Figure 62:
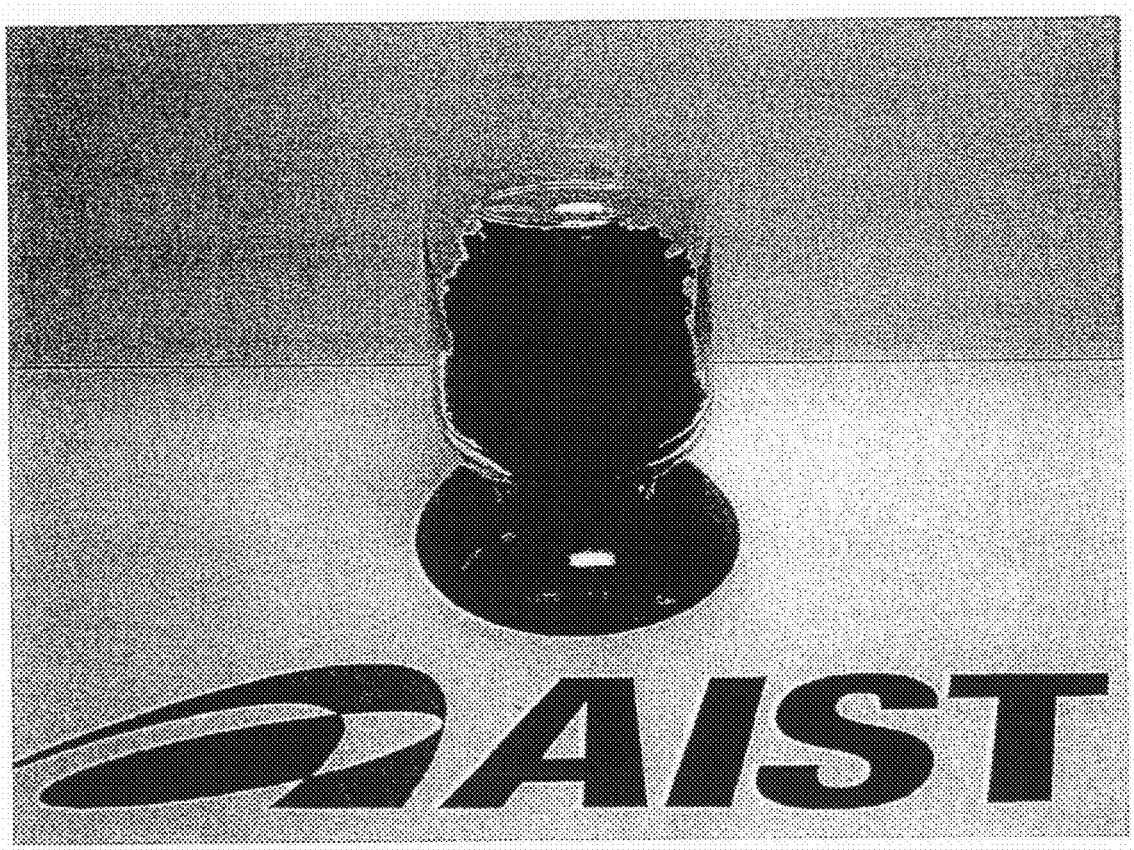
FIG. 62 shows digital camera images for a powdered aligned single-walled CNT aggregate peeled from a substrate and placed in a container.

As shown in FIG. 61, a suction tube connected to a vacuum apparatus which may be, for example, a commercially available vacuum cleaner is placed on a sample of an aligned single-walled CNT aggregate, and the aligned single-walled CNT aggregate is separated from the substrate by utilizing the suction force thereof, and sucked into a suction tube. In this case, the aligned single-walled CNT aggregate is formed into a powdery shape (refer to FIG. 62), which is caught by a filter in a collection device and collected.

As shown in SEM images observed under different magnification ratios and at different places (refer to FIG. 5), the structure of the powdered aligned single-walled CNT aggregate has aligned property to some extent in most cases. For evaluating the alignment degree of the powdered aligned single-walled CNT aggregate by SEM (or AFM) images, observation at an adequate place and under an adequate magnification factor is necessary.

Further, the powdered aligned single-walled CNT aggregate may also contain a partially isotropic structure to such an extent as not deteriorating the properties for the application.

[Alignment Property of Powdered Aligned Single-Walled CNT Aggregate]

FIG. 27 shows FFT images based on SEM images shown in FIG. 5. FFT images show anisotropy respectively while the degree is different depending on the magnification ratio of SEM images and places. This shows that CNT in the structure is aligned.

An intensity profile shown in FIG. 28 was obtained by the intensity from the reference direction ($\phi=0$) to $\phi=\pi/2$ in the radial direction while keeping an equal distance from the center of FFT images (FIG. 27). When the Herman's orientation factor F was calculated by using the intensity profile, it was 0.6 for Region 1 and, 0.3 for Region 2, and it was found that the powdered aligned single-walled CNT aggregates was aligned.

[Density of Powdered Aligned Single-Walled CNT Aggregate]

The density of the powdered aligned single-walled CNT aggregate was determined as follows.

The density measurement for the powdered aligned single-walled CNT aggregate can be evaluated by two methods, that is, lose density and tap density.

The lose density is a weight density after the powdered aligned single-walled CNT aggregate was placed in a container and shaken violently. In the case of this sample, the lose density was 0.019 g/cm$^3$. Further, the lose density of another sample was 0.009 g/cm$^3$.

The tap density is a weight density after the powdery aligned single-walled CNT aggregates were placed in a container and dropped from the height of 25 mm to a hard surface repetitively for 20 times. In the case of this sample, the tap density was 0.024 g/cm$^3$. Further, the tap density of another sample was 0.014 g/cm$^3$. Since the density of the aligned single-walled CNT aggregate before forming the same into a powdered state was about 0.03 to 0.04 g/cm$^3$, it could be seen that the weight density decreased from ⅘ to ¼ by powdering the same.

What is claimed is:

1. An aligned single-walled CNT aggregate comprising a substrate, fine particles of iron catalyst with a density of $1 \times 10^{11}$ to $1 \times 10^{14}$/cm$^2$ disposed on an alumina co-catalyst above the substrate, and a plurality of single-walled CNTs grown from the fine particles of the iron catalyst, in which the plurality of single-walled CNTs have a specific surface area of 600 m$^2$/g to 2600 m$^2$/g, and a weight density from 0.002 g/cm$^3$ to 0.2 g/cm$^3$, and the alignment degree is defined by at least one of the following conditions:

(1) in a case where X-rays are incident from a first direction parallel to the longitudinal direction of CNT and a second direction perpendicular to the first direction to measure the X-ray diffraction intensity ($\theta$-$2\theta$ method), a $\theta$ angle and a reflection direction where the reflection intensity from the second direction is larger than the reflection intensity from the first direction are present, and a $\theta$ angle and a reflection direction where the reflection intensity from the first direction is larger than the reflection intensity from the second direction are present, (2) in a case where the X-ray refraction intensity is measured (Laue method) by 2-dimensional diffraction pattern images obtained by incidence of X-rays in the direction perpendicular to the longitudinal direction of CNT, a diffraction peak pattern showing the presence of the anisotropy appears, and (3) Herman's orientation factor is greater than 0 and smaller than 1 by using an X-ray diffraction intensity obtained by the $\theta$-$2\theta$ method or the Laue method.

2. An aligned single-walled CNT aggregate having a specific surface area from 600 m$^2$/g to 2600 m$^2$/g, and a weight density from 0.002 g/cm$^3$ to 0.2 g/cm$^3$, in which the alignment degree is defined by at least one of the following conditions:

(1) in a case where X-rays are incident from a first direction parallel to the longitudinal direction of CNT and a second direction perpendicular to the first direction to measure the X-ray diffraction intensity ($\theta$-$2\theta$ method), a $\theta$ angle and a reflection direction where the reflection intensity from the second direction is larger than the reflection intensity from the first direction are present, and a θ angle and a reflection direction where the reflection intensity from the first direction is larger than the reflection intensity from the second direction are present, (2) in a case where the X-ray refraction intensity is measured (Laue method) by 2-dimensional diffraction pattern images obtained by incidence of X-rays in the direction perpendicular to the longitudinal direction of CNT, a diffraction peak pattern showing the presence of the anisotropy appears, (3) in a case where the Herman's orientation factor is greater than 0 and smaller than 1 by using an X-ray diffraction intensity obtained by the θ-2θ method or the Laue method.

3. An aligned single-walled CNT aggregate in claim (1), in which a case where X-rays are incident from a first direction parallel to the longitudinal direction of CNT and a second direction perpendicular to the first direction to measure the X-ray diffraction intensity (θ-2θ method), the diffraction intensities for the (CP) and (002) diffraction peaks attributable to the packing between single-walled CNTs and the diffraction intensities for the (100) and (110) diffraction peaks attributable to the hexagonal carbon ring structure that constitute the single-walled CNT are different from each other for the first parallel and the second perpendicular incident directions.

4. A powdered aligned single-walled CNT aggregate having a specific surface area from 600 $m^2/g$ to 2600 $m^2/g$, and a weight density from 0.0005 $g/cm^3$ to 0.16 $g/cm^3$, in which the alignment degree is defined by a value of Herman's orientation factor that is more than 0 and less than 1 when calculated based on the intensity profile obtained from images obtained by fast fourier transformation of scanning electron microscopic images or atomic force microscopic images.

5. An aligned single-walled CNT aggregate in claim (2), in which a case where X-rays are incident from a first direction parallel to the longitudinal direction of CNT and a second direction perpendicular to the first direction to measure the X-ray diffraction intensity (θ-2θ method), the diffraction intensities for the (CP) and (002) diffraction peaks attributable to the packing between single-walled CNTs and the diffraction intensities for the (100) and (110) diffraction peaks attributable to the hexagonal carbon ring structure that constitute the single-walled CNT are different from each other for the first parallel and the second perpendicular incident directions.

* * * * *